(12) United States Patent
Takegami et al.

(10) Patent No.: US 7,237,405 B2
(45) Date of Patent: Jul. 3, 2007

(54) REFRIGERATION APPARATUS

(75) Inventors: Masaaki Takegami, Osaka (JP); Kenji Tanimoto, Osaka (JP); Takeo Ueno, Osaka (JP); Akihiro Kajimoto, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 96 days.

(21) Appl. No.: 10/539,070

(22) PCT Filed: Oct. 5, 2004

(86) PCT No.: PCT/JP2004/014643

§ 371 (c)(1),
(2), (4) Date: Jun. 15, 2005

(87) PCT Pub. No.: WO2005/033593

PCT Pub. Date: Apr. 14, 2005

(65) Prior Publication Data

US 2006/0123835 A1 Jun. 15, 2006

(30) Foreign Application Priority Data

Oct. 6, 2003 (JP) ............................. 2003-347372

(51) Int. Cl.
*F25B 1/00* (2006.01)
(52) U.S. Cl. .......................... 62/498; 62/510
(58) Field of Classification Search ............... 62/228.5, 62/278, 324.1, 434, 498, 510
See application file for complete search history.

(56) References Cited

U.S. PATENT DOCUMENTS

| | | | | |
|---|---|---|---|---|
| 4,209,996 A * | 7/1980 | Shaw | .......................... | 62/175 |
| 6,131,401 A * | 10/2000 | Ueno et al. | .................... | 62/175 |
| 6,393,858 B1 * | 5/2002 | Mezaki et al. | ................. | 62/335 |
| 6,698,217 B2 * | 3/2004 | Tanimoto et al. | .............. | 62/175 |
| 6,722,156 B2 * | 4/2004 | Tanimoto et al. | .............. | 62/510 |
| 6,826,924 B2 * | 12/2004 | Shimoda et al. | ........... | 62/324.4 |
| 6,883,346 B2 * | 4/2005 | Tanimoto et al. | .............. | 62/510 |
| 6,938,430 B2 * | 9/2005 | Tanimoto et al. | ........... | 62/196.2 |
| 2003/0226370 A1 * | 12/2003 | Tanimoto et al. | ........... | 62/259.2 |
| 2003/0233836 A1 * | 12/2003 | Tanimoto et al. | .............. | 62/175 |
| 2004/0093893 A1 * | 5/2004 | Tanimoto et al. | .............. | 62/510 |
| 2004/0182101 A1 * | 9/2004 | Shimoda et al. | ........... | 62/324.1 |

FOREIGN PATENT DOCUMENTS

| | | | |
|---|---|---|---|
| JP | 6-257889 A | | 9/1994 |
| JP | 2001-221521 A | * | 8/2001 |
| JP | 2001-280749 A | | 10/2001 |
| JP | 2002-228297 A | | 8/2002 |
| JP | 2004-44921 A | | 2/2004 |

* cited by examiner

Primary Examiner—Mohammad M. Ali
(74) Attorney, Agent, or Firm—BIrch, Stewart, Kolasch & Birch, LLP

(57) ABSTRACT

In the case where a 100 percent heat recovery operation mode is performed without using an outdoor heat exchanger in a refrigeration apparatus which is provided with utilization-side heat exchangers of a plurality of piping systems and in which liquid-side communication lines are arranged into a single line, a backflow prevention mechanism (37) for preventing liquid refrigerant exiting an indoor heat exchanger (41) from flowing in a direction other than in the direction of cold storage and freeze storage heat exchangers (45, 51) is disposed for providing stable flow of refrigeration through the circuit even when the temperature of outside air is low, whereby the capability to provide refrigeration is prevented from degrading.

12 Claims, 27 Drawing Sheets

FIG. 18

REFRIGERATION APPARATUS

TECHNICAL FIELD

The present invention generally relates to a refrigeration apparatus and in particular to a refrigeration apparatus having a plurality of utilization-side heat exchangers as heat exchangers used for providing cold storing, freeze storing, and air conditioning.

BACKGROUND ART

Conventionally, refrigeration apparatuses which perform refrigeration cycles have been known in the prior art. Such a type of refrigeration apparatus has been used widely as an air conditioning apparatus for providing indoor space heating/cooling and as a cooler for a refrigerator or other like apparatus for keeping food, etc., cool. There is a refrigeration apparatus which is configured such that it provides both air conditioning and cold/freeze storing (see, for example, JP Patent Application Publication (Kokai) No. 2001-280749).

Generally, in such a type of refrigeration apparatus, a plurality of utilization-side heat exchangers (heat exchangers for cold storage, freeze storage, and air conditioning) disposed in utilization-side units (such as showcases for cold storage and freeze storage, indoor units for air conditioning etc.) are connected in parallel to a heat source-side heat exchanger (operating as an outdoor heat exchanger) of a heat source-side unit (operating as an outdoor unit) installed outdoors, by their respective liquid-side communication lines and gas-side communication lines. When installed in, for example, a convenience store, such a type of refrigeration apparatus is alone able to provide both indoor space air conditioning and showcase refrigeration.

In the conventional refrigeration apparatus, a refrigerant circuit thereof is formed into a circuit having two different piping systems, namely a cold/freeze storage piping system and an air conditioning piping system. Consequently, two communication lines are used for each of the liquid and gas lines, therefore resulting in an increase in the number of communication lines. This complicates the work of pipe connection, and there is the possibility that piping will be done improperly.

With a view to coping with the problems described above, the applicant of the present application devised a refrigeration apparatus in which it is arranged that a single liquid-side communication line is shared between liquid lines of two piping systems, and that the liquid-side communication line is positioned in side-by-side and contacting relationship with a low pressure gas-side communication line of a cold/freeze storage piping system, and the applicant of the present application already filed a patent application for this refrigeration apparatus (see JP Patent Application Publication (Kokai) No. 2004-044921). In this refrigeration apparatus, the number of communication lines is reduced, thereby reducing the possibility that pipes will be connected improperly. Besides, heat exchange takes place between liquid refrigerant in the liquid-side communication line and gas refrigerant in the low pressure gas-side communication line of the cold/freeze storage piping system. The liquid refrigerant is supercooled by the suction-side gas refrigerant, and the capability to provide refrigeration is improved.

The conventional refrigeration apparatus has a refrigerant circuit with a configuration as specifically shown in FIG. 27. FIG. 27 shows an outdoor unit (101), an indoor unit (102), a cold storage showcase (103) which is a cold storage unit, and a freeze storage showcase (104) which is a freeze storage unit. The outdoor unit (101) is provided with compression mechanisms (105,106), an outdoor heat exchanger (107), an outdoor expansion valve (108), and a receiver (109). The indoor unit (102) is provided with an indoor heat exchanger (110) and an indoor expansion valve (111). Additionally, the cold storage showcase (103) is provided with a cold storage heat exchanger (112) and a cold storage expansion valve (113). The freeze storage showcase (104) is provided with a freeze storage heat exchanger (114), a freeze storage expansion valve (115), and a booster compressor (116).

This refrigeration apparatus has a refrigerant circuit (120) which is provided with a cold/freeze storage piping system-side circuit and an air conditioning piping system-side circuit. The cold/freeze storage piping system-side circuit is configured so that refrigerant circulates between the outdoor heat exchanger (107) and the cold storage and freeze storage heat exchangers (112,114). The air conditioning piping system-side circuit is configured so that refrigerant circulates reversibly between the outdoor heat exchanger (107) and the indoor heat exchanger (110). And, a single liquid-side communication line (121) is shared between liquid lines of each piping system and, in addition, the liquid-side communication line (121) is positioned in side-by-side relationship with a low pressure gas-side communication line (122) of the cold/freeze storage piping system.

PROBLEMS TO BE SOLVED

The above-described refrigeration apparatus is able to provide, by making use of the outdoor heat exchanger (107) (installed outdoors) as a heat source, indoor space air conditioning and showcase refrigeration. In addition, without using the outdoor heat exchanger (107), the refrigeration apparatus is also able to provide space heating and refrigeration for cold storage and freeze storage in a 100 percent heat recovery manner in which the indoor heat exchanger (110) operates as a condenser while, on the other hand, the cold storage and freeze storage heat exchangers (112,114) each operate as an evaporator.

Incidentally, when performing a 100 percent heat recovery mode of operation in the configuration of the refrigerant circuit (120) provided with the single liquid-side communication line (121), refrigerant expelled from each of the compression mechanisms (105, 106) flows and circulates in the refrigerant circuit (120). More specifically, the refrigerant is condensed in the indoor heat exchanger (110), then is evaporated in each of the cold storage and freeze storage heat exchangers (112, 114), and is drawn again into each of the compression mechanisms (105, 106). In other words, at this time, liquid refrigerant, condensed in the indoor heat exchanger (110), should not be allowed to flow in the direction of the heat source-side heat exchanger (107) from the receiver (109), but it should be introduced into each of the cold storage heat exchanger (112) and the freeze storage heat exchanger (114) from the receiver (109).

For example, when outside air temperatures are low, the pressure in the receiver (109) is lowered. Consequently, the pressure in the liquid-side communication line (121) also falls, and liquid refrigerant exiting the indoor heat exchanger (110) tends to flow into the receiver (109) from the liquid-side communication line (121). This gives rise to the possibility of causing the rate of flow of the refrigerant flowing into each of the cold storage and freeze storage heat exchangers (112,114) to become insufficient. And, if the rate of flow of the refrigerant in each of the cold storage and freeze storage heat exchangers (112,114) is insufficient, this causes the capability to provide refrigeration to the inside of each showcase (103,104) to degrade.

As just described above, for the case of the conventional refrigeration apparatus, the flow of refrigerant in the refrigerant circuit (120) becomes unstable during the 100 percent heat recovery operation mode, therefore giving rise to the possibility of causing the capability to provide refrigeration to become insufficient. Bearing in mind these problems, the present invention was made. Accordingly, an object of the present invention is to prevent the capability to provide refrigeration from degrading, by stabilizing the flow of refrigerant in the circuit even when the temperature of outside air is low, when performing, without using any outdoor heat exchanger, a 100 percent heat recovery operation mode in a refrigeration apparatus which is provided with utilization-side heat exchangers of a plurality of piping systems and in which a single liquid-side communication line is shared between a plurality of liquid lines.

DISCLOSURE OF INVENTION

In order to maintain sides short of the expansion mechanisms (46, 52) in a "full-liquid" state that the sides are fully filled up with liquid refrigerant exiting the indoor heat exchanger (41) during execution of a 100 percent heat recovery operation mode, a liquid seal mechanism (37), (39, SV7), (40, SV8), (90), (21) is positioned in a refrigerant circuit (1E) in the present invention.

More specifically, as shown in FIGS. 1, 13, and 21, a first invention is intended for a refrigeration apparatus comprising; a heat source-side unit (1A) having a compression mechanism (2D, 2E) and a heat source-side heat exchanger (4); a first utilization-side unit (1C, 1D) having a first utilization-side heat exchanger (45, 51); and a second utilization-side unit (1B) having a second utilization-side heat exchanger (41), wherein: the heat source-side unit (1A) and the first utilization-side unit (1C, 1D) are connected by a first liquid-side communication line (11A) and a first gas-side communication line (15, 16); and the heat source-side unit (1A) and the second utilization-side unit (1B) are connected by a second liquid-side communication line (11B) and a second gas-side communication line (17).

In the refrigeration apparatus of the first invention, the first liquid-side communication line (11A) is composed of a main flow pipe (11) which is joined to a liquid pipe (10) connected to the heat source-side heat exchanger (4), and a first branch pipe (11a) which branches off from the main flow pipe (11) and is connected to the first utilization-side heat exchanger (45, 51); the second liquid-side communication line (11B) is composed of the main flow pipe (11), and a second branch pipe (11b) which braches off from the main flow pipe (11) and is connected to the second utilization-side heat exchanger (41); a liquid seal mechanism (37), (39, SV7), (40, SV8), (90), (21) is provided which is configured to hold a side short of an expansion mechanism (46, 52) provided between the second utilization-side heat exchanger (41) and the first utilization-side heat exchanger (45, 51) in a full liquid state in an operation mode during which refrigerant flows, in sequence, through the compression mechanism (2D, 2E), the second gas-side communication line (17), the second utilization-side heat exchanger (41), the second branch pipe (11b), the first branch pipe (11a), the first utilization-side heat exchanger (45, 51), and the first gas-side communication line (15, 16).

In the first invention, during the 100 percent heat recovery operation mode in which the heat source-side heat exchanger (4) is not used, a vapor compression refrigeration cycle is carried out by passage of refrigerant through the compression mechanism (2D, 2E), the second gas-side communication line (17), the second utilization-side heat exchanger (41), the second branch pipe (11b), the first branch pipe (11a), the first utilization-side heat exchanger (45, 51), and the first gas-side communication line (15, 16) in that order, and air is heated as a result of refrigerant condensation taking place in the second utilization-side heat exchanger (41) while, on the other hand, air is cooled as a result of refrigerant evaporation taking place in the first utilization-side heat exchanger (45, 51). In order to perform a refrigerant expansion stroke during the time from when a refrigerant condensation stroke is carried out in the second utilization-side heat exchanger (41) to when a refrigerant evaporation stroke is carried out in the first utilization-side heat exchanger (45, 51), an expansion mechanism for refrigerant expansion by decompression is positioned between the second utilization-side heat exchanger (41) and the first utilization-side heat exchanger (45, 51).

In the refrigeration cycle during the 100 percent heat recovery operation mode, refrigerant exiting the second utilization-side heat exchanger (41) flows through the second branch pipe (11b) and then flows towards the first utilization-side heat exchanger (45, 51) by way of the first branch pipe (11a). At the time, a side short of the expansion mechanism (46, 52) between the second utilization-side heat exchanger (41) and the first utilization-side heat exchanger (45, 51) is held in a full liquid state by the liquid seal mechanism (37), (39, SV7), (40, SV8), (90), (21). In other words, liquid refrigerant never flows towards the main flow pipe (11) and the liquid pipe (10) from the second branch pipe (11b) more than necessary. As a result, the rate of flow of the refrigerant being supplied to the first utilization-side heat exchanger (45, 51) is secured at satisfactory level, and the first utilization-side heat exchanger (45, 51) demonstrates its desired capability.

A second invention provides a refrigeration apparatus according to the refrigeration apparatus of the first invention which is characterized in that the liquid seal mechanism is formed by a backflow prevention mechanism (37), (39, SV7) which is provided either in the main flow pipe (11) or the liquid pipe (10) or in a line extending continuously therefrom so that the inflow of refrigerant into the main flow pipe (11) and the liquid pipe (10) from the second branch pipe (11b) is prevented.

In the second invention, in the refrigeration cycle during the 100 percent heat recovery operation mode, refrigerant exiting the second utilization-side heat exchanger (41) flows through the second branch pipe (11b), but it is prevented from flowing towards the main flow pipe (11) and the liquid pipe (10) by the backflow prevention mechanism (37), in other words, it is ensured that the refrigerant flows towards the first utilization-side heat exchanger (45, 51) from the first branch pipe (11a). Consequently, the flow of refrigerant within the refrigerant circuit is stabilized, thereby making it possible for the first utilization-side heat exchanger (45, 51) to demonstrate its desired capability.

A third invention provides a refrigeration apparatus according to the refrigeration apparatus of the second invention which is characterized in that the heat source-side unit (1A) is provided with a receiver (14) for storing refrigerant, and that the receiver (14) is connected to the liquid pipe (10) through: a first inflow pipe (10a) which permits the inflow of refrigerant from the heat source-side heat exchanger (4); a first outflow pipe (10b) which permits the outflow of refrigerant to the liquid-side communication lines (11A, 11B); a second inflow pipe (10c) which permits the inflow of refrigerant from the liquid-side communication lines (11A, 11B); and a second outflow pipe (10d) which permits the outflow of refrigerant to the heat source-side heat exchanger (4).

If, during the 100 percent heat recovery operation mode, the temperature of outside air falls and, as a result, the pressure within the receiver (14) is lowered, refrigerant exiting the second utilization-side heat exchanger (41) and then flowing through the second branch pipe (11b) intends to flow into the receiver (14) by way of the main flow pipe (11) and the second inflow pipe (10c) in the absence of the backflow prevention mechanism (37). In the third invention, however, the backflow prevention mechanism (37) is provided, therefore preventing the refrigerant from flowing into the receiver (14). Accordingly, the rate of flow of the refrigerant flowing through the first utilization-side heat exchanger (45, 51) never becomes insufficient.

A fourth invention provides a refrigeration apparatus according to the refrigeration apparatus of the third invention which is characterized in that the backflow prevention mechanism (37) is provided in the second inflow pipe (10c).

In the fourth invention, even when, during the 100 percent heat recovery operation mode, the temperature of outside air falls and, as a result, the pressure within the receiver (14) is lowered, the pressure in the main flow pipe (11) never drops because the backflow prevention mechanism (37) is positioned in the second inflow pipe (10c). Therefore, liquid refrigerant exiting the second utilization-side heat exchanger (41) never flows in the direction of the main flow pipe (11). Consequently, the liquid refrigerant flows towards the first branch pipe (11a) and the first utilization-side heat exchanger (45, 51) and from the second branch pipe (11b) without fail.

A fifth invention provides a refrigeration apparatus according to the refrigeration apparatus of the second invention which is characterized in that the backflow prevention mechanism (37) is formed by a relief valve operable to block a refrigerant flow path until the pressure of refrigerant acting on the backflow prevention mechanism (37) exceeds a predetermined pressure level.

In the fifth invention, the backflow of refrigerant is prevented by the relief valve 37 during the 100 percent heat recovery operation mode, so that liquid refrigerant leaving the second utilization-side heat exchanger (41) flows into the first utilization-side heat exchanger (45, 51). Since the relief valve (37) permits refrigerant to flow therethrough only when the pressure of refrigerant exceeds a preset value, this make it possible to prevent the refrigerant circuit from operating unstably.

A sixth invention provides a refrigeration apparatus according to the refrigeration apparatus of the third invention which is characterized in that the second inflow pipe (10c) is provided with a check valve (7) which permits only one-way flow of refrigerant traveling from the liquid-side communication lines (11A, 11B) towards the receiver (14), and that the backflow prevention mechanism (39, SV7) is provided with a backflow prevention pipe (39) which introduces high pressure present in a refrigerant circuit into the second inflow pipe (10c) so that the check valve (7) is placed in the closed state, and an opening/closing valve (SV7) for opening and closing the backflow prevention pipe (39).

In the sixth invention, when the opening/closing valve (SV7) is opened during the 100 percent heat recovery operation mode, a high pressure in the refrigerant circuit is introduced into the second inflow pipe (10c) via the backflow prevention pipe (39) and, as a result, the check valve (7) of the second inflow pipe (10c) is placed in the closed state.

Thereby, refrigerant flow traveling to the receiver (14) from the liquid-side communication lines (11A, 11B) is blocked. Therefore, even when, during the 100 percent heat recovery operation mode, the temperature of outside air falls and, as a result, the pressure within the receiver (14) drops, refrigerant exiting the second utilization-side heat exchanger (41) and then flowing through the second branch pipe (11b) never flows into the receiver (14) by way of the main flow pipe (11), but it flows towards the first utilization-side heat exchanger (45, 51). Consequently, the rate of flow of the refrigerant flowing through the first utilization-side heat exchanger (45, 51) never becomes insufficient.

A seventh invention provides a refrigeration apparatus according to the refrigeration apparatus of the sixth invention which is characterized in that the backflow prevention pipe (39) is configured such that high-pressure refrigerant is allowed to enter the second inflow pipe (10c) from a discharge pipe (8) of the compression mechanisms (2D, 2E).

In the seventh invention, the check valve of the second inflow pipe (10c) is closed by introduction of high-pressure refrigerant (expelled from the compression mechanism (2D, 2E)) into the second inflow pipe (10c). Therefore, even when, during the 100 percent heat recovery operation mode, the temperature of outside air falls and, as a result, pressure within the receiver (14) drops, refrigerant exiting the second utilization-side heat exchanger (41) and then flowing through the second branch pipe (11b) will not flow towards the receiver (14) by way of the main flow pipe (11), but it flows towards the first utilization-side heat exchanger (45, 51) without fail.

An eighth invention provides a refrigeration apparatus according to the refrigeration apparatus of the first invention which is characterized in that the heat source-side unit (1A) is provided with a receiver (14) for storing refrigerant, that the receiver (14) is connected to the liquid pipe (10) through: a first inflow pipe (10a) which permits the inflow of refrigerant from the heat source-side heat exchanger (4); a first outflow pipe (10b) which permits the outflow of refrigerant to the liquid-side communication lines (11A, 11B); a second inflow pipe (10c) which permits the inflow of refrigerant from the liquid-side communication lines (11A, 11B); and a second outflow pipe (10d) which permits the outflow of refrigerant to the heat source-side heat exchanger (4), that the second inflow pipe is provided with a check valve which permits only one-way flow of refrigerant traveling from the liquid-side communication lines (11A, 11B) towards the receiver (14), and that the liquid seal mechanism (40, SV8) is provided with a high-pressure introduction pipe (40) for introducing high pressure in a refrigerant circuit into the receiver (14), and an opening/closing valve (SV8) for opening and closing the high-pressure introduction pipe (40).

In the eighth invention, when the opening/closing valve (SV8) is opened during the 100 percent heat recovery operation mode, a high pressure in the refrigerant circuit is introduced into the receiver (14) via the high-pressure introduction pipe (40) and, as a result, the pressure in the receiver (14) becomes high, thereby placing the check valve (7) of the second inflow pipe (10c) in the closed state. Thereby, refrigerant flow traveling to the receiver (14) from the liquid-side communication lines (11A, 11B) is blocked. Therefore, even when, during the 100 percent heat recovery operation mode, the temperature of outside air falls, refrigerant exiting the second utilization-side heat exchanger (41) and then flowing through the second branch pipe (11b) will not flow into the receiver (14) by way of the main flow pipe (11), but it flows towards the first utilization-side heat exchanger (45, 51). Consequently, the rate of flow of the refrigerant flowing through the first utilization-side heat exchanger (45, 51) will not become insufficient.

A ninth invention provides a refrigeration apparatus according to the refrigeration apparatus of the eighth invention which is characterized in that the high-pressure introduction pipe (40) is configured such that high-pressure refrigerant is allowed to enter the receiver (14) from a discharge pipe (8) of the compression mechanism (2D, 2E).

In the ninth invention, the check valve of the second inflow pipe (10*c*) is closed by introduction of high-pressure refrigerant (expelled from the compression mechanism (2D, 2E)) into the receiver (14). Therefore, even when, during the 100 percent heat recovery operation mode, the temperature of outside air falls, refrigerant exiting the second utilization-side heat exchanger (41) and then flowing through the second branch pipe (11*b*) will not flow towards the receiver (14) by way of the main flow pipe (11), but it flows towards the first utilization-side heat exchanger (45, 51) without fail.

A tenth invention provides a refrigeration apparatus according to the refrigeration apparatus of the first invention which is characterized in that the heat source-side unit (1A) is provided with a receiver (14) for storing refrigerant, that the receiver (14) is connected to the liquid pipe (10) through: a first inflow pipe (10*a*) which permits the inflow of refrigerant from the heat source-side heat exchanger (4); a first outflow pipe (10*b*) which permits the outflow of refrigerant to the liquid-side communication lines (11A, 11B); a second inflow pipe (10*c*) which permits the inflow of refrigerant from the liquid-side communication lines (11A, 11B); and a second outflow pipe (10*d*) which permits the outflow of refrigerant to the heat source-side heat exchanger (4), that the second inflow pipe is provided with a check valve which permits only one-way flow of refrigerant traveling from the liquid-side communication lines (11A, 11B) towards the receiver (14), and that the liquid seal mechanism (90) is formed by a heating member (90) for heating the receiver (14).

In the tenth invention, when the receiver (14) is heated by the heating member (90) during the 100 percent heat recovery operation, the pressure within the receiver (14) becomes higher and, as a result, the check valve (7) of the second inflow pipe (10*c*) is placed in the closed state. Thereby, refrigerant flow traveling to the receiver (14) from the liquid-side communication lines (11A, 11B) is blocked. Therefore, even when, during the 100 percent heat recovery operation mode, the temperature of outside air falls, refrigerant exiting the second utilization-side heat exchanger (41) and then flowing through the second branch pipe (11*b*) will not flow into the receiver (14) by way of the main flow pipe (11), but it flows towards the first utilization-side heat exchanger (45, 51). Consequently, the rate of flow of the refrigerant flowing through the first utilization-side heat exchanger (45, 51) will not become insufficient.

An eleventh invention provides a refrigeration apparatus according to the refrigeration apparatus of the first invention which is characterized in that the liquid seal mechanism (21) is formed by an uprising part (21) which is provided in the main flow pipe (11) such that the uprising part (21) extends upwards from the first branch pipe (11*a*) and the second branch pipe (11*b*) at a junction of the main flow pipe (11), the first branch pipe (11*a*) and, the second branch pipe (11*b*).

In the eleventh invention, in the refrigeration cycle during the 100 percent heat recovery operation mode, refrigerant exiting the second utilization-side heat exchanger (41) flows through the second branch pipe (11*b*), but it is prevented from flowing towards the main flow pipe (11) and the liquid pipe (10) by the uprising part (21), in other words, the refrigerant flows towards the first utilization-side heat exchanger (45, 51) from the first branch pipe (11*a*). Consequently, the flow of refrigerant within the refrigerant circuit is stabilized, thereby making it possible for the first utilization-side heat exchanger (45, 51) to demonstrate its desired capability.

A twelfth invention provides a refrigeration apparatus according to the refrigeration apparatus of the first invention which is characterized in that the heat source-side heat exchanger (4) is an outdoor heat exchanger which is installed outdoors, that the first utilization-side heat exchangers (45, 51) is a cold/freeze storage heat exchanger for providing refrigeration to the inside of a refrigerator compartment, and that the second utilization-side heat exchanger (41) is an air conditioning heat exchanger for providing air conditioning to an indoor space.

In the twelfth invention, during the 100 percent heat recovery operation mode, the outdoor heat exchanger (4) as the heat source-side heat exchanger is not operated, and indoor space heating is provided by the air conditioning heat exchanger (41) as the second utilization-side heat exchanger and refrigerator compartment's refrigeration is provided by the cold/freeze storage heat exchanger (45, 51) as the first utilization-side heat exchanger. And, at this time, the backflow of refrigerant is prevented by the backflow prevention mechanism (37), thereby making it possible for refrigerant to flow in stable manner from the air conditioning heat exchanger (41) to the cold/freeze storage heat exchanger (45, 51).

EFFECTS

In accordance with the first invention, the liquid seal mechanism (37), (39, SV7), (40, SV8), (90), (21) is provided so that a side short of the expansion mechanism (46, 52) between the second utilization-side heat exchanger (41) and the first utilization-side heat exchanger (45, 51) is held in a full liquid state during the 100 percent heat recovery operation mode. In other words, liquid refrigerant is inhibited from flowing towards the main flow pipe (11) and the liquid pipe (10) from the second branch pipe (11*b*) at flow rates more than necessary. As a result, the rate of flow of the refrigerant being supplied to the first utilization-side heat exchanger (45, 51) is secured at satisfactory levels. Therefore, even when outside air temperatures are low, it is possible to prevent the capability to provide refrigeration from degrading during the 100 percent heat recovery operation mode.

In accordance with the second invention, the backflow prevention mechanism (37) is provided so that refrigerant is inhibited from flowing towards the main flow pipe (11) and the liquid pipe (10) during the 100 percent heat recovery operation mode. Such arrangement provides stable refrigerant flow during the 100 percent heat recovery operation mode. Therefore, even when outside air temperatures are low, it is possible to prevent the capability to provide refrigeration from degrading during the 100 percent heat recovery operation mode.

In accordance with the third invention, even when the temperature of outside air falls during the 100 percent heat recovery operation mode, no refrigerant enters the receiver (14) and the rate of flow of the refrigerant in the first utilization-side heat exchanger (45, 51) will not become insufficient. Therefore, even in the case where the receiver (14) is provided in the refrigerant circuit, it is possible to prevent the capability to provide refrigeration from degrading, even if the temperature of outside air falls during the 100 percent heat recovery operation mode.

In accordance with the fourth invention, the backflow prevention mechanism (37) is provided in the second inflow pipe (10c). As a result of such arrangement, even when the temperature of outside air falls during the 100 percent heat recovery operation mode and, as a result, the pressure within the receiver (14) is lowered, it is ensured that liquid refrigerant exiting the second utilization-side heat exchanger (41) flows towards the first branch pipe (11a) and the first utilization-side heat exchanger (45, 51) from the second branch pipe (11b). Therefore, it is possible to prevent the capability to provide refrigeration from degrading without fail, even when the temperature of outside air falls during the 100 percent heat recovery operation mode.

In the case where the backflow prevention mechanism (37) is provided either in the liquid pipe (10) or in the main flow pipe (11), in order to allow refrigerant to flow from the heat source-side heat exchanger (4) towards each of the utilization-side heat exchangers (41, 45, 51) during other than the 100 percent heat recovery operation mode, it is necessary to provide piping that bypasses the backflow prevention mechanism (37). In the fourth invention, however, it is arranged that the backflow prevention mechanism (37) is provided in the second inflow pipe (10c). This arrangement eliminates the need for such bypass piping and avoids complicated configurations.

In accordance with the fifth invention, by the above-described simple configuration that makes use of only a relief valve as the backflow prevention mechanism (37), it becomes possible to prevent operations from becoming unsteady when the temperature of outdoor air falls during the 100 percent heat recovery operation mode.

In accordance with the sixth invention, the backflow prevention pipe (39) and the opening/closing valve (SV7) are provided as the backflow prevention mechanism (39, SV7), and the check valve (7) of the second inflow pipe (10c) is closed by making utilization of high pressure in the refrigerant circuit. As a result of such arrangement, even when the temperature of outside air falls during the 100 percent heat recovery operation mode and, as a result, the pressure within the receiver (14) is lowered, the rate of flow of the refrigerant in the first utilization-side heat exchanger (45, 51) is secured at satisfactory levels. Therefore, the capability to provide refrigeration of the first utilization-side heat exchanger (45, 51) is prevented from degrading.

In accordance with the seventh invention, it is arranged that high-pressure refrigerant expelled from the compression mechanism (2D, 2E) is introduced into the second inflow pipe (10c) from the backflow prevention pipe (39). And, since the loss of pressure of the refrigerant immediately after being expelled from the compression mechanism (2D, 2E) is small, this ensures that the check valve of the second inflow pipe (10c) is closed. Accordingly, even when the temperature of outside air falls during the 100 percent heat recovery operation mode and, as a result, the pressure within the receiver (14) is lowered, the capability to provide refrigeration of the first utilization-side heat exchanger (45, 51) is more assuredly prevented from degrading.

In accordance with the eighth invention, the high-pressure introduction pipe (40) connected to the receiver (14) and the opening/closing valve (SV8) are provided as the liquid seal mechanism (40, SV8). The check valve (7) of the second inflow pipe (10c) is closed by making utilization of high pressure in the refrigerant circuit and, as a result of such arrangement, even when the temperature of outside air falls during the 100 percent heat recovery operation mode and, as a result, the pressure within the receiver (14) is lowered, the rate of flow of the refrigerant in the first utilization-side heat exchanger (45, 51) is secured at satisfactory levels. Therefore, the capability to provide refrigeration of the first utilization-side heat exchanger (45, 51) is prevented from degrading.

In accordance with the ninth invention, it is arranged that high-pressure refrigerant expelled from the compression mechanism (2D, 2E) is introduced into the receiver (14) from the high pressure introduction pipe (40). And, since the loss of pressure of the refrigerant immediately after being expelled from the compression mechanism (2D, 2E) is small, this ensures that the check valve of the second inflow pipe (10c) is closed. Accordingly, even when the temperature of outside air falls during the 100 percent heat recovery operation mode, the capability to provide refrigeration of the first utilization-side heat exchanger (45, 51) is more assuredly prevented from degrading.

In accordance with the tenth invention, it is arranged that the heating member (90) for heating the receiver (14) is provided as a liquid seal mechanism. As a result of such arrangement, even when the temperature of outside air falls during the 100 percent heat recovery operation mode, the rate of flow of the refrigerant in the first utilization-side heat exchanger (45, 51) is secured at satisfactory levels by increasing the pressure within the receiver (14) by heating it. Therefore, the capability to provide refrigeration of the first utilization-side heat exchanger (45, 51) is prevented from degrading.

In accordance with the eleventh invention, it is arranged that the uprising part (21) is provided, as a liquid seal mechanism, in the main flow pipe (11) which extends upwards from the first and second branch pipes (11a) and (11b) at a junction of the main flow pipe (11), the first branch pipe (11a), and the second branch pipe (11b). As a result of such arrangement, even when the temperature of outside air falls during the 100 percent heat recovery operation mode, it is difficult for refrigerant to flow toward the main flow pipe (11) and the liquid pipe (10). Accordingly, the rate of flow of the refrigerant in the first utilization-side heat exchanger (45, 51) is secured at satisfactory levels, and the capability to provide refrigeration of the first utilization-side heat exchanger (45, 51) is prevented from degrading.

In accordance with the twelfth invention, even when the temperature of outside air falls during the 100 percent heat recovery operation mode in which indoor space heating is provided by the air conditioning heat exchanger (41) as the second utilization-side heat exchanger (41) while, simultaneously, refrigerator's compartment refrigeration is provided by the cold/freeze storage heat exchanger (45, 51) as the first utilization-side heat exchanger (45, 51), refrigerant flows to the cold/freeze storage heat exchanger (45, 51) without fail. This ensures that the capability to provide showcase refrigeration is prevented from degrading.

BRIEF DESCRIPTION OF THE DRAWINGS

FIG. 18 is a refrigerant circuit diagram showing a first heating/refrigeration mode of operation in the second embodiment;

BEST MODE FOR CARRYING OUT INVENTION

Hereafter, embodiments of the present invention will be described in detail with reference to the drawings.

EMBODIMENT 1 OF INVENTION

Figure 1:
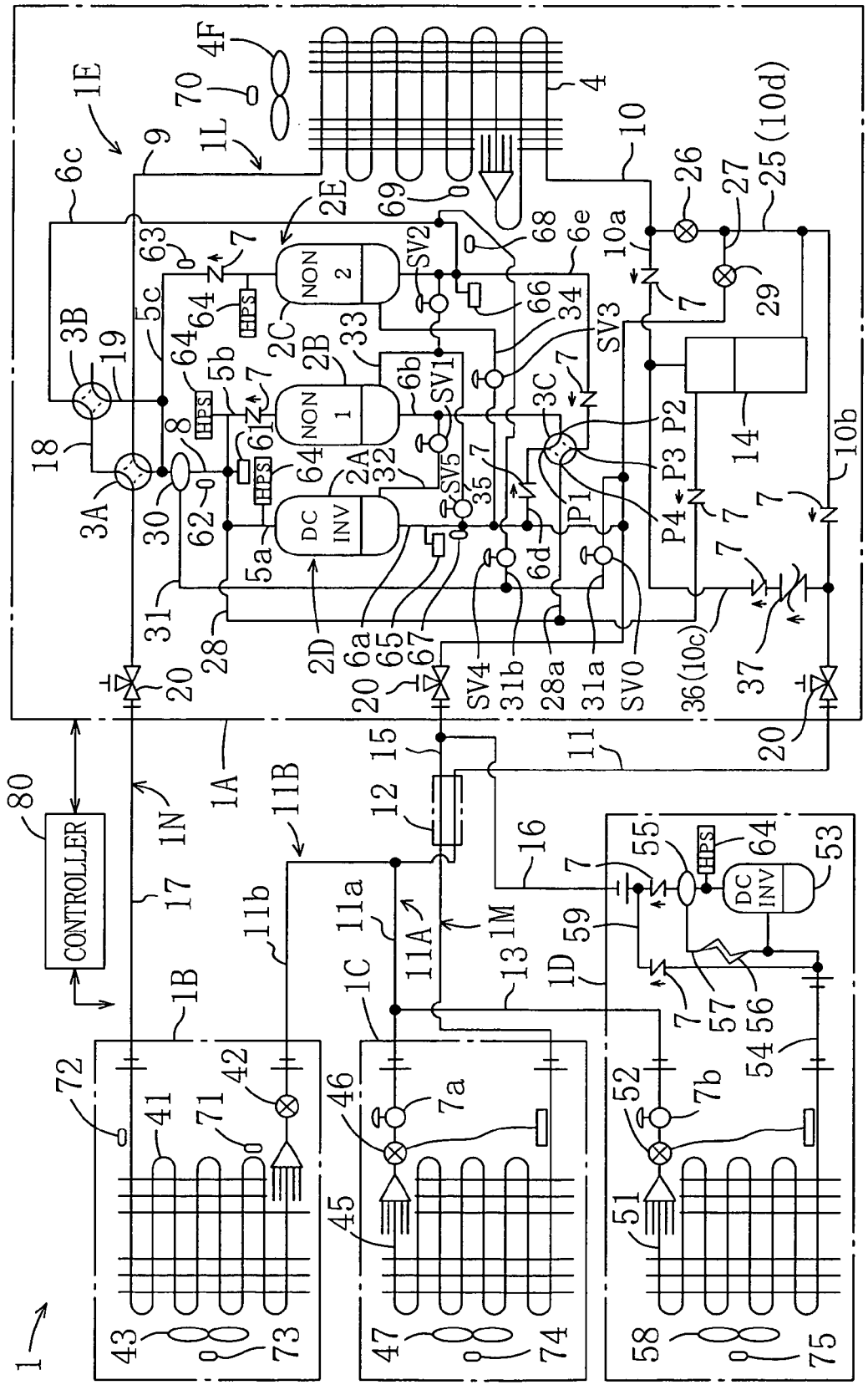
FIG. 1 is a refrigerant circuit diagram of a refrigeration apparatus according to a first embodiment of the present invention.

As shown FIG. 1, a refrigeration apparatus (1) according to a first embodiment of the present invention is intended for installation in a convenience store or the like for providing cold-storage showcase refrigeration, freeze-storage showcase refrigeration, and space heating/cooling in the shop.

The refrigeration apparatus (1) of the first embodiment includes an outdoor unit (1A), an indoor unit (1B), a cold storage unit (1C), and a freeze storage unit (1D), and is provided with a refrigerant circuit (1E) which performs a vapor compression refrigeration cycle. The refrigerant circuit (1E) is provided with a first system-side circuit for cold storage and freeze storage, and a second system-side circuit for air conditioning. The refrigerant circuit (1E) is configured so as to be switchable between a cooling cycle and a heating cycle.

The indoor unit (1B) is configured so that it selectively performs a space cooling operation mode or a space heating operation mode, and is installed, for example, in shop's selling areas. On the other hand, the cold storage unit (1C) is disposed in a cold storage showcase and cools the air in the cold storage showcase. The freeze storage unit (1D) is disposed in a freeze storage showcase and cools the air in the freeze storage showcase. In the first embodiment, for example, two indoor units (1B), about eight cold storage units (1C), and a single freeze storage unit (1D) are connected to the out door unit (1A): however, all of them are not shown in the figure.

Outdoor Unit

The outdoor unit (1A) includes an inverter compressor (2A) as a first compressor, a first noninverter compressor (2B) as a second compressor, and a second noninverter compressor (2C) as a third compressor. The outdoor unit (1A) further includes a first four-way switch valve (3A), a second four-way switch valve (3B), a third four-way switch valve (3C), and an outdoor heat exchanger (4) which is a heat source-side heat exchanger.

The compressors (2A, 2B, 2C) are, for example, high-pressure dome scroll compressors of the sealed type. The inverter compressor (2A) is a variable displacement compressor whose capacity is made variable in a phased manner or in a continuous manner by inverter controlling an electric motor. Each of the first and second noninverter compressors (2B) and (2C) is a constant capacity compressor which is driven constantly at a fixed number of revolutions by a respective electric motor.

The inverter compressor (2A), the first noninverter compressor (2B), and the second noninverter compressor (2C) together constitute a compression mechanism (2D, 2E) of the refrigeration apparatus (1), and the compression mechanism (2D, 2E) is made up of a compression mechanism (2D) of a first system and a compression mechanism (2E) of a second system. More specifically, in regard to the compression mechanism (2D, 2E), there are two different compression operation modes. In one of the two compression operation modes, the inverter compressor (2A) and the first noninverter compressor (2B) together constitute the compression mechanism (2D) of the first system while, on the other hand, the second noninverter compressor (2C) alone constitutes the compression mechanism (2E) of the second system. In the other compression operation mode, the inverter compressor (2A) alone constitutes the compression mechanism (2D) of the first system while, on the other hand, the first noninverter compressor (2B) and the second noninverter compressor (2C) together constitute the compression mechanism (2E) of the second system. Stated another way, it is designed that the inverter compressor (2A) and the second noninverter compressor (2C) are used, in a fixed manner, for a first system-side circuit for cold storage and freeze storage and for a second system-side circuit for air conditioning, respectively while, on the other hand, the first noninverter compressor (2B) is used switchably for the first system-side circuit or for the second system-side circuit.

The inverter compressor (2A), the first noninverter compressor (2B), and the second noninverter compressor (2C) have their respective discharge pipes (5a, 5b, 5c) which are connected to a single high-pressure gas pipe (discharge pipe) (8), and the high-pressure gas pipe (8) is connected to one port of the first four-way switch valve (3A). The discharge pipe (5b) of the first noninverter compressor (2B) and the discharge pipe (5c) of the second noninverter compressor (2C) are each provided with a respective check valve (7).

A gas-side end of the outdoor heat exchanger (4) is connected to one port of the first four-way switch valve (3A) by an outdoor gas pipe (9). Connected to a liquid-side end of the outdoor heat exchanger (4) is one end of a liquid pipe (10) which is a liquid line. A receiver (14) for storage of liquid refrigerant is disposed midway along the liquid pipe (10), and the other end of the liquid pipe (10) is connected to a main flow pipe (11) for liquid-side communication lines, i.e., a first communication liquid pipe (11A) as a first liquid-side communication line and a second communication liquid pipe (11B) as a second liquid-side communication line.

The receiver (14) is connected to the liquid pipe (10) through four different pipes, namely a first inflow pipe (10a) which permits refrigerant inflow from the heat source-side heat exchanger (4), a first outflow pipe (10b) which permits refrigerant outflow to the liquid-side communication lines (11A, 11B), a second inflow pipe (10c) which permits refrigerant inflow from the liquid-side communication lines (11A, 11B), and a second outflow pipe (10d) which permits refrigerant outflow to the outdoor heat exchanger (4).

The outdoor heat exchanger (4) is implemented, for example, by a fin and tube heat exchanger of the cross fin type, and an outdoor fan (4F) as a heat source fan is disposed in the vicinity of the outdoor heat exchanger (4).

A communication gas pipe (17) is connected to one port of the first four-way switch valve (3A). Another port of the four-way switch valve (3A) is connected to a port of the second four-way switch valve (3B) by a connecting pipe (18). Another port of the second four-way switch valve (3B) is connected to the discharge pipe (5c) of the second noninverter compressor (2C) by an auxiliary gas pipe (19). Still another port of the second four-way switch valve (3B) is connected to a suction pipe (6c) of the noninverter compressor (2C). The last port of the second four-way switch valve (3B) is a closed port in the closed state. In other words, the second four-way switch valve (3B) may be implemented by a three-way switch valve.

The first four-way switch valve (3A) is configured switchably between a first state which permits fluid communication between the high-pressure gas pipe (8) and the outdoor gas pipe (9) and fluid communication between the connecting pipe (18) and the communication gas pipe (17) (as indicated by the solid line of FIG. 1), and a second state which permits fluid communication between the high-pressure gas pipe (8) and the connecting gas pipe (17) and fluid communication between the connecting pipe (18) and the outdoor gas pipe (9) (as indicated by the broken line of FIG. 1).

In addition, the second four-way switch valve (3B) is configured switchably between a first state which permits fluid communication between the auxiliary gas pipe (19) and the closed port and fluid communication between the connecting pipe (18) and the suction pipe (6c) of the second noninverter compressor (2C) (as indicated by the solid line of FIG. 1), and a second state which permits fluid communication between the auxiliary gas pipe (19) and the connecting pipe (18) and fluid communication between the suction pipe (6c) and the closed port (as indicated by the broken line of FIG. 1).

The suction pipe (6a) of the inverter compressor (2A) is connected to a low-pressure gas pipe (15) (which is a low pressure gas-side communication line) of the first system-side circuit. The suction pipe (6c) of the second noninverter compressor (2C) is connected, through the first and second four-way switch valves (3A, 3B), to a low-pressure gas pipe of the second system-side circuit (the communication gas pipe (17) or the outdoor gas pipe (9)). In addition, the suction pipe (6b) of the first noninverter compressor (2B) is connected, through the third four-way switch valve (3C) (describe later), to the suction pipe (6a) of the inverter compressor (2A) and the suction pipe (6c) of the second noninverter compressor (2C).

More specifically, a branch pipe (6d) is connected to the suction pipe (6a) of the inverter compressor (2A) while, on the other hand, a branch pipe (6e) is connected to the suction pipe (6c) of the second noninverter compressor (2C). And, the branch pipe (6d) of the suction pipe (6a) of the inverter compressor (2A) is connected, through a check valve (7), to a first port (P1) of the third four-way switch valve (3C); the suction pipe (6b) of the first noninverter compressor (2B) is connected to a second port (P2) of the third four-way switch valve (3C); and the branch pipe (6e) of the suction pipe (6c) of the second noninverter compressor (2C) is connected, through a check valve (7), to a third port (P3) of the third four-way switch valve (3C). Additionally, connected to a fourth port (P4) of the third four-way switch valve (3C) is a branch pipe (28a) of a gas vent pipe (28) extending from the receiver (14) (described later). The check valves positioned in the branch pipes (6d, 6e) permit only one-way flow of refrigerant in the direction of the third four-way switch valve (3C).

The third four-way switch valve (3C) is configured switchably between a first state which permits fluid communication between the first port (P1) and the second port (P2) and fluid communication between the third port (P3) and the fourth port (P4) (as indicated by the solid line of the figure), and a second state which permits fluid communication between the first port (P1) and the fourth port (P4) and fluid communication between the second port (P2) and the third port (P3) (as indicated by the broken line of the figure).

Each discharge pipe (5a, 5b, 5c), the high-pressure gas pipe (8), and the outdoor gas pipe (9) together constitute a high-pressure gas line (1L) in the space cooling operation mode. Additionally, each discharge pipe (5a, 5b, 5c), the high-pressure gas pipe (8), and the communication gas pipe (17) together constitute a high-pressure gas line (1N) in the space heating operation mode. On the other hand, the low-pressure gas pipe (15) and each suction pipe (6a, 6b) of the compression mechanism (2D) of the first system together constitute a first low-pressure gas line (1M). In addition, the communication gas pipe (17) and the suction pipe (6c) of the compression mechanism (2E) of the second system together constitute a low-pressure gas line (1N) in the space cooling operation mode while, on the other hand, the outdoor gas pipe (9) and the suction pipe (6c) together constitute a low-pressure gas line (1L) in the space heating operation mode. As just described, the communication gas pipe (17) switches between the high-pressure gas line side and the low-pressure gas line side, depending on the operation states. The low-pressure gas pipe (15) always becomes a low-pressure gas line whenever refrigerant flows, regardless of the operation states.

The main flow pipe (11) of the communication liquid pipes (11A, 11B), the communication gas pipe (17), and the low-pressure gas pipe (15) extend outwards from the outdoor unit (1A), and the outdoor unit (1A) is provided with associated stop valves (20) with the pipes (11, 17, 15), respectively.

Connected to the liquid pipe (10) is an auxiliary liquid pipe (25) (the second outflow pipe (10d)) which bypasses the receiver (14). The auxiliary liquid pipe (25) is provided with an outdoor expansion valve (26) through which refrigerant flows mainly during the space heating operation mode and which is an expansion mechanism. Disposed between the outdoor heat exchanger (4) and the receiver (14) in the liquid pipe (10) (the first inflow pipe (10a)) is a check valve (7) which permits only one-way flow of refrigerant in the direction of the receiver (14). The check valve (7) is positioned between a connecting part of the auxiliary liquid pipe (25) in the liquid pipe (10) and the receiver (14).

The liquid pipe (10) branches off, between the check valve (7) and the receiver (14), into a liquid branch pipe (36) (the second inflow pipe (10c)). And, the liquid branch pipe (36) is connected between the stop valve (20) and the check valve (7) (described later) in the liquid pipe (10). The liquid branch pipe (36) is provided with a check valve (7) which permits only one-way flow of refrigerant traveling towards the receiver (14) from a connecting point with the liquid pipe (10). In addition, the liquid branch pipe (36) which is the second inflow pipe (10c) is provided, between a connecting point with the liquid pipe (10) and the check valve (7), with a relief valve (37) as a backflow prevention mechanism (which is a liquid seal mechanism). The relief valve (37) automatically enters the open state if refrigerant pressure which acts on the relief valve (37) reaches a predetermined pressure level (for example, 1.5 MPa). In other words, the relief valve (37) holds the refrigerant flow path in the closed state until the refrigerant pressure exceeds the predetermined pressure level.

The liquid pipe (10) is provided, between a connecting point with the auxiliary liquid pipe (25) and the stop valve (20) (i.e., in the first outflow pipe (10b)), with a check valve (7). This check valve (7) permits only refrigerant flow traveling to the stop valve (20) from the receiver (14).

A liquid injection pipe (27) is connected between the auxiliary liquid pipe (25) and the low-pressure gas pipe (15). The liquid injection pipe (27) is provided with an electronic expansion valve (29). A gas vent pipe (28) is connected between the receiver's (14) upper part and the discharge pipe (5a) of the inverter compressor (2A); As described above, the branch pipe (28a) of the gas vent pipe (28) is connected to the fourth port (P4) of the third four-way switch valve (3C). In addition, the gas vent pipe (28) is provided, between a connecting point with the branch pipe (28a) of the gas vent pipe (28) and the receiver (14), with a check valve (7) which permits only one-way flow of refrigerant traveling to the discharge pipe (5a) from the receiver (14).

An oil separator (30) is disposed in the high-pressure gas pipe (8). Connected to the oil separator (30) is one end of an oil return pipe (31). The other end of the oil return pipe (31) branches off into a first oil return pipe (31a) and a second oil return pipe (31b). The first oil return pipe (31a) is provided with an electromagnetic valve (SV0) and is connected, through the liquid injection pipe (27), to the suction pipe (6a) of the inverter compressor (2A). On the other hand, the second oil return pipe (31b) is provided with an electromagnetic valve (SV4) and is connected to the suction pipe (6c) of the second noninverter compressor (2C).

A first oil level equalizing pipe (32) is connected between a dome (oil pan) of the inverter compressor (2A) and the suction pipe (6b) of the first noninverter compressor (2B). A second oil level equalizing pipe (33) is connected between a dome of the first noninverter compressor (2B) and the suction pipe (6c) of the second noninverter compressor (2C). A third oil level equalizing pipe (34) is connected between a dome of the second noninverter compressor (2C) and the suction pipe (6a) of the inverter compressor (2A). The first oil level equalizing pipe (32), the second oil level equalizing pipe (33), and the third oil level equalizing pipe (34) are provided with respective opening/closing mechanisms, i.e., electromagnetic valves (SV1, SV2, SV3). Between the dome of the first noninverter compressor (2B) and the electromagnetic valve (SV2), a fourth oil level equalizing pipe (35) is branched off from the second oil level equalizing pipe (33). The fourth oil level equalizing pipe (35) is provided with an electromagnetic valve (S V5) and is joined to the suction pipe (6a) of the first compressor (2A).

Indoor Unit

The indoor unit (1B) is provided with an indoor heat exchanger (air conditioning heat exchanger) (41) which is a second utilization-side heat exchanger, and an indoor expansion valve (42) which is an expansion mechanism. A gas side of the indoor heat exchanger (41) is connected to the communication gas pipe (17). On the other hand, a liquid side of the indoor heat exchanger (41) is connected, through the indoor expansion valve (42), to the second branch pipe (11b) of the second communication liquid pipe (11B). The indoor heat exchanger (41) is implemented, for example, by a fin and tube heat exchanger of the cross fin type, and an indoor fan (43) which is a utilization-side fan is disposed in the vicinity of the indoor heat exchanger (41). Additionally, the indoor expansion valve (42) is formed by an electric expansion valve.

Cold Storage Unit

The cold storage unit (1C) is provided with a cold storage heat exchanger (45) which is a first utilization-side heat exchanger as an evaporator, and a cold storage expansion valve (46) which is an expansion mechanism. A liquid side of the cold storage heat exchanger (45) is connected, through an electromagnetic valve (7a) and the cold storage expansion valve (46), to the first branch pipe (11a) of the first communication liquid pipe (11A). That is, positioned upstream of the cold storage heat exchanger (45) are the cold storage expansion valve (46) and the electromagnetic valve (7a) as an opening/closing valve. The electromagnetic valve (7a) is disposed to stop refrigerant flow during the thermo-off (stop) operation. On the other hand, a gas side of the cold storage heat exchanger (45) is connected to the low-pressure gas pipe (15).

The cold storage heat exchanger (45) is in fluid communication with a suction side of the compression mechanism (2D) of the first system while, on the other hand, the indoor heat exchanger (41) is in fluid communication with a suction side of the second noninverter compressor (2C) during the space cooling mode operation. The refrigerant pressure (evaporation pressure) in the cold storage heat exchanger (45) falls below the refrigerant pressure (evaporation pressure) in the indoor heat exchanger (41). As a result, the evaporation temperature of refrigerant in the cold storage heat exchanger (45) is, for example, minus 10 degrees Centigrade while, on the other hand, the evaporation temperature of refrigerant in the indoor heat exchanger (41) is, for example, plus 5 degrees Centigrade, and the refrigerant circuit (1E) constitutes a circuit in which refrigerant evaporates at different temperatures.

The cold storage expansion valve (46) is a thermal expansion valve provided with a temperature sensing tube mounted to the gas side of the cold storage heat exchanger (45). Therefore, the valve opening of the cold storage expansion valve (46) is controlled based on the temperature of refrigerant at the exit side of the cold storage heat exchanger (45). The cold storage heat exchanger (45) is implemented, for example, by a fin and tube heat exchanger of the cross fin type, and a cold storage fan (47) which is a cooling fan is disposed in the vicinity of the cold storage heat exchanger (45).

Freeze Unit

The freeze storage unit (1D) is provided with a freeze storage heat exchanger (51) which is a first utilization-side heat exchanger, a freeze storage expansion valve (52) which is an expansion mechanism, and a booster compressor (53) which is a freeze storage compressor. A branch liquid pipe (13), branched off from the first branch pipe (11a) of the first communication line (11A), is connected to a liquid side of the freeze storage heat exchanger (51) through an electromagnetic valve (7b) and the freeze storage expansion valve (52).

A gas side of the freeze storage heat exchanger (51) and a suction side of the booster compressor (53) are connected together by a connecting gas pipe (54). Connected to a discharge side of the booster compressor (53) is a branch gas pipe (16) which is a shunt from the low-pressure gas pipe (15). The branch gas pipe (16) is provided with a check valve (7) and an oil separator (55). Connected between the oil separator (55) and the connecting gas pipe (54) is an oil return pipe (57) having a capillary tube (56).

Together with the compression mechanisms (2D) of the first system, the booster compressor (53) double-compresses refrigerant so that the evaporation temperature of refrigerant in the freeze storage heat exchanger (51) falls below the evaporation temperature of refrigerant in the cold storage heat exchanger (45). The evaporation temperature of refrigerant in the freeze storage heat exchanger (51) is set, for example, at minus 35 degrees Centigrade.

Meanwhile, the freeze storage expansion valve (52) is a thermal expansion valve and its temperature sensing tube is mounted to a gas side of the cold storage heat exchanger (45). The freeze storage heat exchanger (51) is implemented, for example, by a fin and tube heat exchanger of the cross fin type, and a freeze storage fan (58) which is a cooling fan is disposed in the vicinity of the freeze storage heat exchanger (51).

Connected between the connecting gas pipe (54) which is a suction side of the booster compressor (53) and a downstream side of the check valve (7) of the branch gas pipe (16) which is a discharge side of the booster compressor (53) is a bypass pipe (59) having a check valve (7). The bypass pipe (59) is configured so that when the booster compressor (53) is in the stopped state (for example, when the booster compressor (53) fails to operate properly and stops operating), refrigerant flows, bypassing the booster compressor (53).

Control System

The refrigerant circuit (1E) is provided with various sensors and various switches. The high-pressure gas pipe (8) of the outdoor unit (1A) is provided with a high pressure sensor (61) which is a pressure detecting means for detection of the pressure of high-pressure refrigerant and a discharge temperature sensor (62) which is a temperature detecting means for detection of the temperature of high-pressure refrigerant. The discharge pipe (5c) of the second noninverter compressor (2C) is provided with a discharge temperature sensor (63) which is a temperature detecting means for detection of the temperature of high-pressure refrigerant. In addition, the discharge pipes (5a, 5b, 5c) of the inverter compressor (2A), the first noninverter compressor (2B), and the second noninverter compressor (2C) are each provided with a respective pressure switch (64) which enters the open state whenever the pressure of high-pressure refrigerant reaches a predetermined pressure level.

The suction pipe (6a) of the inverter compressor (2A) is provided with a low pressure sensor (65) which is a pressure detecting means for detection of the pressure of low-pressure refrigerant and a suction temperature sensor (67) which is a temperature detecting means for detection of the temperature of low-pressure refrigerant. Likewise, the suction pipe (6c) of the second noninverter compressor (2C) is provided with a low pressure sensor (66) and a suction temperature sensor (68).

The outdoor heat exchanger (4) is provided with an outdoor heat exchange sensor (69) which is a temperature detecting means for detection of the temperature of refrigerant (i.e., the evaporation or condensation temperature of refrigerant) in the outdoor heat exchanger (4). In addition, the outdoor unit (1A) is provided with an outside air temperature sensor (70) which is a temperature detecting means for detection of the temperature of outdoor air.

The indoor heat exchanger (41) is provided with an indoor heat exchange sensor (71) which is a temperature detecting means for detection of the temperature of refrigerant (i.e., the evaporation or condensation temperature of refrigerant) in the indoor heat exchanger (41). The indoor heat exchanger (41) further has, at its gas side, a gas temperature sensor (72) which is a temperature detecting means for detection of the temperature of gas refrigerant. In addition, the indoor unit (1B) is provided with a room temperature sensor (73) which is a temperature detecting means for detection of the temperature of indoor air.

The cold storage unit (1C) is provided with a cold storage temperature sensor (74) which is a temperature detecting means for detection of the inside temperature of the cold storage showcase. The freeze storage unit (1D) is provided with a freeze storage temperature sensor (75) which is a temperature detecting means for detection of the inside temperature of the freeze storage showcase. In addition, the booster compressor (53) has, at its discharge side, a pressure switch (64) which is opened whenever the pressure of discharged refrigerant reaches a predetermined pressure level.

Output signals from the sensors and switches are input to a controller (80). The controller (80) is configured so as to control the operation of the refrigerant circuit (1E) and to provide eight different operation modes (described later) in a switching manner. And, during the operation of the refrigeration apparatus (1), the controller (80) controls the inverter compressor (2A) so that it is started, stopped, and capacity-controlled; the controller (80) controls the first and second noninverter compressors (2B) and (2C) so that they are started and stopped; and the controller (80) provides control to adjust the valve opening of each of the outdoor expansion valve (26) and the indoor expansion valve (42). Further, the controller (80) controls: the switching of each of the four-way switch valves (3A, 3B, 3C); the opening/closing operation of each of the electromagnetic valves (SV0, SV1, SV2, SV3, SV4, SV5) disposed in the oil return pipes (31a, 31b) and the oil level equalizing pipes (32, 33, 34, 35) respectively; and the valve opening of the electronic expansion valve (29) of the liquid injection pipe (27).

Communication Line

The liquid-side communication lines (11A, 11B) are arranged into a single pipe, i.e., the main flow pipe (11), at where they just leave the outdoor unit (1A). This single main flow pipe (11) is shared between two different liquid lines, namely a first system-side circuit for cold storage/freeze storage and a second system-side circuit for air conditioning. The main flow pipe (11) branches off, in the vicinity of each of the utilization-side units (1B, 1C, 1D), into the branch pipe (11a) of the first system and the branch pipe (11b) of the second system. And, the main flow pipe (11) and the first branch pipe (11a) together constitute the first communication liquid pipe (11A) while, on the other hand, the main flow pipe (11) and the second branch pipe (11b) together constitute the second communication liquid pipe (11B).

The main flow pipe (11) and the low-pressure gas pipe (15) which is a suction gas line in the first system-side circuit for cold storage and freeze storage are laid out side by side in contacting relationship with each other. And, a tape material (12) of aluminum as a heat transfer material is wrapped around the main flow pipe (11) and the low-pressure gas pipe (15), in other words these two communication lines (11, 15) are covered by the heat transfer material (12). Thereby, a contacting portion of the communication lines (11, 15) constitutes a heat exchanger for effecting heat exchange between the liquid refrigerant and the low-pressure gas refrigerant.

After installation of the outdoor unit (1A), the indoor unit (1B), the cold storage unit (1C), and the freeze storage unit (1D), connections between the unit (1A) and the units (1B, 1C, 1D) are established by the three communication pipes (11, 15, 17). Then, the stop valves (20) are placed in the open state, thereby establishing a state that allows refrigerant to circulate through the refrigerant circuit (1E) in the refrigeration apparatus (1). Although, in the refrigeration apparatus (1), the refrigerant circuit (1E) has the first system for cold storage and freeze storage and the second system for air conditioning, the single main flow pipe (11) of the first and second communication liquid pipes (11A, 11B) is shared between the first and second systems, thereby making the connection work of pipes easier than when each system has a respective communication liquid pipe.

Operation Modes

Hereafter, how the refrigeration apparatus (1) operates is described for each operation mode. In the first embodiment, it is configured that, for example, eight different operation modes are settable. More specifically, it is possible for the refrigerant apparatus (1) to perform:

(i) a cooling operation mode during which only space cooling by the indoor unit (1B) is provided;

(ii) a refrigeration operation mode during which only refrigeration by the cold storage unit (1C) and the freeze storage unit (1D) is provided;

(iii) a first cooling/refrigeration operation mode during which the indoor unit (1B) provides space cooling while, simultaneously, the cold storage unit (1C) and the freeze storage unit (1D) each provide refrigeration;

(iv) a second cooling/refrigeration operation mode which is an operation mode which is carried out if the capability to provide space cooling of the indoor unit (1B) becomes insufficient during the first cooling/refrigeration operation mode;

(v) a heating operation mode during which only space heating by the indoor unit (1B) is provided;

(vi) a first heating/refrigeration operation mode during which space heating by the indoor unit (1B) and refrigeration by the cold storage unit (1C) and the freeze storage unit (1D) are provided by a heat recovery operation without using the outdoor heat exchanger (4);

(vii) a second heating/refrigeration operation mode which is a heating capability excess operation mode which is carried out if the capability to provide space heating of the indoor unit (1B) becomes surplus during the first heating/refrigeration operation mode; and (viii) a third heating/refrigeration operation mode which is an operation mode lacking in heating capacity that is carried out if the capability to provide space heating of the indoor unit (1B) becomes deficient during the first heating/refrigeration operation mode.

Hereafter, each of the operation modes is described more specifically.

Cooling Operation Mode

Figure 2:
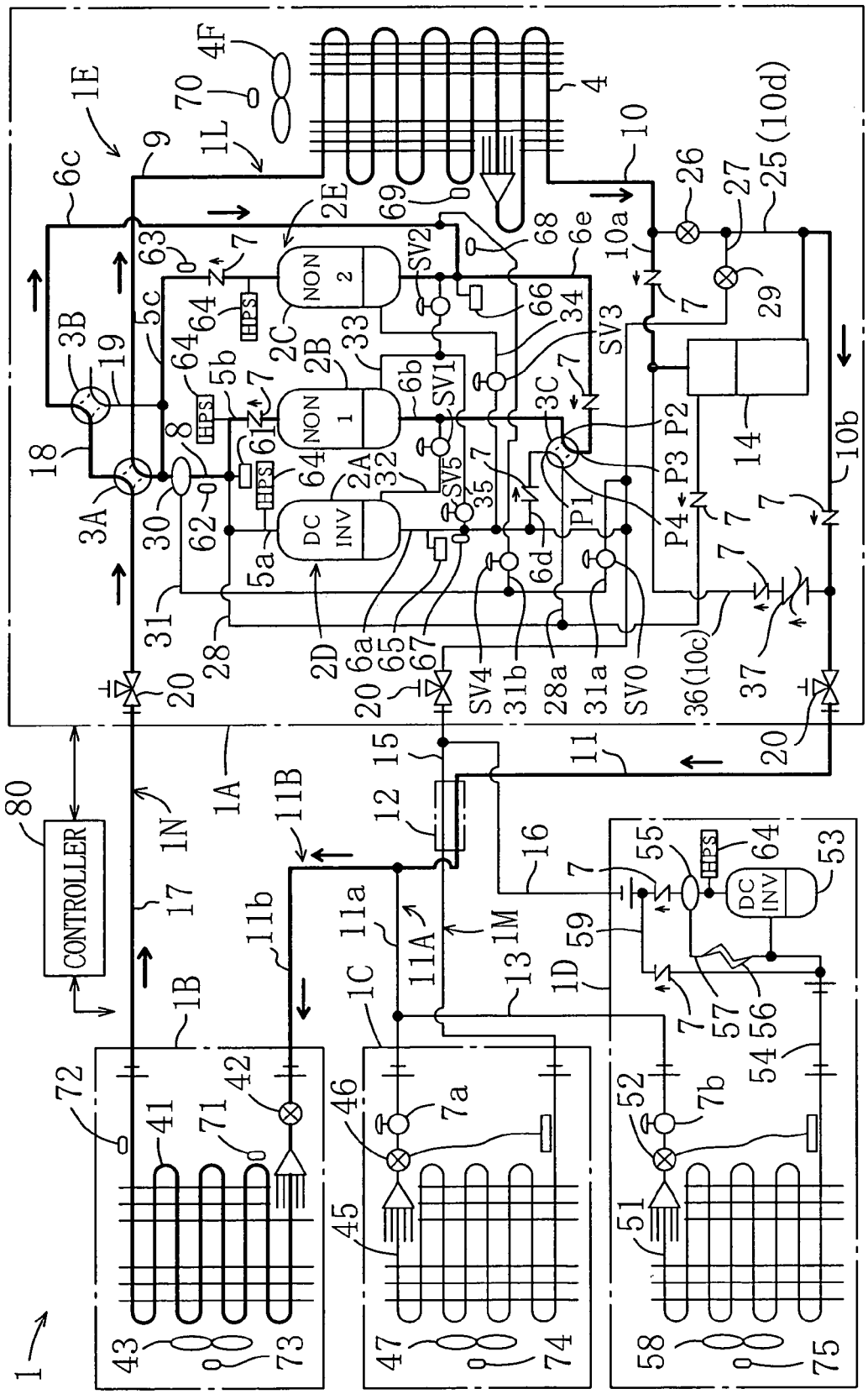
FIG. 2 is a refrigerant circuit diagram showing a cooling mode of operation in the first embodiment.

In the cooling operation mode, only space cooling by the indoor unit (1B) is provided. During the cooling operation mode, the inverter compressor (2A) alone constitutes the compression mechanism (2D) of the first system while, on the other hand, the first noninverter compressor (2B) and the second noninverter compressor (2C) together constitute the compression mechanism (2E) of the second system, as shown in FIG. 2. And, only the first and second noninverter compressors (2B, 2C), i.e., the compression mechanism (2E), are activated.

In addition, as indicated by the solid line of FIG. 2, the first and second four-way switch valves (3A, 3B) are each switched into the first state while, on the other hand, the third four-way switch valve (3C) is switched into the second state. In addition, the outdoor expansion valve (26), the electronic expansion valve (29) of the liquid injection pipe (27), the electromagnetic valve (7a) of the cold storage unit (1C), and the electromagnetic valve (7b) of the freeze storage unit (1D) are all closed.

In this state, refrigerant expelled from each of the first and second noninverter compressors (2B, 2C) passes through the first four-way switch valve (3A) and then through the outdoor gas pipe (9), flows into the outdoor heat exchanger (4), and is condensed to form liquid refrigerant. The condensed liquid refrigerant flows through the liquid pipe (10), then through the receiver (14), then through the main flow pipe (11) of the communication liquid pipes (11A, 11B), passes through the second branch pipe (11b), flows into the indoor heat exchanger (41) from the indoor expansion valve (42), and is evaporated to form gas refrigerant. The evaporated gas refrigerant flows through the communication gas pipe (17), then through the first four-way switch valve (3A), and then through the second four-way switch valve (3B), and flows through the suction pipe (6c) of the second noninverter compressor (2C). A portion of this low-pressure gas refrigerant is directed back to the second noninverter compressor (2C) while, on the other hand, the remaining gas refrigerant is branched off from the suction pipe (6c) of the second noninverter compressor (2C) into the branch pipe (6e) and is directed back to the first noninverter compressor (2B) by way of the third four-way switch valve (3C). By repetition of such a refrigerant circulation, space cooling is provided in the shop.

In this operation state, the start/stop of the first and second noninverters (2B, 2C) and the valve opening of the indoor expansion valve (42) are controlled depending on the indoor cooling load. Only one of the compressors (2B, 2C) may be operated.

Refrigeration Operation Mode

Figure 3:
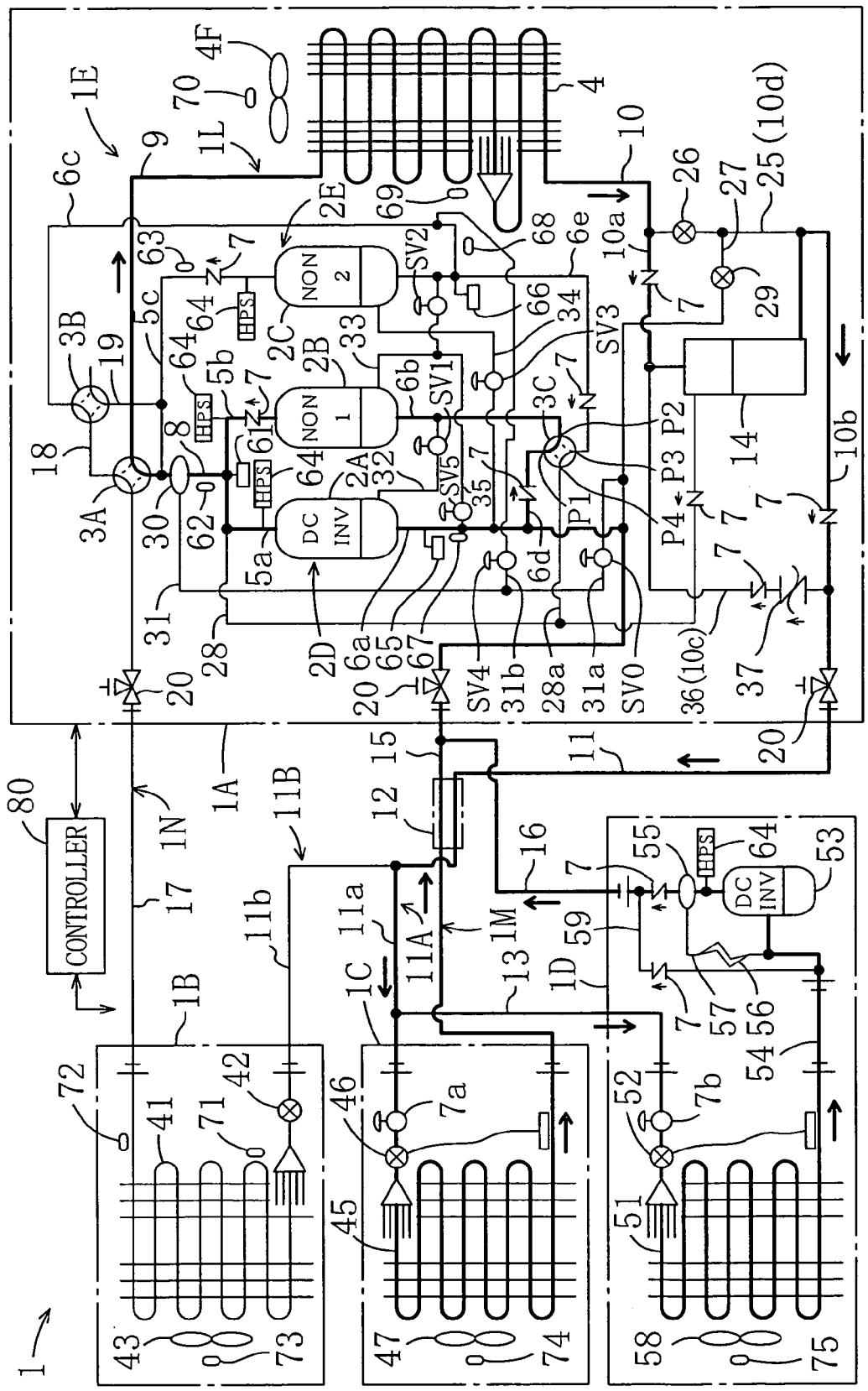
FIG. 3 is a refrigerant circuit diagram showing a refrigeration mode of operation in the first embodiment.

The refrigeration operation mode is an operation mode during which only refrigeration by the cold storage unit (1C) and the freeze storage unit (1D) is provided. During the refrigeration operation mode, the inverter compressor (2A) and the first noninverter compressor (2B) together constitute the compression mechanism (2D) of the first system while, on the other hand, the second noninverter compressor (2C) alone constitutes the compression mechanism (2E) of the second system, as shown in FIG. 3. And, the inverter compressor (2A) and the first noninverter compressor (2B), i.e., the compression mechanism (2D) of the first system, are activated together with the booster compressor (53), and the second noninverter compressor (2C) is at rest.

In addition, as indicated by the solid line of FIG. 3, the first four-way switch valve (3A) and the second four-way switch valve (3B) are each switched into the first state, and the third four-way switch valve (3C) is also switched into the first state. Further, the electromagnetic valve (7a) of the cold storage unit (1C) and the electromagnetic valve (7b) of the freeze storage unit (11) are opened while, on the other hand, the outdoor expansion valve (26) and the indoor expansion valve (42) are closed. In addition, the valve opening of the electronic expansion valve (29) of the liquid injection pipe (27) is set to such a predetermined amount that liquid refrigerant flows at a predetermined flow rate.

In this state, refrigerant expelled from each of the inverter compressor (2A) and the first noninverter compressor (2B) passes through the first four-way switch valve (3A) and then through the outdoor gas pipe (9), flows into the outdoor heat exchanger (4), and is condensed into liquid refrigerant. The condensed liquid refrigerant flows through the liquid pipe (10), passes through the receiver (14), flows through the main flow pipe (11) of the communication liquid pipes (11A, 11B) and then through the first branch pipe (11a), wherein one portion of the liquid refrigerant passes through the cold storage expansion valve (46), flows into the cold storage heat exchanger (45), and is evaporated into gas refrigerant.

On the other hand, the other portion of the liquid refrigerant flowing through the first branch pipe (11a) flows through the branch liquid pipe (13), passes through the freeze storage expansion valve (52), flows into the freeze storage heat exchanger (51), and is evaporated into gas refrigerant. The gas refrigerant evaporated in the freeze storage heat exchanger (51) is drawn into the booster compressor (53) and, after being compressed, is discharged to the branch gas pipe (16).

The gas refrigerant evaporated in the cold storage heat exchanger (45) and the gas refrigerant expelled from the booster compressor (53) flow into each other in the low-pressure gas pipe (15), and return to the inverter compressor (2A) and to the first noninverter compressor (2B). By repetition of such a refrigerant circulation, the inside of the cold storage showcase and the inside of the freeze storage showcase are refrigerated.

Because of suction by the booster compressor (53), the pressure of refrigerant in the freeze storage heat exchanger (51) falls below the pressure of refrigerant in the cold storage heat exchanger (45). As a result, for example, the temperature (evaporation temperature) of refrigerant in the freeze storage heat exchanger (51) is minus 35 degrees Centigrade while, on the other hand, the temperature (evaporation temperature) of refrigerant in the cold storage heat exchanger (45) becomes minus 10 degrees Centigrade.

During the refrigeration operation mode, the start and stop of the first noninverter compressor (2B) and the start, stop or capacity of the inverter compressor (2A) are controlled, for example, based on the pressure of low-pressure refrigerant (LP) detected by the low pressure sensor (65), and operations according to the refrigeration load are performed.

For example, control of increasing the capacity of the compression mechanism (2D) is provided as follows. First, the inverter compressor (2A) is activated with the first noninverter compressor (2B) placed in the stopped state. If, after the capacity of the inverter compressor (2A) is increased to a maximum, the load increases further, then the inverter compressor (2B) is activated while, simultaneously, the capacity of the inverter compressor (2A) is decreased to a minimum. Then, if the load increases still further, the capacity of the inverter compressor (2A) is increased, with the first noninverter compressor (2B) still being activated. For the case of control for the reduction of compressor capacity, operations opposite to the aforesaid control for the increase of compressor capacity are performed.

The valve opening of each of the cold storage expansion valve (46) and the freeze storage expansion valve (52) is degree-of-superheat controlled by the respective temperature sensing tubes. This is the same as in each of the following operation modes.

When refrigerant circulates through the refrigerant circuit (1E) during the operation, liquid refrigerant flowing through the main flow pipe (11) of the communication liquid pipes (11A, 11B) exchanges heat with low-pressure gas refrigerant flowing through the low-pressure gas pipe (15), and is supercooled. Because of this, the refrigerant enthalpy difference in the cold storage heat exchanger (45) and the freeze storage heat exchanger (51) becomes greater, when compared to the case where supercooling is not conducted, and their capability to provide refrigeration is enhanced to higher levels.

On the other hand, even when gas refrigerant on the suction side increases in the degree of superheat by heat exchange with liquid refrigerant, it is possible to prevent the degree of superheat of the refrigerant from becoming excessively great in the compression mechanism (2D) by mixing of the liquid refrigerant with liquid refrigerant from the liquid injection pipe (27).

First Cooling/Refrigeration Operation Mode

Figure 4:
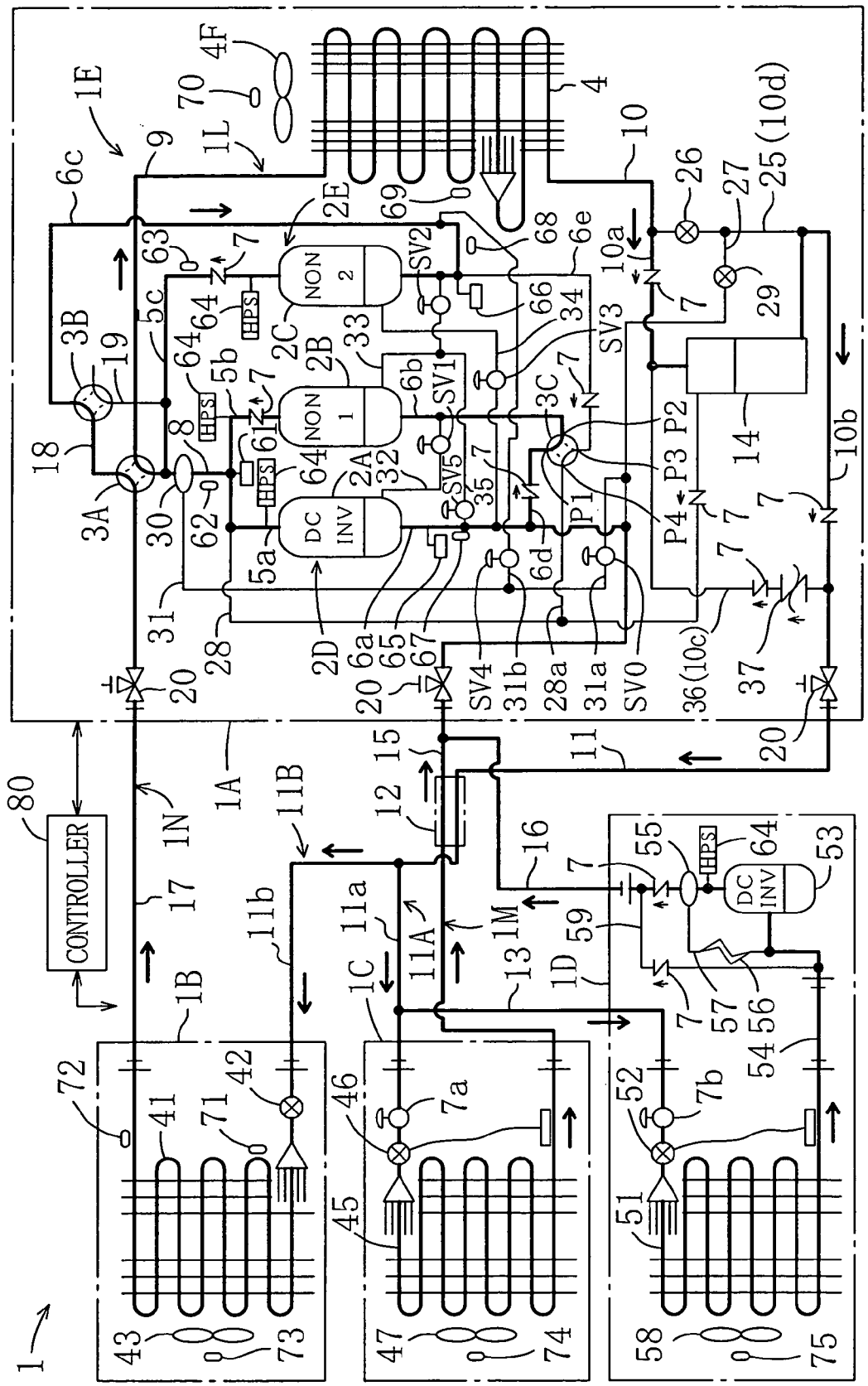
FIG. 4 is a refrigerant circuit diagram showing a first cooling/refrigeration mode of operation in the first embodiment.

The first cooling/refrigeration operation mode is an operation mode during which space cooling by the indoor unit (1B) is provided simultaneously with refrigeration by the cold storage unit (1C) and the freeze storage unit (1D). As shown in FIG. 4, during the first cooling/refrigeration operation mode, the inverter compressor (2A) and the first noninverter compressor (2B) together constitute the compression mechanism (2D) of the first system while, on the other hand, the second noninverter compressor (2C) alone constitutes the compression mechanism (2E) of the second system. And, the inverter compressor (2A), the first noninverter compressor (2B), and the second noninverter compressor (2C) are all activated and, in addition, the booster compressor (53) is also activated.

In addition, the first four-way switch valve (3A), the second four-way switch valve (3B), and the third four-way switch valve (3C) are each switched into the first state. Further, the electromagnetic valve (7a) of the cold storage unit (1C) and the electromagnetic valve (7b) of the freeze storage unit (1D) are opened while, on the other hand, the outdoor expansion valve (26) remains in the closed state. The valve opening of the electronic expansion valve (29) of the liquid injection pipe (27) is controlled so that liquid refrigerant is supplied, at a predetermined flow rate, to the suction side of the compression mechanism (2D).

In this state, refrigerant expelled from the inverter compressor (2A), refrigerant expelled from the first noninverter compressor (2B), and refrigerant expelled from the second noninverter compressor (2C) flow into each other in the high pressure gas pipe (8), pass through the first four-way switch valve (3A) and then through the outdoor gas pipe (9), flow into the outdoor heat exchanger (4), and are condensed to form liquid refrigerant. The condensed liquid refrigerant flows through the liquid pipe (10), passes through the receiver (14), and flows through the main flow pipe (11) of the communication liquid pipes (11A, 11B).

One portion of the liquid refrigerant flowing through the main flow pipe (11) of the communication liquid pipes (11A, 11B) branches off into the second branch pipe (11b), passes through the indoor expansion valve (42), flows into the indoor heat exchanger (41), and is evaporated to form gas refrigerant. The evaporated gas refrigerant passes through the communication gas pipe (17), then through the first four-way switch valve (3A), and then through the second four-way switch valve (3B), flows through the suction pipe (6c), and returns to the second noninverter compressor (2C).

On the other hand, one portion of the liquid refrigerant flowing through the main flow pipe (11) of the communication liquid pipes (11A, 11B) branches off into the first branch pipe (11a). One portion of the liquid refrigerant thus branched off flows into the cold storage heat exchanger (45) by way of the cold storage expansion valve (46), and is evaporated to form gas refrigerant. The other portion of the liquid refrigerant flowing through the first branch pipe (11a) branches off into the branch liquid pipe (13) and flows into the freeze storage heat exchanger (51) by way of the freeze storage expansion valve (52), and is evaporated to form gas refrigerant. The gas refrigerant evaporated in the freeze storage heat exchanger (51) is drawn into the booster compressor (53) and, after being compressed, is discharged to the branch gas pipe (16).

The gas refrigerant evaporated in the cold storage heat exchanger (45) and the gas refrigerant expelled from the booster compressor (53) flow into each other in the low-pressure gas pipe (15) and return to the inverter compressor (2A) and to the first noninverter compressor (2B).

By repetition of such a refrigerant circulation, the inside of the shop is air conditioned to lower temperatures and, at the same time, the inside of the cold storage showcase and the inside of the freeze storage showcase are refrigerated.

Figure 5:
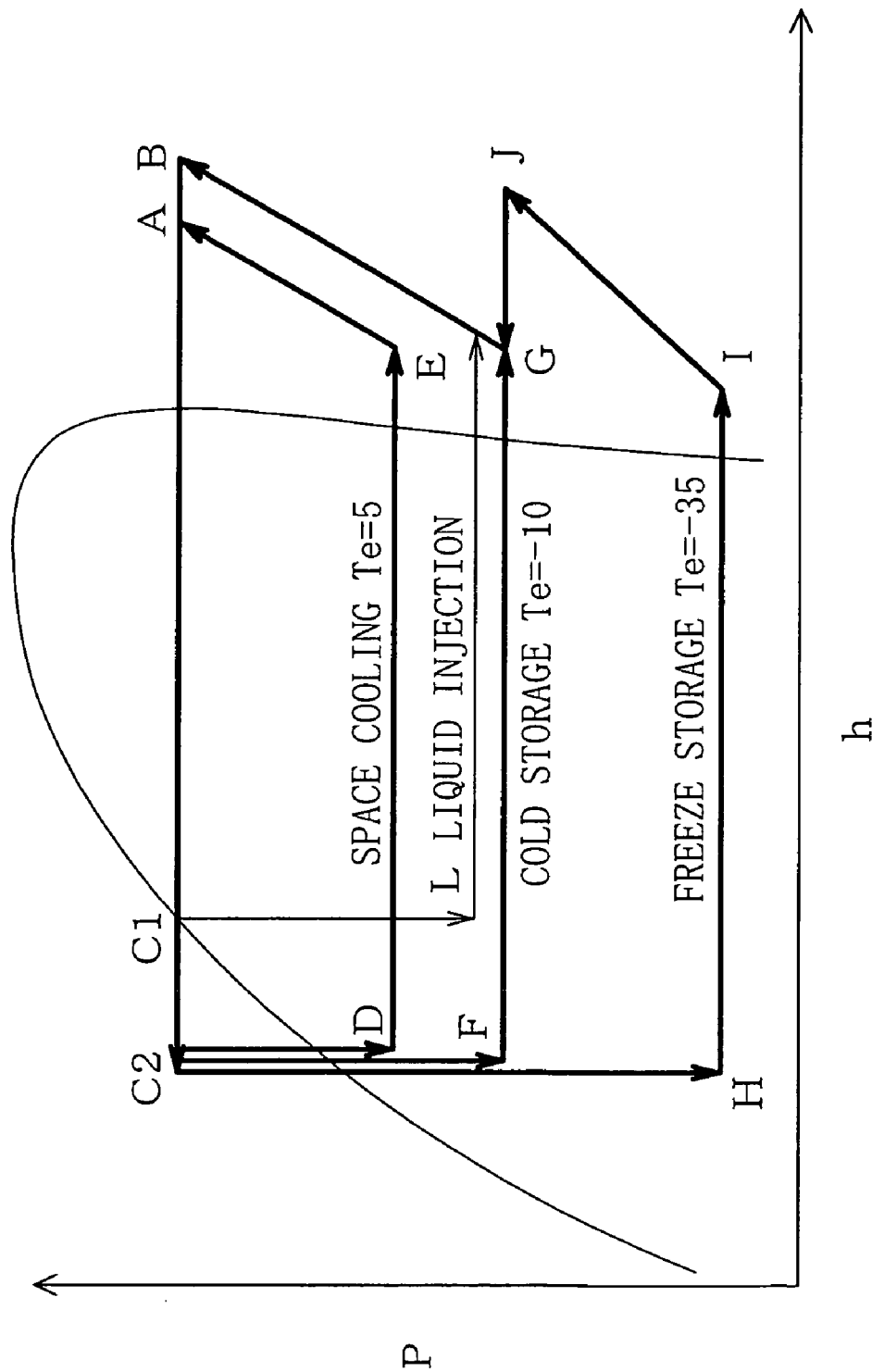
FIG. 5 is a Mollier chart showing a behavior of refrigerant during the first cooling/refrigeration mode of operation in the first embodiment.

The behavior of refrigerant during the first cooling/refrigeration operation mode is discussed by making reference to a Mollier chart shown in FIG. 5.

First, refrigerant is compressed to POINT A by the second noninverter compressor (2C). Refrigerant is compressed to POINT B by the inverter compressor (2A) and the first noninverter compressor (2B). The refrigerant at POINT A and the refrigerant at POINT B flow into each other and are condensed to form a refrigerant at POINT C1. The refrigerant at POINT C1 exchanges heat with suction gas refrigerant into the inverter compressor (2A) and the first noninverter compressor (2B) and becomes a refrigerant in the supercool state (POINT C2).

A portion of the refrigerant at POINT C2 is decompressed to POINT D by the indoor expansion valve (42), and evaporates, for example, at plus 5 degrees Centigrade, and is drawn into the second noninverter compressor (2C) at POINT E.

A portion of the refrigerant at POINT C2 is decompressed to POINT F by the cold storage expansion valve (46), and evaporates, for example, at minus 10 degrees Centigrade.

Since the portion of the refrigerant at POINT C2 is drawn by the booster compressor (53), it is decompressed to POINT H by the freeze storage expansion valve (52), evaporates, for example, at minus 35 degrees Centigrade, and is drawn into the booster compressor (53) at POINT I. The refrigerant compressed to POINT J by the booster compressor (53) and the refrigerant from the cold storage heat exchanger (45) flow into each other and, in addition, a portion of the liquid refrigerant at POINT C1 is mixed therewith after it is decompressed to POINT L by the electronic expansion valve (29) (liquid injection). Then, the refrigerant changes state to POINT G and, thereafter, is drawn into the first inverter compressor (2A) and into the second noninverter compressor (2B).

As just described above, the refrigerant in the refrigerant circuit (1E) is evaporated at different temperatures by the compression mechanism (2D) of the first system and the compression mechanism (2E) of the second system, and by virtue of the booster compressor's (53) double compression, there are three different evaporation temperatures.

In addition, when refrigerant circulates during the operation, liquid refrigerant flowing through the main flow pipe (11) of the communication liquid pipes (11A, 11B) exchanges heat with low-pressure gas refrigerant flowing through the low-pressure gas pipe (15) and, as a result, is supercooled. Because of this, the refrigerant enthalpy difference in the air conditioning heat exchanger (41), the cold storage heat exchanger (45), and the freeze storage heat exchanger (51) becomes greater, when compared to the case where supercooling is not conducted, and the capability to provide refrigeration is enhanced to higher levels.

Besides, liquid refrigerant is mixed with gas refrigerant on the suction side by means of liquid injection, thereby preventing the degree of superheat of the refrigerant from becoming excessively great in the compression stroke.

Second Cooling/Refrigeration Operation Mode

Figure 6:
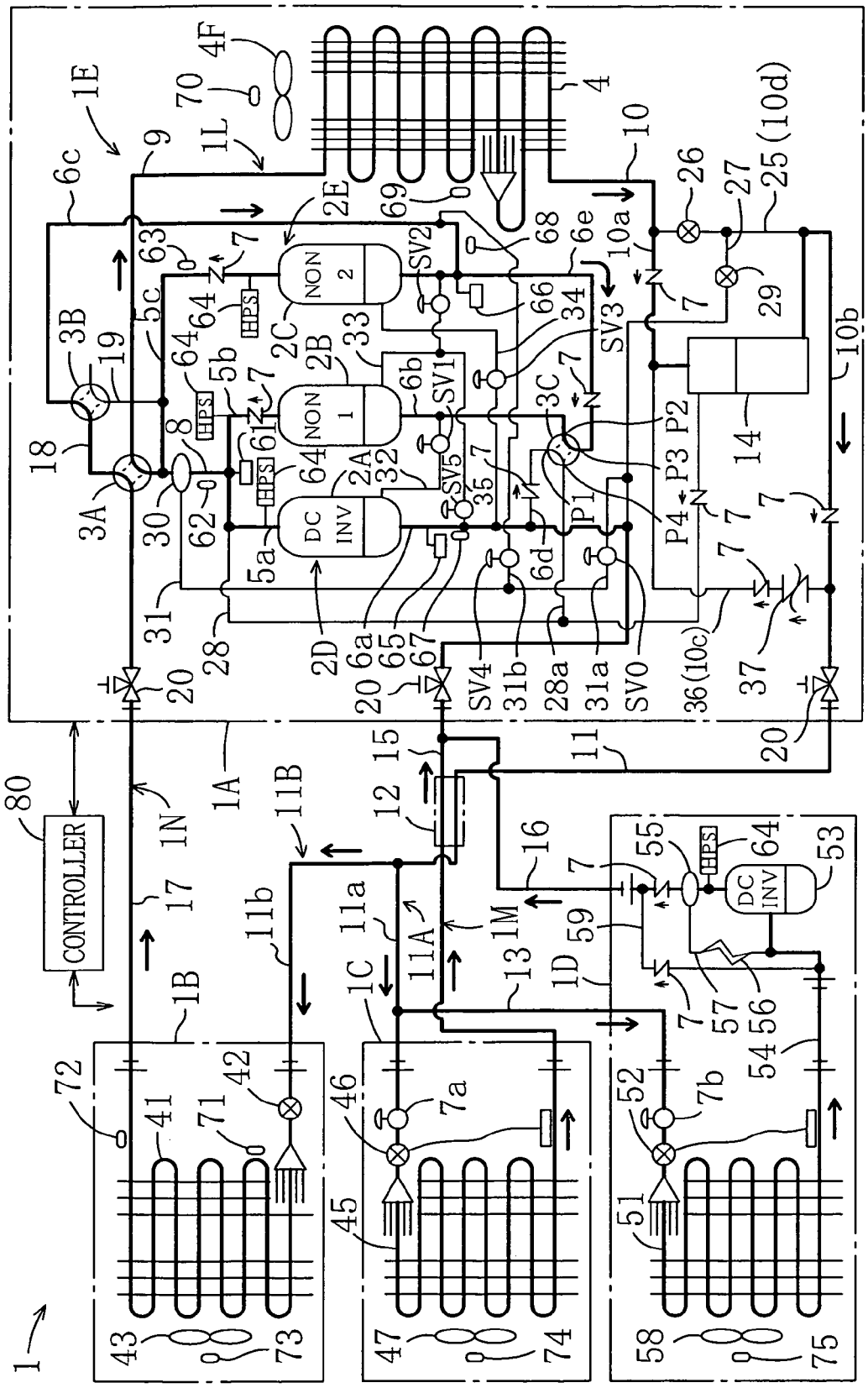
FIG. 6 is a refrigerant circuit diagram showing a second cooling/refrigeration mode of operation in the first embodiment.

The second cooling/refrigeration operation mode is an operation mode which is carried out if the capability to provide space cooling of the indoor unit (1B) during the first cooling/refrigeration operation mode becomes deficient. The second cooling/refrigeration operation mode is also an operation mode in which the first noninverter compressor (2B) is switched to the air conditioning side. Referring to FIG. 6, the setting during the second cooling/refrigeration operation mode is basically the same as the setting during the first cooling/refrigeration operation, with the exception that the third four-way switch valve (3C) is switched into the second state.

Accordingly, during the second cooling/refrigeration operation mode, refrigerant expelled from each of the inverter compressor (2A), the first noninverter compressor (2B), and the second noninverter compressor (2C) is condensed in the outdoor heat exchanger (4) and is evaporated in the indoor heat exchanger (41), the cold storage heat exchanger (45), and the freeze storage heat exchanger (51), respectively, as in the first cooling/refrigeration operation mode.

Then, the refrigerant evaporated in the indoor heat exchanger (41) is directed back to the first noninverter compressor (2B) and to the second noninverter compressor (2C) while, on the other hand, the refrigerant evaporated in the cold storage heat exchanger (45) and the refrigerant evaporated in the freeze storage heat exchanger (51) return to the inverter compressor (2A). By use of two compressors, i.e., the compressors (2B, 2C), for air conditioning, a deficiency in the capability to provide space cooling is compensated.

The specific description of control of the switching between the first cooling/refrigeration operation mode and the second cooling/refrigeration operation mode is omitted here.

Also in the second cooling/refrigeration operation mode, it is possible to accomplish improvement in capability by liquid refrigerant supercool.

Heating Operation Mode

Figure 7:
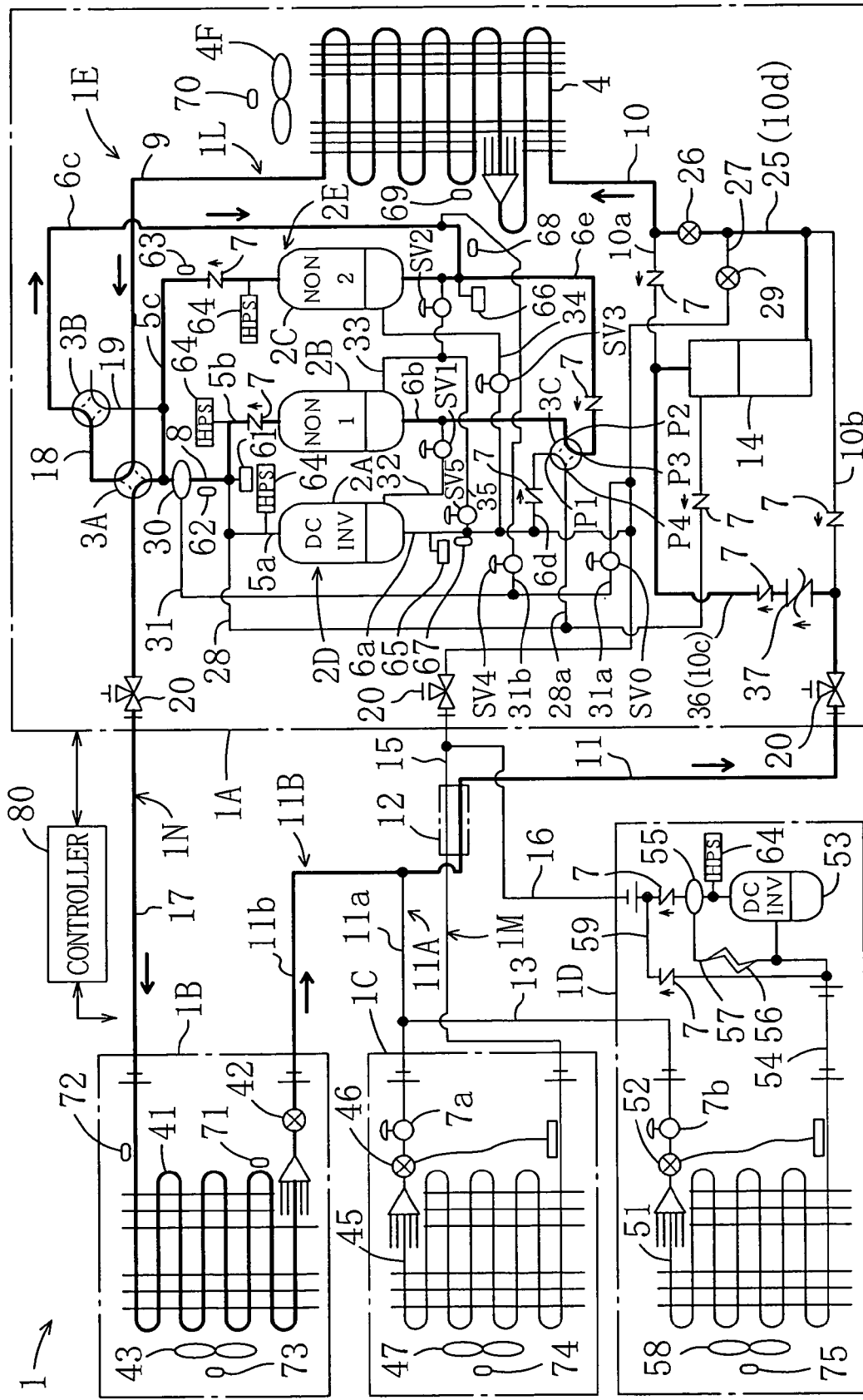
FIG. 7 is a refrigerant circuit diagram showing a heating mode of operation in the first embodiment.

The heating operation mode is an operation mode during which only space heating by the indoor unit (1B) is provided. During the heating operation mode, the inverter compressor (2A) alone constitutes the compression mechanism (2D) of the first system while, on the other hand, the first noninverter compressor (2B) and the second noninverter compressor (2C) together constitute the compression mechanism (2E) of the second system, as shown in FIG. 7. And, only the first and second noninverter compressors (2B, 2C), i.e., the compression mechanism (2E) of the second system, are activated.

Further, as indicated by the solid line of FIG. 7, the first four-way switch valve (3A) is switched into the second state; the second four-way switch valve (3B) is switched into the first state; and the third four-way switch valve (3C) is switched into the second state. On the other hand, the electronic expansion valve (29) of the liquid injection pipe (27), the electromagnetic valve (7a) of the cold storage unit (1C), and the electromagnetic valve (7b) of the freeze storage unit (1D) are all closed. Further, the indoor expansion valve (42) is placed in the open state, and the valve opening of the outdoor expansion valve (26) is controlled to a predetermined amount.

In this state, refrigerant expelled from the first noninverter compressor (2B) and refrigerant expelled from the second noninverter compressor (2C) pass through the first four-way switch valve (3A) and then through the communication gas pipe (17), flow into the indoor heat exchanger (41), and are condensed to form liquid refrigerant. The condensed liquid refrigerant flows through the second branch pipe (11b) of the second communication liquid pipe (1B) and then through the main flow pipe (11), passes through the liquid branch pipe (36) while, simultaneously, forcing the relief valve (37) to open by use of its high pressure, and flows into the receiver (14). Thereafter, the liquid refrigerant flows into the outdoor heat exchanger (4) by way of the outdoor expansion valve (26) of the auxiliary liquid pipe (25), and is evaporated to form gas refrigerant. The evaporated gas refrigerant passes through the outdoor gas pipe (9), then through the first four-way switch valve (3A), and then through the second four-way switch valve (3B), flows through the suction pipe (6c) of the second noninverter compressor (2C), is directed back to the first noninverter compressor (2C) and to the second noninverter compressor (2C). By repetition of such a refrigerant circulation, indoor space heating is provided.

Only one of the compressors (2B, 2C) may be operated, as in the cooling operation mode.

First Heating/Refrigeration Operation Mode

Figure 8:
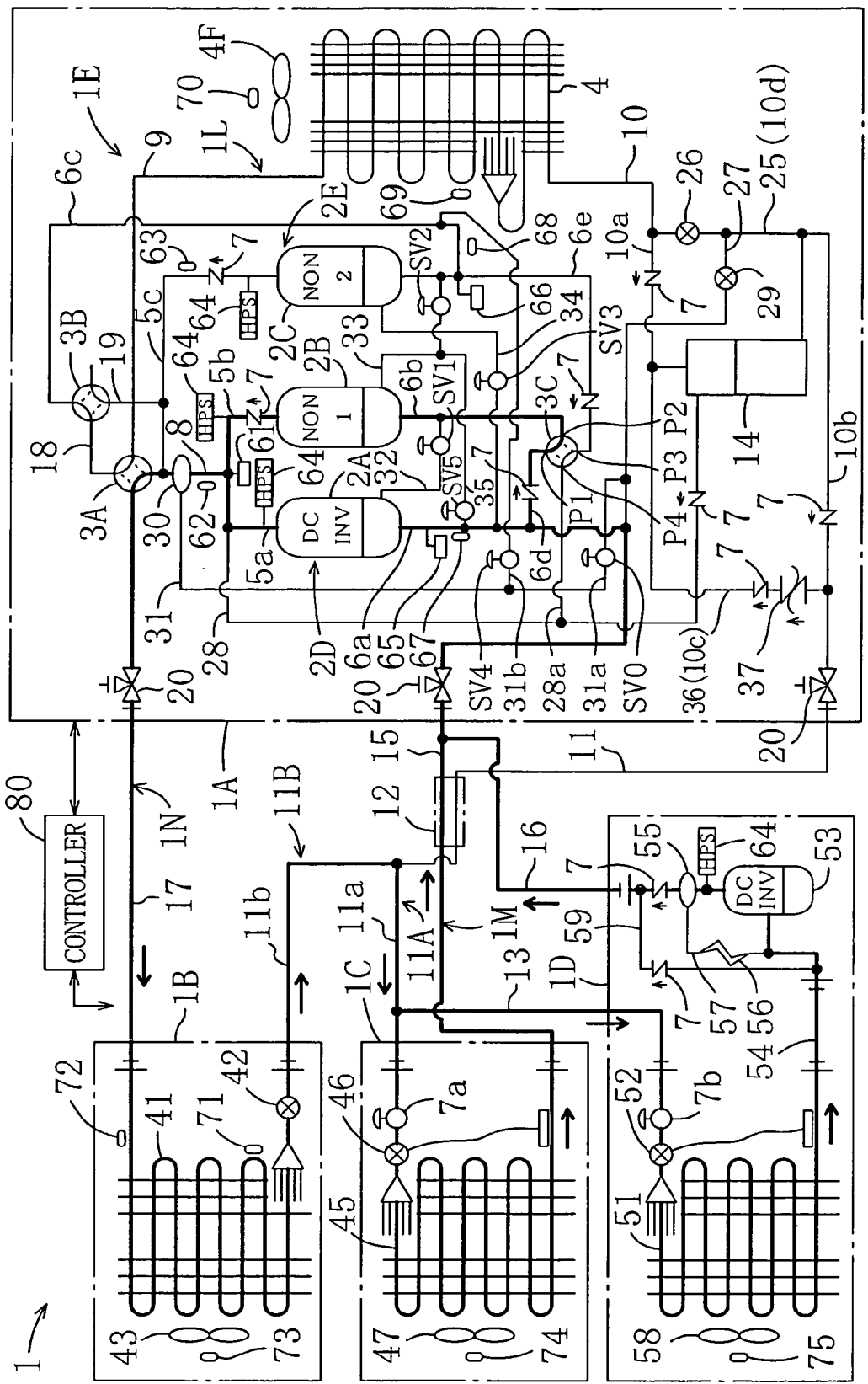
FIG. 8 is a refrigerant circuit diagram showing a first heating/refrigeration mode of operation in the first embodiment.

The first heating/refrigeration operation mode is a heat recovery operation mode during which space heating by the indoor unit (1B) and refrigeration by the cold storage and freeze storage units (1C, 1D) are provided without using the outdoor heat exchanger (4). In the first heating/refrigeration operation mode, as shown in FIG. 8, the inverter compressor (2A) and the first noninverter compressor (2B) together constitute the compression mechanism (2D) of the first system while, on the other hand, the second noninverter compressor (2C) alone constitutes the compression mechanism (2E) of the second system. And, the inverter compressor (2A) and the first noninverter compressor (2B) are activated, and the booster compressor (53) is also activated. The second noninverter compressor (2C) is at rest.

Further, as indicated by the solid line of FIG. 8, the first four-way switch valve (3A) is switched into the second state while, on the other hand, the second four-way switch valve (3B) and the third four-way switch valve (3C) are each switched into the first state. Further, the electromagnetic valve (7a) of the cold storage unit (1C) and the electromagnetic valve (7b) of the freeze storage unit (1D) are opened while, on the other hand, the outdoor expansion valve (26) is closed. The electronic expansion valve (29) of the liquid injection pipe (27) is controlled to a predetermined amount for the purpose of flow rate adjustment.

In this state, refrigerant expelled from each of the inverter compressor (2A) and the first noninverter compressor (2B) passes through the first four-way switch valve (3A) and then through the communication gas pipe (17), flows into the indoor heat exchanger (41), and is condensed to form liquid refrigerant. The condensed liquid refrigerant flows through the second branch pipe (11b) of the communication liquid pipes (11A, 11B) and flows into the first branch pipe (11a) short of the main flow pipe (11).

One portion of the liquid refrigerant flowing through the first branch pipe (11a) flows into the cold storage heat exchanger (45) by way of the cold storage expansion valve (46) and is evaporated to form gas refrigerant. The other portion of the liquid refrigerant flowing through the first branch pipe (11a) flows through the branch liquid pipe (13), flows into the freeze storage heat exchanger (51) by way of the freeze storage expansion valve (52), and is evaporated to form gas refrigerant. The gas refrigerant evaporated in the freeze storage heat exchanger (51) is drawn into the booster compressor (53) and, after being compressed, is discharged to the branch gas pipe (16).

The gas refrigerant evaporated in the cold storage heat exchanger (45), and the gas refrigerant discharged from the booster compressor (53) flow into each other in the low-pressure gas pipe (15) and return to the inverter compressor (2A) and to the first noninverter compressor (2B). By repetition of such a refrigerant circulation, the inside of the cold storage showcase and the inside of the freeze storage showcase are refrigerated while, simultaneously, space heating is provided in the shop. During the first heating/refrigeration operation mode, there is established a balance between the capability to provide refrigeration (the amount of heat of evaporation) of the cold storage and freeze storage units (1C, 1D) and the capability to provide space heating (the amount of heat of condensation) of the indoor unit (1B) and, as a result, 100 percent heat recovery is achieved.

If the amount of liquid refrigerant flowing into the first branch pipe (11*a*) from the second branch pipe (11*b*) is not enough, then additionally liquid refrigerant is drawn into the first branch pipe (11*a*) from the receiver (14) through the main flow pipe (11) of the communication liquid pipes (11A, 11B). This liquid refrigerant is supercooled by low-pressure gas refrigerant at where the main flow pipe (11) of the communication liquid pipes (11A, 11B) and the low-pressure gas pipe (15) are arranged side by side, and flows into the cold storage heat exchanger (45) and to the freeze storage heat exchanger (51). Accordingly, even when a portion of the liquid refrigerant traveling to the first branch pipe (11*a*) from the second branch pipe (11*b*) is flashing, flash gas is condensed into liquid phase and thereafter is supplied to each of the heat exchangers (45, 51).

On the other hand, the pressure within the receiver (14) is lowered when outside air temperatures are low, so that, in the absence of the relief valve (37) positioned in the liquid branch pipe (36), the pressure in the main flow pipe (11) of the communication liquid pipes (11A, 11B) also drops. There is the possibility that liquid refrigerant condensed in the indoor heat exchanger (41) will flow, not towards the cold storage heat exchanger (45) and to the freeze storage heat exchanger (51), but into the receiver (14) by way of the second branch pipe (11*b*) of the second communication liquid pipe (11*b*) and the main flow pipe (11). In the first embodiment, however, it is arranged that the liquid branch pipe (36) is provide with the relief valve (37), thereby making it possible to prevent the inflow of liquid refrigerant into the receiver (14). In other words, by the arrangement that the pressure in the main flow pipe (11) of the communication liquid pipes (11A, 11B) is prevented from becoming low by means of the relief valve (37), it is ensured that liquid refrigerant exiting the indoor heat exchanger (41) is introduced into the cold storage heat exchanger (45) and into the freeze storage heat exchanger (51) and, in addition, it becomes possible to hold sides short of the expansion mechanisms (46, 52) in a full liquid state, and it is ensured that these cold storage and freeze storage heat exchangers (45, 51) are prevented from undergoing a drop in their capability due to the shortage of refrigerant flowing therethrough.

Second Heating/Refrigeration Operation Mode

Figure 9:
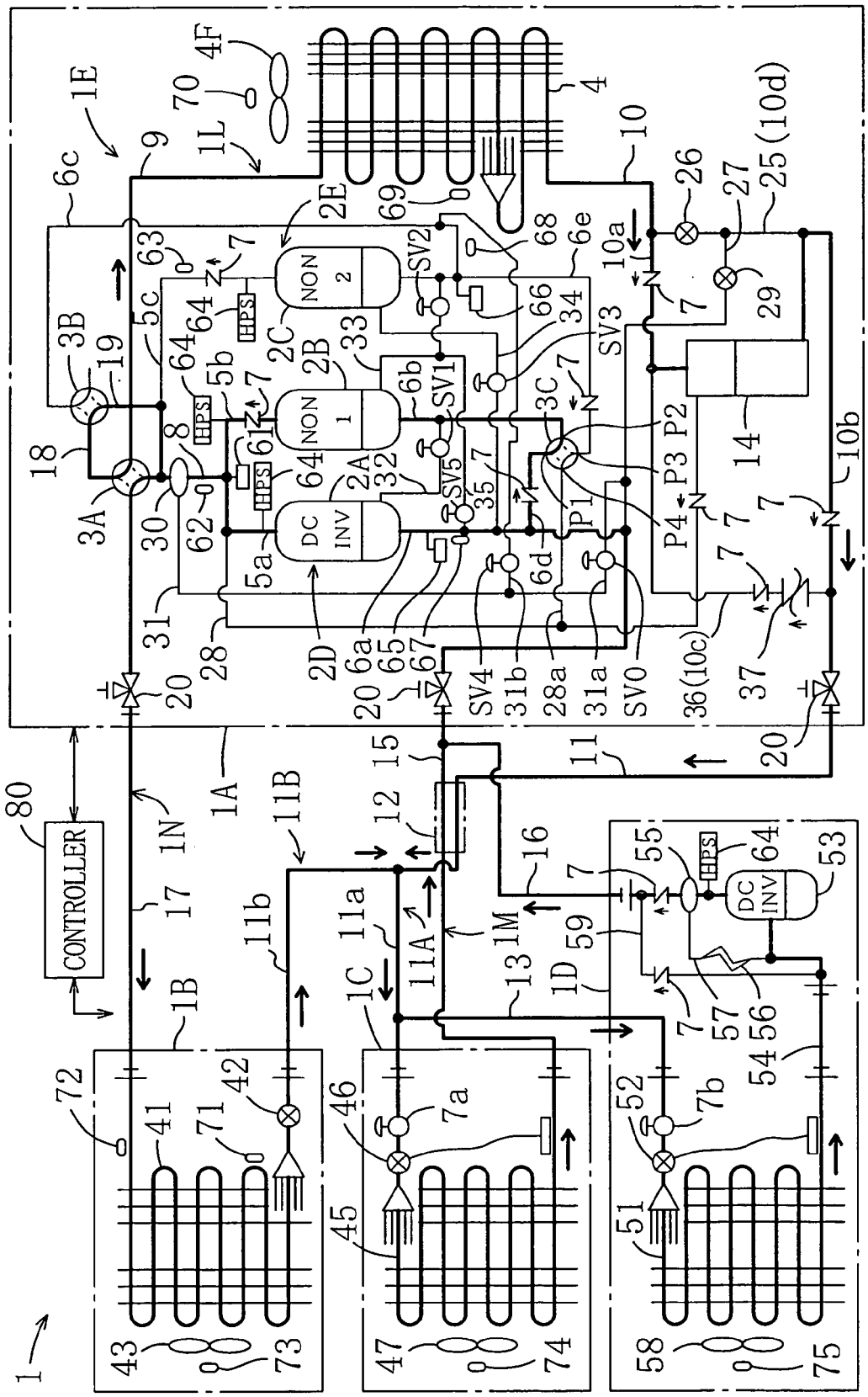
FIG. 9 is a refrigerant circuit diagram showing a second heating/refrigeration mode of operation in the first embodiment.

The second heating/refrigeration operation mode is a heating capability surplus operation mode which is carried out if the capability to provide space heating by the indoor unit (1B) is being more than is needed during the first heating/refrigeration operation mode. During the second heating/refrigeration operation mode, as shown in FIG. 9, the inverter compressor (2A) and the first noninverter compressor (2B) together constitute the compression mechanism (2D) of the first system while, on the other hand, the second noninverter compressor (2C) alone constitutes the compression mechanism (2E) of the second system. And the inverter compressor (2A) and the first noninverter compressor (2B) are activated and, in addition, the booster compressor (53) is activated. The second noninverter compressor (2C) is at rest.

The second heating/refrigeration operation mode is an operation mode which is carried out if the capability to provide space heating becomes surplus during the first heating/refrigeration operation mode, and is similar to the first heating/refrigeration operation mode, with the exception that the second four-way switch valve (3B) is switched into the second state.

Accordingly, a portion of refrigerant expelled from each of the inverter compressor (2A) and the first noninverter compressor (2B) flows into the indoor heat exchanger (41), and is condensed to form liquid refrigerant, as in the first heating/refrigeration operation mode. The condensed liquid refrigerant passes through the second branch pipe (11*b*) of the communication liquid pipes (11A, 11B) and flows into the first branch pipe (11*a*) short of the main flow pipe (11).

On the other hand, the other portion of the refrigerant expelled from each of the inverter compressor (2A) and the first noninverter compressor (2B) passes through the auxiliary gas pipe (19), then through the second four-way switch valve (3B), and then through the first four-way switch valve (3A), flows through the outdoor gas pipe (9), and is condensed in the outdoor heat exchanger (4) to form liquid refrigerant. This condensed liquid refrigerant passes through the receiver (14) during passage through the liquid pipe (10), flows into the first branch pipe (11*a*) by way of the main flow pipe (11) of the communication liquid pipes (11A, 11B), and joins the refrigerant from the second branch pipe (11*b*).

Thereafter, one portion of the refrigerant flowing through the first branch pipe (11*a*) flows into the cold storage heat exchanger (45), and is evaporated to form gas refrigerant. The other portion of the liquid refrigerant flowing through the first branch pipe (11*a*) flows into the freeze storage heat exchanger (51), is evaporated to form gas refrigerant, and is drawn into the booster compressor (53). The gas refrigerant evaporated in the cold storage heat exchanger (45) and the gas refrigerant discharged from the booster compressor (53) flow into each other in the low-pressure gas pipe (15), and return to the inverter compressor (2A) and to the first noninverter compressor (2B).

During passage through the low-pressure gas pipe (15), suction-side gas refrigerant from the cold storage heat exchanger (45) exchanges heat with liquid refrigerant flowing through the main flow pipe (11) of the communication liquid pipes (11A, 11B), and the liquid refrigerant flowing through the main flow pipe (11) of the communication liquid pipes (11A, 11B) is supercooled. This liquid refrigerant joins liquid refrigerant from the second branch pipe (11*b*) and flows into the cold storage heat exchanger (45) and into the freeze storage heat exchanger (51). Because of this, the refrigerant enthalpy difference in the cold storage heat exchanger (45) and the freeze storage heat exchanger (51) becomes greater, when compared to the case where refrigerant supercooling is not conducted, and the capability to provide refrigeration is enhanced to higher levels. On the other hand, even when gas refrigerant is overheated as a result of heat exchange with liquid refrigerant, it is possible to prevent the degree of superheat from becoming excessively great in the compression stroke by mixing with liquid refrigerant by liquid injection.

Figure 10:
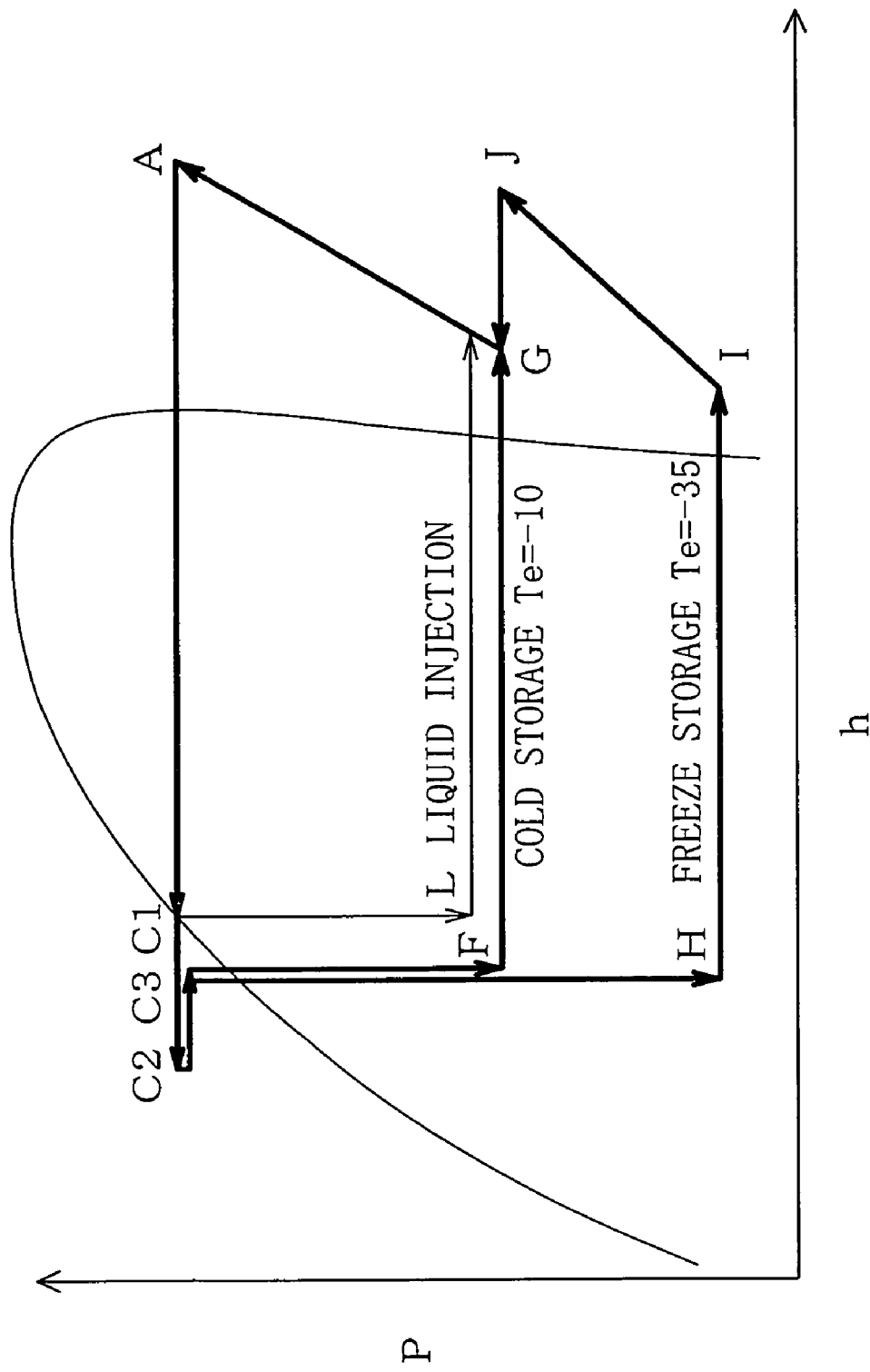
FIG. 10 is a Mollier chart showing a behavior of refrigerant during the second heating/refrigeration mode of operation in the first embodiment.

The behavior of refrigerant during the second heating/refrigeration operation mode is discussed by making reference to a Mollier chart of FIG. 10.

Refrigerant is compressed to POINT A by the inverter compressor (2A) and the first noninverter compressor (2B). A portion of the refrigerant at POINT A condenses in the indoor heat exchanger (41) and, as a result, forms a refrigerant at POINT C1. Another portion of the refrigerant at POINT A condenses in the outdoor heat exchanger (4) and, as a result, forms a refrigerant at POINT C1. Thereafter, this refrigerant at POINT C1 is supercooled to POINT C2 as a result of heat exchange with suction gas refrigerant (refrigerant at POINT G) into the inverter compressor (2A) and the first noninverter compressor (2B) during the flow through the main flow pipe (11) of the communication liquid pipes (11A, 11B).

The refrigerant at POINT C1 and the refrigerant at POINT C2 flow into each other to change into a refrigerant at POINT C3. A portion of the refrigerant at POINT C3 is decompressed to POINT F by the cold storage expansion valve (46), and is evaporated, for example, at minus 10 degrees Centigrade.

Since another portion of the refrigerant at POINT C3 is drawn by the booster compressor (53), it is decompressed to POINT H by the freeze storage expansion valve (52), evaporates, for example, at minus 35 degrees Centigrade, and is drawn into the booster compressor (53) at POINT L The refrigerant compressed to POINT J by the booster compressor (53) and the refrigerant from the cold storage heat exchanger (45) flow into each other and, in addition, a portion of the liquid refrigerant at POINT C1 is mixed therewith after it is decompressed to POINT L by the electronic expansion valve (29) (liquid injection). Then, the refrigerant changes state to POINT G and, thereafter, is drawn into the first inverter compressor (2A) and into the second noninverter compressor (2B).

During the second heating/refrigeration mode operation, by repetition of such a refrigerant circulation, space heating is provided within the shop while, simultaneously, the inside of the cold storage showcase and the inside of the freeze storage showcase are refrigerated. At this time, there occurs an unbalance between the capability to provide refrigeration (the amount of heat of evaporation) of the cold storage and freeze storage units (1C, 1D) and the capability to provide space heating (the amount of heat of condensation) of the indoor unit (1B), and a surplus of heat of condensation is discharged outside the room by the outdoor heat exchanger (4).

Third Heating/Refrigeration Operation Mode

Figure 11:
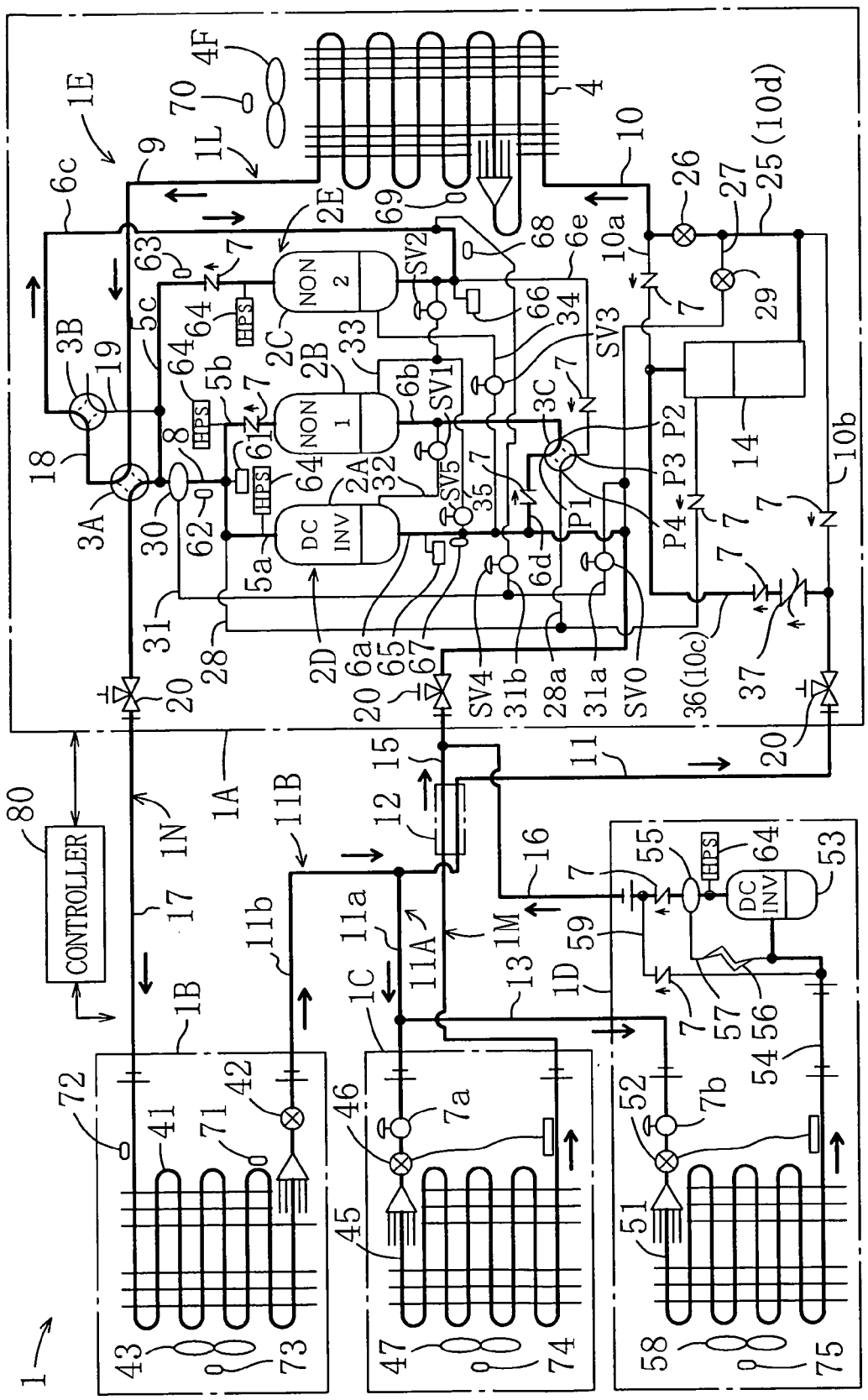
FIG. 11 is a refrigerant circuit diagram showing a third heating/refrigeration mode of operation in the first embodiment.

The third heating/refrigeration operation mode is an operation mode which is carried out if, during the first heating/refrigeration operation mode, the indoor unit (1B) is being insufficient in capability to provide desired space heating. During the third heating/refrigeration operation mode, as shown in FIG. 11, the inverter compressor (2A) and the first noninverter compressor (2B) together constitute the compression mechanism (2D) of the first system while, on the other hand, the second noninverter compressor (2C) alone constitutes the compression mechanism (2E) of the second system. And the inverter compressor (2A), the first noninverter compressor (2B), and the second noninverter compressor (2C) are activated and, in addition, the booster compressor (53) is also activated.

As just mentioned above, the third heating/refrigeration operation mode is an operation mode which is carried out if the capability to provide space heating of the indoor unit (1B) is being insufficient during the first heating/refrigeration operation mode. Stated another way, the third heating/refrigeration operation mode is carried out if the amount of heat of evaporation is not enough. The third heating/refrigeration operation mode is similar to the first heating/refrigeration operation mode, with the exception that the valve opening of the outdoor expansion valve (26) is controlled, and that the second noninverter compressor (2C) is activated.

Accordingly, refrigerant, expelled from each of the inverter compressor (2A), the first noninverter compressor (2B), and the second noninverter compressor (2C), passes through the communication gas pipe (17), flows into the indoor heat exchanger (41), and condenses into liquid refrigerant, as in the first heating/refrigeration operation mode. The condensed liquid refrigerant branches off from the second branch pipe (11b) of the communication liquid pipes (11A, 11B), into the first branch pipe (11a) and the main flow pipe (11).

One portion of the liquid refrigerant flowing through the first branch pipe (11a) flows into the cold storage heat exchanger (45) and evaporates into gas refrigerant. The other portion of the liquid refrigerant flowing through the first branch pipe (11a) flows into the freeze storage heat exchanger (51), evaporates into gas refrigerant, and is drawn into the booster compressor (53). The gas refrigerant evaporated in the cold storage heat exchanger (45) and the gas refrigerant expelled from the booster compressor (53) flow into each other in the low-pressure gas pipe (15), and return to the inverter compressor (2A) and to the first noninverter compressor (2B).

On the other hand, the liquid refrigerant, after condensation in the indoor heat exchanger (41), flows through the main flow pipe (11) of the communication liquid pipes (11A, 11B) and passes through the liquid branch pipe (36) while forcing the relief valve (37) to open by its high pressure, and flows into the receiver (14). Thereafter, the liquid refrigerant flows into the outdoor heat exchanger (4) by way of the outdoor expansion valve (26) and evaporates into gas refrigerant. The evaporated gas refrigerant passes through the outdoor gas pipe (9), then through the first four-way switch valve (3A), and then through the second four-way switch valve (3B), flows through the suction pipe (6c) of the second noninverter compressor (2C), and is directed back to the second noninverter compressor (2C).

Figure 12:
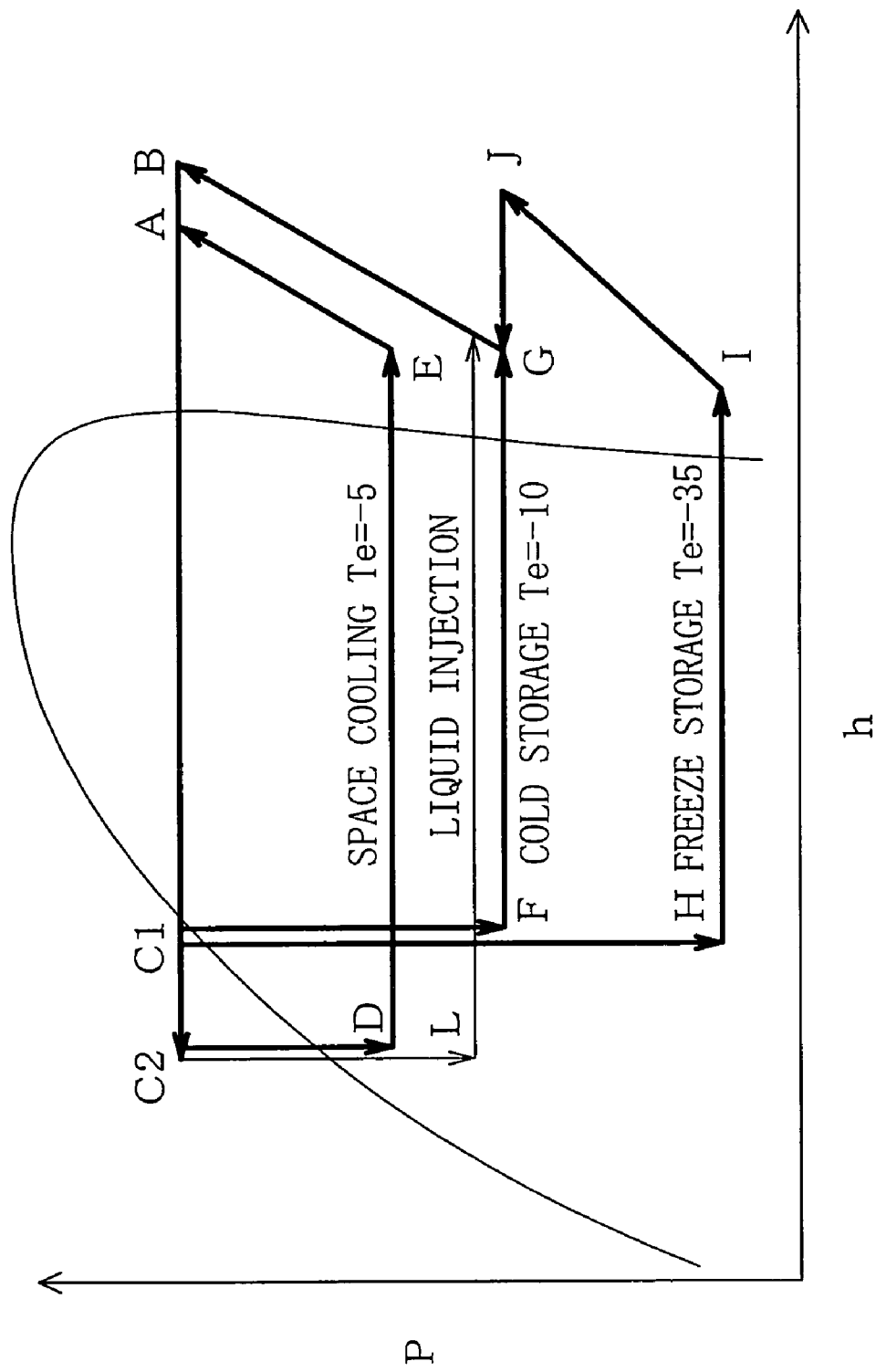
FIG. 12 is a Mollier chart showing a behavior of refrigerant during the third heating/refrigeration mode of operation in the first embodiment.

The behavior of refrigerant during the third heating/refrigeration operation mode is discussed by making reference to a Mollier chart of FIG. 12.

Refrigerant is compressed to POINT A by the second noninverter compressor (2C). Refrigerant is compressed to POINT B by the inverter compressor (2A) and the first noninverter compressor (2B). The refrigerant at POINT A and the refrigerant at POINT B flow into each other and condense in the indoor heat exchanger (41) to form a refrigerant at POINT C1.

A portion of the refrigerant at POINT C1 is decompressed to Point F by the cold storage expansion valve (46), and evaporates, for example, at minus 10 degrees Centigrade. In addition, since another portion of the refrigerant at POINT C1 is drawn into the booster compressor (53), it is decompressed to POINT H by the freeze storage expansion valve, evaporates, for example, at minus 35 degrees Centigrade, and is drawn into the booster compressor (53) at POINT L The refrigerant compressed to POINT J by the booster compressor (53) joins the refrigerant from the cold storage heat exchanger (45).

Gas refrigerant from the cold storage heat exchanger (45) exchanges heat with liquid refrigerant at POINT C1 flowing through the main flow pipe (11) of the communication lines (11A, 11B) from the indoor heat exchanger (41). Thereby, the liquid refrigerant flowing through the main flow pipe (11) of the communication liquid pipes (11A, 11B) is supercooled to POINT C2.

The refrigerant at POINT C2 is decompressed to POINT D by the outdoor expansion valve (26), evaporates, for example, at minus 5 degrees Centigrade, and is drawn into the second noninverter compressor (2C) at POINT E.

In addition, the refrigerant, as a result of interflowing of the gas refrigerant from the cold storage heat exchanger (45) and the gas refrigerant compressed to POINT J by the booster compressor (53), changes state into a refrigerant at POINT G by being mixed (liquid injection) with a refrigerant as a result of decompression of a liquid refrigerant at POINT C2 to POINT L by the electronic expansion valve (29). And the refrigerant at POINT G is drawn into the first inverter compressor (2A) and the second inverter compressor (2B).

By repetition of such a refrigerant circulation, space heating within the shop is provided while, simultaneously, the inside of the cold storage showcase and the inside of the freeze storage showcase are refrigerated. That is, there occurs an unbalance between the capability to provide refrigeration (the amount of heat of evaporation) of the cold storage and freeze storage units (1C, 1D) and the capability to provide space heating (the amount of heat of condensation) of the indoor unit (1B), and a deficiency in heat of evaporation is compensated by the outdoor heat exchanger (4).

EFFECTS OF EMBODIMENT 1

In accordance with the first embodiment, the main flow pipe (11) of the communication liquid pipes (11A, 11B) is shared between the liquid line of the cold/freeze storage system and the liquid line of the air conditioning system and, in addition, the main flow pipe (11) of the communication liquid pipes (11A, 11B) is laid out in side-by-side and contacting relationship with the low-pressure gas pipe (15) which is a gas line of the cold/freeze storage system, such that liquid refrigerant is supercooled by low-pressure gas refrigerant. Such arrangement makes it possible to supply the utilization-side heat exchangers (41, 45, 51) with refrigerant at further lower enthalpy. Because of this, the refrigerant enthalpy difference between the inlet and outlet ports of each of the utilization-side heat exchangers (41, 45, 51) becomes great, thereby making it possible to prevent the capability to provide refrigeration from degrading even when the length of piping is great.

In addition, liquid lines of a plurality of systems are arranged into a single line, i.e., the single main flow pipe (11) of the communication liquid pipes (11A, 11B). As a result of such arrangement, the total number of communication lines is reduced, therefore facilitating the work of connecting pipes and reducing the possibility that pipes are connected together erroneously.

Furthermore, the liquid injection pipe (27), for supplying a portion of the liquid refrigerant circulating through the refrigerant circuit (1E) to the suction side of each of the compression mechanisms (2D, 2E), is provided. Therefore, even when the degree of superheat of gas refrigerant increases as liquid refrigerant is supercooled by suction-side gas refrigerant, it is feasible to prevent, by liquid injection, the degree of superheat of refrigerant from becoming excessively great in the compression stroke.

Besides, the tape material (12) of aluminum as a heat transfer material is wrapped around the circumference of the main flow pipe (11) of the communication liquid pipes (11A, 11B) and the low-pressure gas pipe (15), in other words, the circumference of both the pipes (11, 15) is enclosed by the heat transfer material (12). This ensures that liquid refrigerant is supercooled by gas refrigerant through the heat transfer material (12). This arrangement accordingly eliminates the need to provide a heat exchanger dedicated for liquid refrigerant supercool, and complicated configurations are avoided.

Additionally, the liquid branch pipe (36) is provided with the relief valve (37) as a backflow prevention mechanism (liquid seal mechanism), and even when the temperature of outside air falls during the first heating/refrigeration operation mode which is a 100 percent heat recovery operation mode and, as a result, the pressure within the receiver (14) is lowered, it is possible to prevent the inflow of liquid refrigerant exiting the indoor heat exchanger (41) into the receiver (14). Stated another way, it is possible to prevent the main flow pipe (11) of the communication liquid pipes (11A, 11B) from entering the low-pressure state by the relief valve (37), thereby ensuring that liquid refrigerant exiting the indoor heat exchanger (41) is introduced to the cold storage heat exchanger (45) and to the freeze storage heat exchanger (51). As a result, it is ensured that the drop in refrigeration capability due to the shortage of refrigerant flowing in the cold storage heat exchangers (45) and the freeze storage heat exchanger (51) is avoided without fail.

EMBODIMENT 2 OF INVENTION

Figure 13:
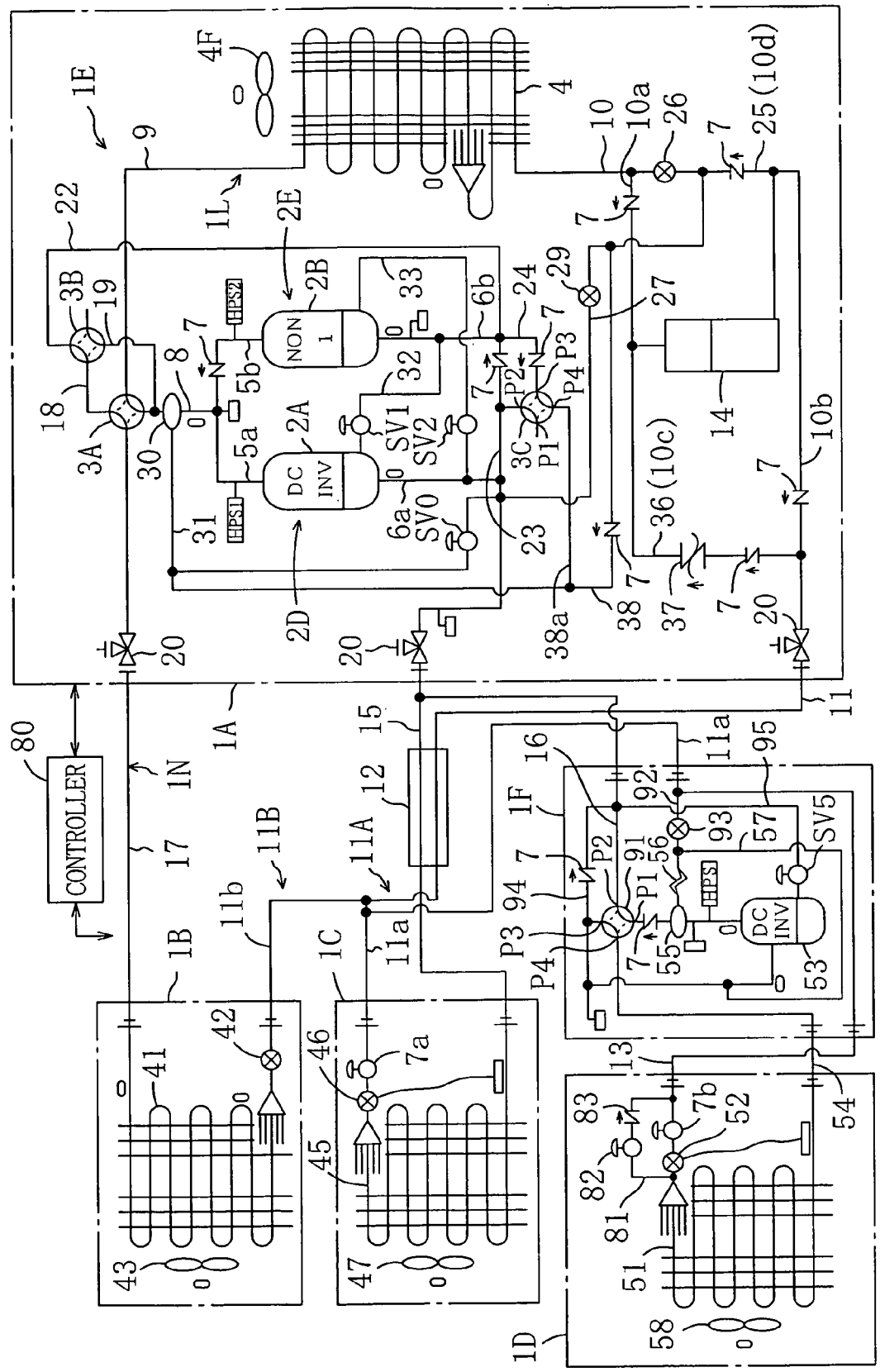
FIG. 13 is a refrigerant circuit diagram of a refrigeration apparatus according to a second embodiment of the present invention.

Hereafter, a second embodiment of the present invention will be described. With reference to FIG. 13 showing the second embodiment, there is provided a compression mechanism (2D, 2E) made up of two compressors (2A, 2B). In addition, in the second embodiment, a booster unit (1F) independent of the freeze storage unit (1D) is provided and the booster compressor (53) is housed within the booster unit (1F).

In the description which follows, differences between the first and second embodiments with regard to the outdoor unit (1A), the freeze storage unit (1D), and the booster unit (1F) will be explained (note that the same constructional parts as the first embodiment are not described here).

Outdoor Unit

The outdoor unit (1A) includes an inverter compressor (2A) as a first compressor and a noninverter compressor (2B) as a second compressor and further includes a first four-way switch valve (3A), a second four-way switch valve (3B), a third four-way switch valve (3C), and an outdoor heat exchanger (4) which is a heat source-side heat exchanger.

The inverter compressor (2A) and the noninverter compressor (2B) constitute the compression mechanism (2D, 2E) in the refrigeration apparatus (1), and the compression mechanism (2D, 2E) is made up of a compression mechanism (2D) of a first system and a compression mechanism (2E) of a second system. In the second embodiment, each of the inverter compressor (2A) and the noninverter compressor (2B) is able to constitute, in switching manner, the compression mechanism (2D) of the first system or the compression mechanism (2E) of the second system. That is, each of the compressors (2A, 2B) is adapted for selectable use in a first system-side circuit for cold/freeze storage or in a second system-side circuit for air conditioning.

Discharge pipes (5a, 5b) of the inverter compressor (2A) and the noninverter compressor (2B) are connected to a single high-pressure gas pipe (discharge piping) (8). This high-pressure gas pipe (8) is connected to one port of the first four-way switch valve (3A). The discharge pipe (5b) of the noninverter compressor (2B) is provided with a check valve (7). Since the arrangement of refrigerant piping in the vicinity of each of the first four-way switch valve (3A) and the second four-way switch valve (3B) is the same as in the first embodiment, the description thereof is omitted here.

A suction pipe (6a) of the inverter compressor (2A) is connected to a low-pressure gas pipe (low pressure gas-side communication pipe) (15) of the first system-side circuit. A suction pipe (6b) of the noninverter compressor (2B) is connected, through the second connecting pipe (22) and the first and second four-way switch valves (3A, 3B), to a low-pressure gas pipe (the communication gas pipe (17) or the outdoor gas pipe (9)) of the second system-side circuit.

A first communication passage (23) through which refrigerant flows towards the noninverter compressor (2B) from the inverter compressor (2A), and a second communication passage (24) allowing refrigerant flow to travel toward the inverter compressor (2A) from the noninverter compressor (2B) are connected in parallel to the suction pipe (6a) of the inverter compressor (2A) and to the suction pipe (6b) of the noninverter compressor (2B).

The first communication passage (23) is provided with a check valve (7) which permits only one-way flow of refrigerant traveling from the inverter compressor (2A) towards the noninverter compressor (2B) in the first communication passage (23). The second communication passage (24) is provided with a check valve (7) which permits only one-way flow of refrigerant traveling from the noninverter compressor (2B) to the inverter compressor (2A) in the second communication passage (24). The second communication passage (24) further includes the third four-way switch valve (3C). The second communication passage (24) is connected, between a connecting point with the suction pipe (6a) of the inverter compressor (2A) and the check valve (7) in the first communication passage (23), to the first communication passage (23).

The third four-way switch valve (3C) is configured such that its first port (P1) is a closed port. In addition, a second port (P2) is connected to the first communication passage (23) via the second communication passage (24); a third port (P3) is connected to the suction pipe (6b) of the noninverter compressor (2B) via the second communication passage (24); and a fourth port (P4) is connected to a branch pipe (38a) of a liquid seal prevention pipe (38) (described later). And, the third four-way switch valve (3C) is configured switchably between a first state which permits fluid communication between the first port (P1) and the second port (P2) and fluid communication between the third port (P3) and the fourth port (P4) (as indicated by the solid line of the figure), and a second state which permits fluid communication between the first port (P1) and the fourth port (P4) and fluid communication between the second port (P2) and the third port (P3) (as indicated by the broken line of the figure).

The liquid pipe (10), the auxiliary liquid pipe (25), and the liquid branch pipe (36) of the present embodiment are all constituted in the same way as in the first embodiment, and the outdoor expansion valve (26) of the auxiliary liquid pipe (25), the relief valve (37) in the liquid branch pipe (36), the check valves (7) of the pipes (10, 25, 36), etc., are disposed in the same layout as in the first embodiment. However, the auxiliary liquid pipe (25) is provided with a check valve (7) which permits only one-way flow of refrigerant traveling from the receiver (14) towards a liquid injection pipe (27) (described later).

Connected between the auxiliary liquid pipe (25) and the low-pressure gas pipe (15) is the liquid injection pipe (27) having an electronic expansion valve (29). The liquid seal prevention pipe (38) is connected to between a connecting point with the auxiliary liquid pipe (25) and the electronic expansion valves (29) in the liquid injection pipe (27), and to the high-pressure gas pipe (8) (to be exact, to an oil return pipe (31) which is described below). The liquid seal prevention pipe (38) is provided with a check valve (7) which permits only one-way flow of refrigerant traveling from the liquid injection pipe (27) towards the high-pressure gas pipe (8). Further, as described above, the branch pipe (38a) of the liquid seal prevention pipe (38) is connected to the fourth port (P4) of the third four-way switch valve (3C).

The high-pressure gas pipe (8) is provided with an oil separator (30). The oil separator (30) is connected to one end of an oil return pipe (31). The other end of the oil return pipe (31) is connected to the low-pressure gas pipe (15). The oil return pipe (31) is provided with an electromagnetic valve (SV0).

A first oil level equalizing pipe (32) is connected between a dome (oil pan) of the inverter compressor (2A) and the suction pipe (6b) of the noninverter compressor (2B). A second oil level equalizing pipe (33) is connected between a dome of the noninverter compressor (2B) and the suction pipe (6a) of the inverter compressor (2A). The first oil level equalizing pipe (32) and the second oil level equalizing pipe (33) are provided with respective electromagnetic valves (SV1, SV2) as opening/closing mechanisms.

Freeze Storage Unit

The freeze storage unit (1D) is provided with a freeze storage heat exchanger (51) which is a first utilization-side heat exchanger, and a freeze storage expansion valve (52) which is an expansion mechanism. A branch liquid pipe (13) which branches off, through the booster unit (1F), from the first branch pipe (11a) of the communication liquid pipes (11A, 11B) is connected, through the electromagnetic valve (7b) and the freeze storage expansion valve (52), to a liquid side of the freeze storage heat exchanger (51). A gas side of the freeze storage heat exchanger (51) is connected, through a connecting gas pipe (54), to the booster unit (1F).

The freeze storage expansion valve (52) is a thermal expansion valve and its temperature sensing tube is mounted onto the gas side of the freeze storage heat exchanger (51). The freeze storage heat exchanger (51) is implemented, for example, by a fin and tube heat exchanger of the cross fin type, and a freeze storage fan (58) which is a cooling fan is disposed in close proximity to the freeze storage heat exchanger (51).

Connected to the branch liquid pipe (13) is a bypass pipe (81) which bypasses the freeze storage expansion valve (52) and the electromagnetic valve (7b). The bypass pipe (81) is provided with an electromagnetic valve (82) for opening and closing the bypass pipe (81), and a check valve (83) which permits only one-way flow of refrigerant traveling from the freeze storage heat exchanger (51) towards the first branch pipe (11a) of the communication liquid pipes (11A, 11B).

Booster Unit

The booster unit (1F) is provided with a booster compressor (53) which is a high-pressure dome type compressor. A discharge pipe of the booster compressor (53) is connected to a first port (P1) of a four-way switch valve (91). One end of the branch gas pipe (16) is connected to a second port (P2) of the four-way switch valve (91), and the other end of the branch gas pipe (16) is connected to the low-pressure gas pipe (15). A suction pipe of the booster compressor (53) is connected to a third port (P3) of the four-way switch valve (91), and the connecting gas pipe (54) is connected to a fourth port (P4) of the four-way switch valve (91).

The four-way switch valve (91) is configured switchably between a first state which permits fluid communication between the first port (P1) and the second port (P2) and fluid communication between the third port (P3) and the fourth port (P4) (as indicated by the solid line of FIG. 1), and a second state which permits fluid communication between the first port (P1) and the fourth port (P4) and fluid communication between the second port (P2) and the third port (P3) (as indicated by the broken line of FIG. 1).

The discharge pipe of the booster compressor (53) is provided with an oil separator (55) and a check valve (7).

This check valve (7) is configured such that it permits only refrigerant flow traveling from the booster compressor (53) towards the four-way switch valve (91).

The oil separator (55) is configured such that it separates refrigerating machine oil from the refrigerant expelled from the booster compressor (53), and an oil return pipe (57) having a capillary tube (56) is connected to the oil separator (55). The oil return pipe (57) is connected to the suction pipe of the booster compressor (53). And, the oil return pipe (57) and the oil separator (55) together constitute an oil return mechanism by which refrigerating machine oil expelled from the booster compressor (53) is brought back to the booster compressor (53).

In addition, the oil return pipe (57) is connected to the branch liquid pipe (13) via a liquid injection pipe (92). The liquid injection pipe (92) is provided with an electronic expansion valve (93) for adjusting the flow rate of refrigerant.

Connected to the suction pipe of the booster compressor (53) and the branch gas pipe (16) is a bypass pipe (94) having a check valve (7). The check valve (7) is configured such that it permits only refrigerant flow traveling from the suction pipe of the booster compressor (53) towards the branch gas pipe (16). The bypass pipe (94) is provided so that when the booster compressor (53) is in the stopped state (for example, when the booster compressor (53) fails to operate properly and stops operating), refrigerant flows, bypassing the booster compressor (53).

An oil discharge pipe (95) is connected to the booster compressor (53). One end of the oil discharge pipe (95) is connected to the casing of the booster compressor (53), and the other end is connected to the branch gas pipe (16). The oil discharge pipe (95) is configured so that when more than a predetermined amount of refrigerating machine oil is accumulated in the booster compressor (53), surplus refrigerating machine oil in the booster compressor (53) is discharged to the branch gas pipe (16). That is, the oil discharge pipe (95) is connected to a bottom part of the casing of the booster compressor (53) at a predetermined height, whereby refrigerating machine oil accumulated in the booster compressor (53) is directed back to high stage-side compressors, i.e., the inverter compressor (2A) and the first noninverter compressor (2B). In addition, the oil discharge pipe (95) is provided with an electromagnetic valve (SV5) which opens at a predetermined timing when the booster compressor (53) is activated.

Operation Modes

Hereafter, operation modes of the second embodiment will be described.

In the second embodiment, it is configured that seven different operation modes are settable. More specifically, it is possible to perform:

(i) a cooling operation mode during which only space cooling by the indoor unit (1B) is provided;

(ii) a cooling/refrigeration operation mode during which the indoor unit (1B) provides space cooling while, simultaneously, the cold storage unit (1C) and the freeze storage unit (1D) each provide refrigeration;

(iii) a refrigeration operation mode during which only refrigeration by the cold storage unit (1C) and the freeze storage unit (1D) is provided;

(iv) a heating operation mode during which only space heating by the indoor unit (1B) is provided;

(v) a first heating/refrigeration operation mode (100 percent heat recovery operation mode) during which space heating by the indoor unit (1B) and refrigeration by the cold storage unit (1C) and the freeze storage unit (1D) are provided without using the outdoor heat exchanger (4);

(vi) a second heating/refrigeration operation mode which is carried out if the capability to provide space heating of the indoor unit (1B) is more than is needed during the first heating/refrigeration operation mode; and (vii) a third heating/refrigeration operation mode which is carried out if the capability to provide space heating of the indoor unit (1B) becomes deficient during the first heating/refrigeration operation mode.

Hereafter, each of the operation modes is described specifically.

Cooling Operation Mode

Figure 14:
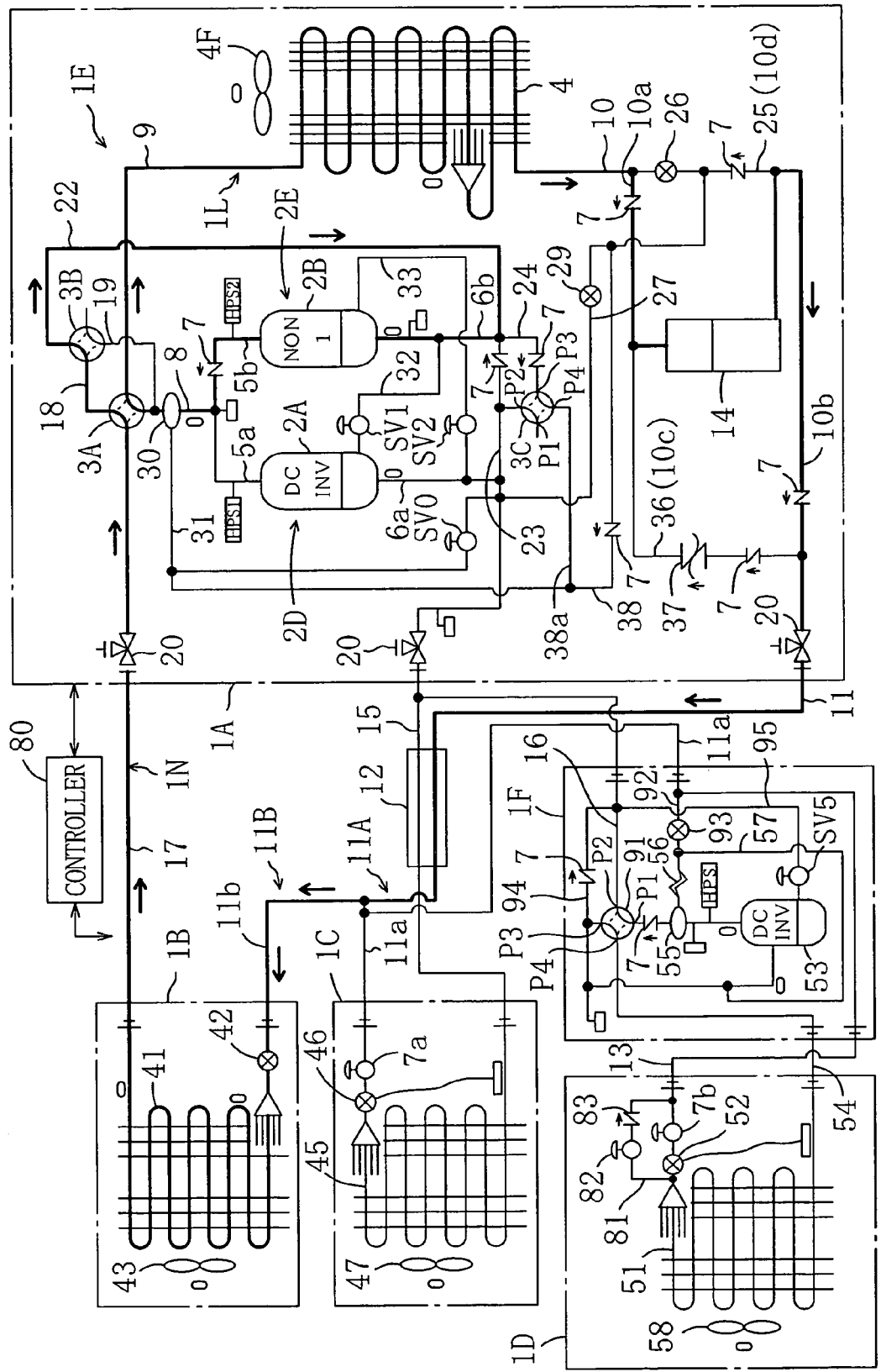
FIG. 14 is a refrigerant circuit diagram showing a cooling mode of operation in the second embodiment.

The cooling operation mode is an operation mode during which only space cooling by the indoor unit (1B) is provided. In the cooling operation mode, basically, only the noninverter compressor (2B) is activated while, on the other hand, the inverter compressor (2A) and the booster compressor (53) are at rest, as shown in FIG. 14.

In addition, as indicated by the solid line of FIG. 2, the first four-way switch valve (3A), the second four-way switch valve (3B), and the third four-way switch valve (3C) are each switched into the first state. Further, the outdoor expansion valve (26), the electromagnetic valve (7a) of the cold storage unit (1C), and the electromagnetic valve (7b) of the freeze storage unit (1D) are all closed. The electronic expansion valve (29) of the liquid injection pipe (27) is also in the closed state.

In this state, refrigerant expelled from the noninverter compressor (2B) passes through the first four-way switch valve (3A) and then through the outdoor gas pipe (9), flows into the outdoor heat exchanger (4), and condenses into liquid refrigerant. The condensed liquid refrigerant flows through the liquid pipe (10), passes through the receiver (14), flows through the second communication liquid pipe (11B), passes through the indoor expansion valve (42), flows into the indoor heat exchanger (41), and evaporates into gas refrigerant. The evaporated gas refrigerant passes through the communication gas pipe (17), then through the first four-way switch valve (3A), and then through the second four-way switch valve (3B), flows through the second connecting pipe (22) and the suction pipe (6b), and is brought back again to the noninverter compressor (2B). By repetition of such a refrigerant circulation, the shop is provided with space cooling.

If, during the cooling operation mode, the noninverter compressor (2B) fails to alone provide sufficient space cooling, the inverter compressor (2A) is activated in addition to the noninverter compressor (2B), and the third four-way switch valve (3C) is switched into the second state, thereby to continuously perform the cooling operation mode. Moreover, when the noninverter compressor (2B) breaks down, the inverter compressor (2A) is activated while, simultaneously, the third four-way switch valve (3C) is switched into the second state, thereby to continuously perform the cooling operation mode.

Cooling/Refrigeration Operation Mode

The cooling/refrigeration operation mode is an operation mode during which space cooling by the indoor unit (1B), refrigeration by the cold storage unit (1C), and refrigeration by the freeze storage unit (1D) are all provided at the same time. The refrigeration of the cooling/refrigeration operation mode includes a first operation in which refrigeration only by the cold storage unit (1C) is provided, a second operation in which only refrigeration by the freeze storage unit (1D) is provided, and a third operation in which both refrigeration by the cold storage unit (1C) and refrigeration by the freeze storage unit (1D) are provided. Here, the third operation by the units (1C, 1D) is described.

Figure 15:
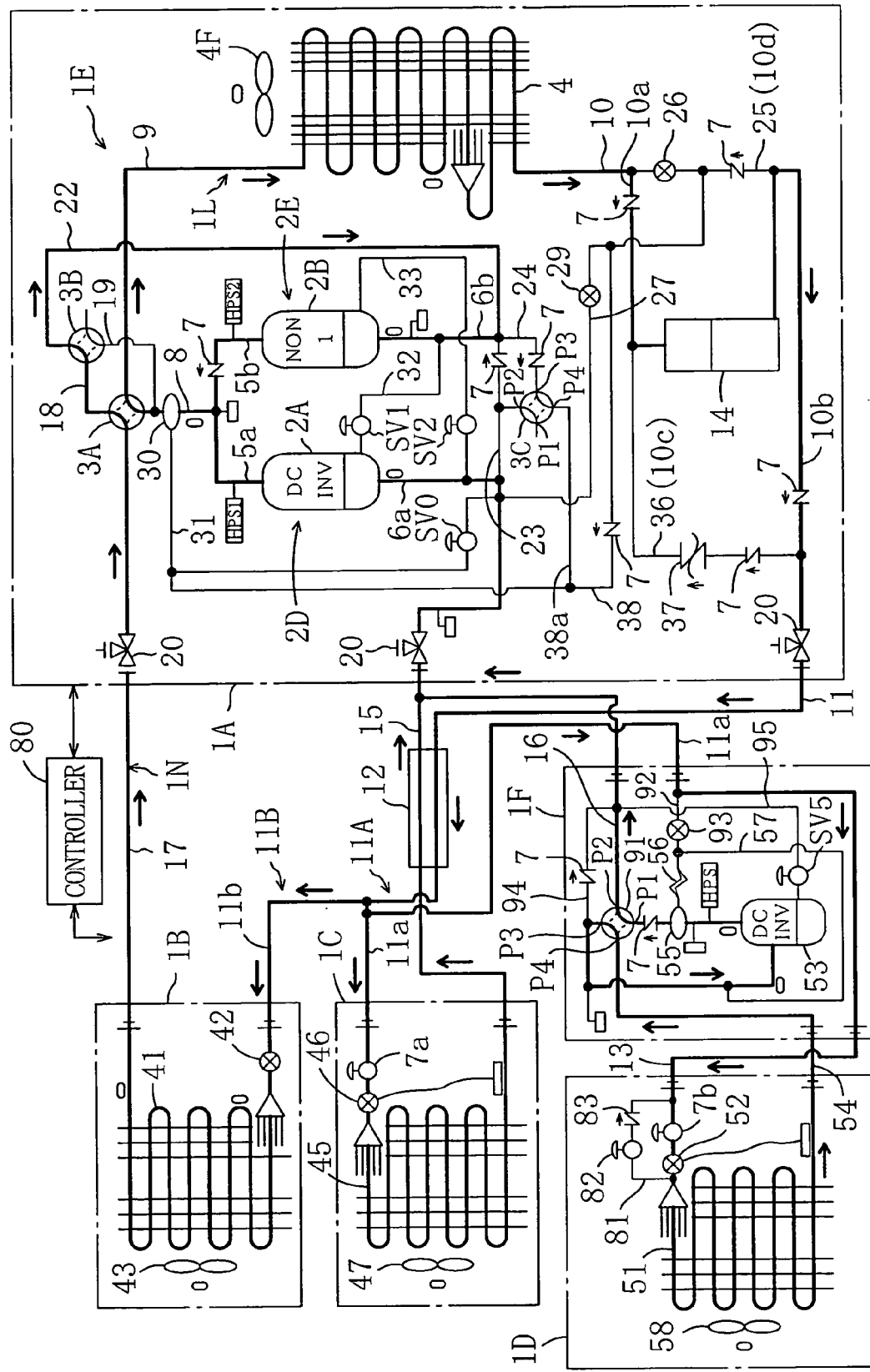
FIG. 15 is a refrigerant circuit diagram showing a cooling/refrigeration mode of operation in the second embodiment.

In the cooling/refrigeration operation mode, basically, both the inverter compressor (2A) and the noninverter compressor (2B) are activated and, in addition, the booster compressor (53) is also activated, as shown in FIG. 15.

In addition, the first four-way switch valve (3A), the second four-way switch valve (3B), and the third four-way switch valve (3C) are each switched into the first state, as indicated by the solid line of FIG. 3. Furthermore, the electromagnetic valve (7a) of the cold storage unit (1C) and the electromagnetic valve (7b) of the freeze storage unit (1D) are placed in the open state while, on the other hand, the outdoor expansion valve (26) is placed in the closed state. The indoor expansion valve (42) is controlled to a predetermined valve opening. In order to control the degree of superheat of suction refrigerant into the inverter compressor (2A), the valve opening of the electronic expansion valve (29) of the liquid injection pipe (27) is controlled.

In this state, refrigerant expelled from the inverter compressor (2A) and refrigerant expelled from the noninverter compressor (2B) flow into each other in the high-pressure gas pipe (8), pass through the first four-way switch valve (3A) and then through the outdoor gas pipe (9), flow into the outdoor heat exchanger (4), and condense into liquid refrigerant. The condensed liquid refrigerant flows through the liquid pipe (10), passes through the receiver (14), and branches off into the first communication liquid pipe (11A) and the second communication liquid pipe (11B).

The liquid refrigerant flowing through the second communication liquid pipe (11B) passes through the indoor expansion valve (42), flows into the indoor heat exchanger (41), and evaporates into gas refrigerant. The evaporated gas refrigerant passes through the communication gas pipe (17), then through the first four-way switch valve (3A), and then through the second four-way switch valve (3B), flows through the second connecting pipe (22), and returns to the noninverter compressor (2B) by way of the suction pipe (6b).

On the other hand, one portion of the liquid refrigerant flowing through the first communication liquid pipe (11A) passes through the cold storage expansion valve (46), flows into the cold storage heat exchanger (45), and evaporates into gas refrigerant. The other portion of the liquid refrigerant flowing through the first communication liquid pipe (11A) flows through the branch liquid pipe (13), passes through the freeze storage expansion valve (52), flows into the freeze storage heat exchanger (51), and evaporates into gas refrigerant. The gas refrigerant evaporated in the freeze storage heat exchanger (51) is drawn into the booster compressor (53) and, after being compressed, is expelled to the branch gas pipe (16).

The gas refrigerant evaporated in the cold storage heat exchanger (45), and the gas refrigerant expelled from the booster compressor (53) flow into each other in the low-pressure gas pipe (15) and return to the inverter compressor (2A).

In the cooling/refrigeration operation mode, by repetition of such a refrigerant circulation, the inside of the cold storage showcase and the inside of the freeze storage showcase are refrigerated and, at the same time, space cooling is provided in the shop.

The cooling/refrigeration operation mode may be performed by only one compressor. For example, in the case where only the inverter compressor (2A) is operated to perform the cooling/refrigeration operation mode, the third four-way switch valve (3C) is switched into the second state. This causes the refrigerant which has circulated through the refrigerant circuit (1E) to return to the inverter compressor (2A). More specifically, refrigerant from each of the cold storage unit (1C) and the freeze storage unit (1D) is directed back to the inverter compressor (2A) through the low-pressure gas pipe (15) and the suction pipe (6a) while, on the other hand, refrigerant from the indoor unit (1B) is directed back to the inverter compressor (2A), through the second connecting pipe (22), the second communication passage (24), and the suction pipe (6a).

In addition, in the case where the inverter compressor (2A) fails to operate properly and stops operating, the third four-way switch valve (3C) is switched into the first state and the cooling/refrigeration operation mode is carried out by only the noninverter compressor (2B). In this case, the refrigerant which has circulated through the refrigerant circuit (1E) returns to the noninverter compressor (2B). More specifically, refrigerant from each of the cold storage unit (1C) and the freeze storage unit (1D) is directed back to the noninverter compressor (2B) through the first communication passage (23) and the suction pipe (6b) while, on the other hand, refrigerant from the indoor unit (1B) is directed back to the noninverter compressor (2B), through the second connecting pipe (22) and the suction pipe (6b).

Refrigeration Operation Mode

The refrigeration operation mode is an operation mode during which refrigeration by the cold storage unit (1C) and refrigeration by the freeze storage unit (1D) are provided, with the indoor unit (1B) stopped. The refrigeration of this operation mode includes a first operation in which only refrigeration by the cold storage unit (1C) is provided, a second operation in which only refrigeration by the freeze storage unit (1D) is provided, and a third operation in which both refrigeration by the cold storage unit (1C) and refrigeration by the freeze storage unit (1D) are provided. Here, the third refrigeration operation is described.

Figure 16:
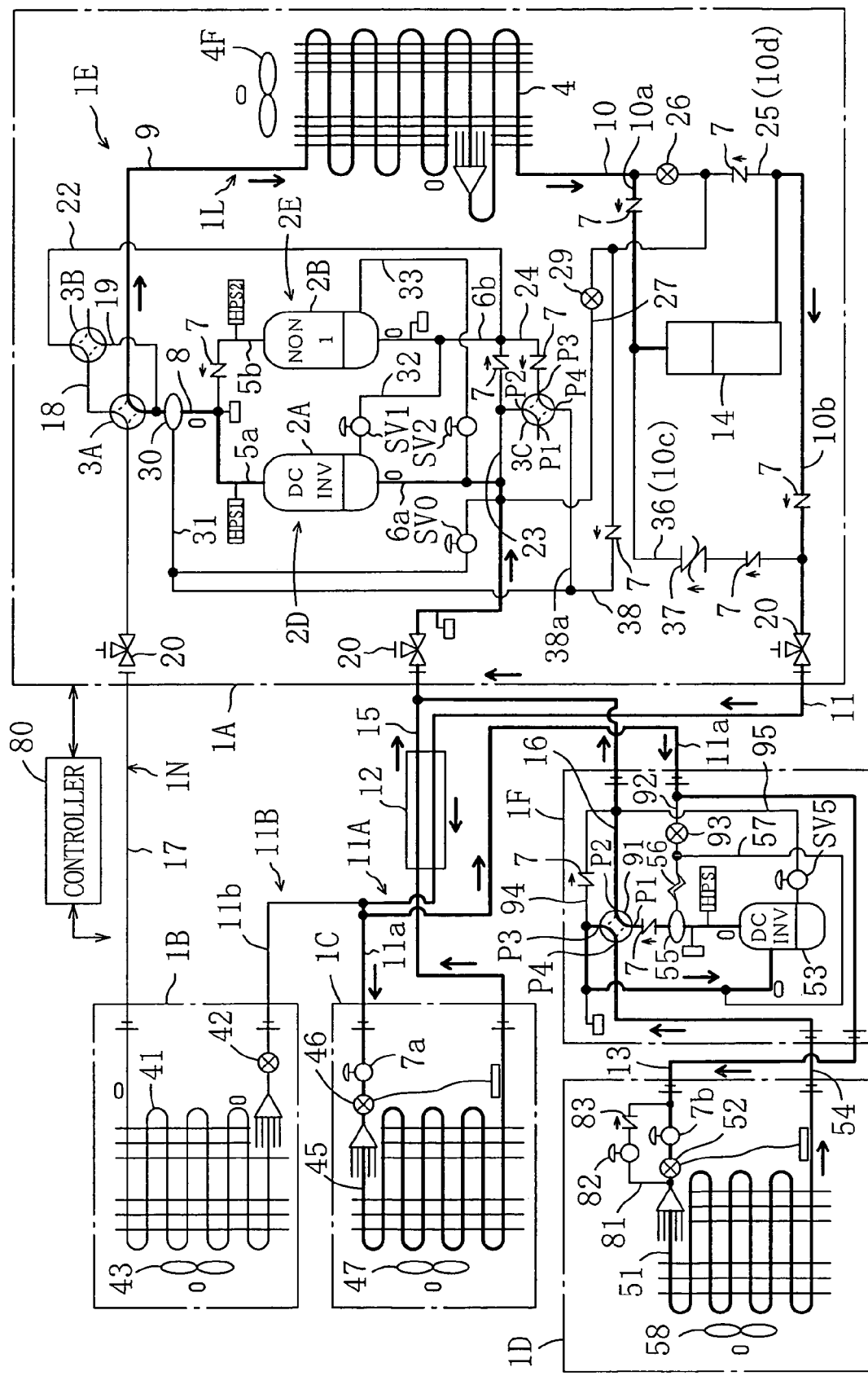
FIG. 16 is a refrigerant circuit diagram showing a refrigeration mode of operation in the second embodiment.

During the refrigeration operation mode, basically, as shown in FIG. 16, the inverter compressor (2A) is activated, but the noninverter compressor (2B) is at rest. The booster compressor (53) is started when the freeze storage unit (1D) provides refrigeration.

In addition, the first four-way switch valve (3A), the second four-way switch valve (3B), and the third four-way switch valve (3C) are all set into the first state. Further, the electromagnetic valve (7a) of the cold storage unit (1C) and the electromagnetic valve (7b) of the freeze storage unit (1D) are placed in the open state while, on the other hand, the outdoor expansion valve (26) and the indoor expansion valve (42) are in the closed state. In addition, the valve opening of the electronic expansion valve (29) of the liquid injection pipe (27) is adjusted so as to control the degree of superheat of the suction refrigerant. The electromagnetic valve (7a) is closed during the refrigeration thermo-off in which refrigeration by the cold storage unit (1C) is stopped. The electromagnetic valve (7b) is closed and, in addition, the booster compressor (53) is stopped during the refrigeration thermo-off in which refrigeration by the freeze storage unit (1D) is stopped.

In this state, refrigerant expelled from the inverter compressor (2A) passes through the first four-way switch valve (3A) and then through the outdoor gas pipe (9), flows into the outdoor heat exchanger (4), and condenses into liquid refrigerant. The condensed liquid refrigerant flows through the liquid pipe (10), passes through the receiver (14), and flows through the first communication liquid pipe (11A), wherein one portion of the liquid refrigerant passes through the cold storage expansion valve (46), flows into the cold storage heat exchanger (45), and evaporates to gas refrigerant.

Meanwhile, the other portion of the liquid refrigerant flowing through the first communication liquid pipe (11A) flows through the branch liquid pipe (13), passes through the freeze storage expansion valve (52), flows into the freeze storage heat exchanger (51), and evaporates into gas refrigerant. The gas refrigerant evaporated in the freeze storage heat exchanger (51) is drawn into the booster compressor (53) and, after being compressed, is discharged to the branch gas pipe (16).

The gas refrigerant evaporated in the cold storage heat exchanger (45), and the gas refrigerant expelled from the booster compressor (53) flow into each other in the low-pressure gas pipe (15) and return to the inverter compressor (2A). The inside of the cold storage showcase and the inside of the freeze storage showcase are refrigerated by repetition of the aforesaid refrigerant circulation.

The valve opening of each of the cold storage expansion valve (46) and the freeze storage expansion valve (52) is degree-of-superheat controlled by a respective temperature sensing tube. This is applicable to each of the following operation patterns.

As just described above, the refrigerant expelled out of the inverter compressor (2A) circulates through the refrigerant circuit (1E) wherein the outdoor heat exchanger (4) serves as a condenser and the cold storage heat exchanger (45) and the freeze storage heat exchanger (51) serve as evaporators. And, as the refrigerant circulates, the inside of the cold storage showcase and the inside of the freeze storage showcase are refrigerated.

When the load is high, both the inverter compressor (2A) and the noninverter compressor (2B) are activated by the same valve setting as indicated in FIG. 16. This causes refrigerant expelled from the inverter compressor (2A) and refrigerant expelled from the noninverter compressor (2B) to circulate through the refrigerant circuit (1E) wherein the outdoor heat exchanger (4) serves as a condenser and the cold storage heat exchanger (45) and the freeze storage heat exchanger (51) serve as evaporators, and to return to the inverter compressor (2A) and to the noninverter compressor (2B).

If the inverter compressor (2A) fails to operate properly and stops operating, only the noninverter compressor (2B) is activated. This causes refrigerant expelled from the noninverter compressor (2B) to circulate through the refrigerant circuit (1E) wherein the outdoor heat exchanger (4) serves as a condenser and the cold storage heat exchanger (45) and the freeze storage heat exchanger (51) serve as evaporators, and to return to the noninverter compressor (2B) by way of the low-pressure gas pipe (15) and the first communication passage (23).

Heating Operation Mode

The heating operation mode is an operation mode during which only space heating by the indoor unit (1B) is provided. During the heating operation mode, as shown in FIG. 17, basically only the noninverter compressor (2B) is activated.

Figure 17:
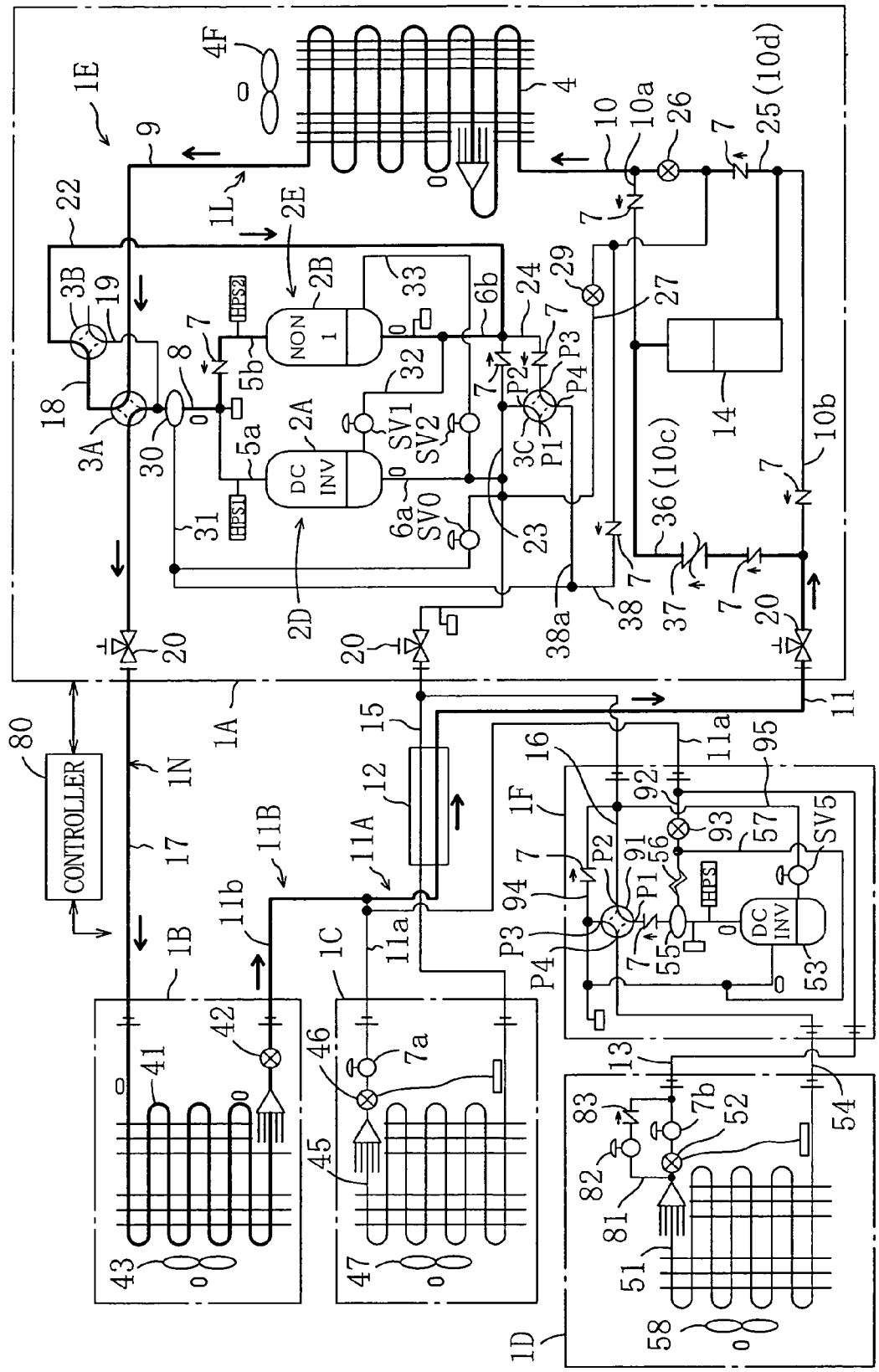
FIG. 17 is a refrigerant circuit diagram showing a heating mode of operation in the second embodiment.

In addition, as indicated by the solid line of FIG. 17, the first four-way switch valve (3A) is switched into the second state; the second four-way switch valve (3B) is switched into the first state; and the third four-way switch valve (3C) is switched into the first state. On the other hand, the electromagnetic valve (7a) of the cold storage unit (1C), and the electromagnetic valve (7b) of the freeze storage unit (1D), and the electronic expansion valve (29) of the liquid injection pipe (27) are all closed. Based on an indoor preset temperature and values detected by each sensor, the valve opening of each of the outdoor expansion valve (26) and the indoor expansion valve (42) is controlled to a respective amount.

In this state, refrigerant expelled from the noninverter compressor (2B) passes through the first four-way switch valve (3A) and then through the communication gas pipe (17), flows into the indoor heat exchanger (41), and condenses into liquid refrigerant. The condensed liquid refrigerant flows through the second communication liquid pipe (11B), passes through the main flow pipe (11) and then through the liquid branch pipe (36), and flows into the receiver (14). Thereafter, the liquid refrigerant passes through the outdoor expansion valve (26) of the auxiliary liquid pipe (25), flows into the outdoor heat exchanger (4), and evaporates into gas refrigerant. The evaporated gas refrigerant passes through the outdoor gas pipe (9), the first four-way switch valve (3A), the second four-way switch valve (3B), the second connecting pipe (22), and the suction pipe (6b) in that order, and returns to the noninverter compressor (2B). By repetition of such a refrigerant circulation, indoor space heating is provided in the shop.

When the noninverter compressor (2B) breaks down and stops operating, space heating may be provided by the use of the inverter compressor (2A). At this time, the third four-way switch valve (3C) is switched into the second state. This causes refrigerant expelled from the inverter compressor (2A) to return, by way of the second connecting pipe (22), the second communication passage (24), and the suction pipe (6a), to the inverter compressor (2A) when the refrigerant circulates through the refrigerant circuit (1E) wherein the indoor heat exchanger (41) serves as a condenser and the outdoor heat exchanger (4) serves as an evaporator.

If the third four-way switch valve (3C) is switched into the second state, this makes it possible to provide space heating by using both the inverter compressor (2A) and the noninverter compressor (2B). At this time, refrigerant expelled from the inverter compressor (2A) and refrigerant expelled from the noninverter compressor (2B) circulate through the refrigerant circuit (1E) wherein the indoor heat exchanger (41) serves as a condenser and the outdoor heat exchanger (4) serves as an evaporator, during which a portion of the refrigerant returns to the inverter compressor (2A), and the remaining refrigerant returns to the noninverter compressor (2B).

First Heating/Refrigeration Operation Mode

The first heating/refrigeration operation mode is a 100 percent heat recovery operation mode capable of providing space heating by the indoor unit (1B) and refrigeration by the cold storage unit (1C), and refrigeration by the freeze storage unit (1D), without using the outdoor heat exchanger (4). Basically, the first heating/refrigeration operation mode is performed by activating both the inverter compressor (2A) and the noninverter compressor (2B) or by activating only the inverter compressor (2A), depending on the load; however, it is possible to perform the first heating/refrigeration operation mode by using only the noninverter compressor (2B) when the inverter compressor (2A) breaks down.

Figure 18:
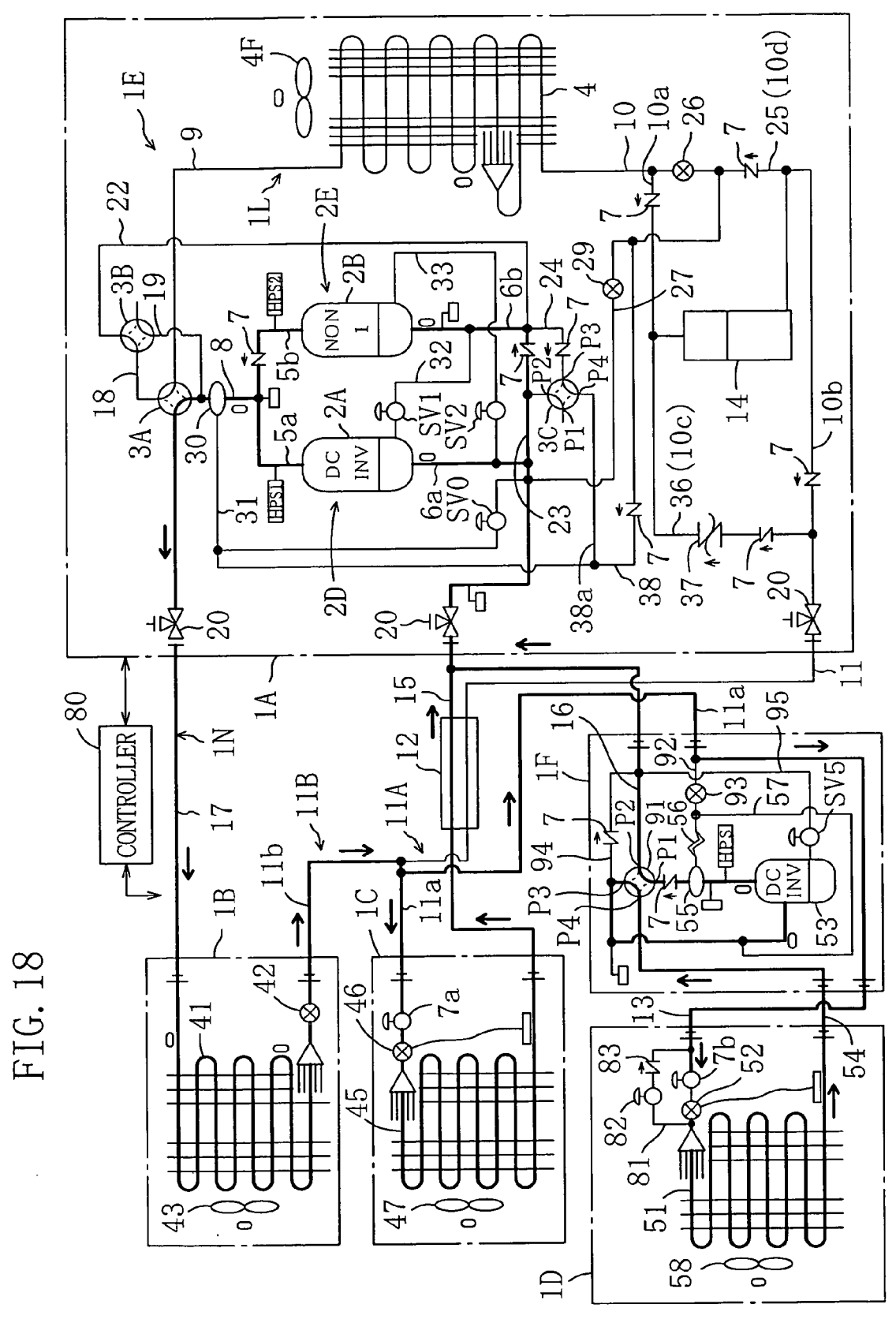

As shown in FIG. 18, during an operation in which both the inverter compressor (2A) and the noninverter compressor (2B) are activated, the first four-way switch valve (3A) is switched into the second state while, on the other hand, the second four-way switch valve (3B) and the third four-way switch valve (3C) are each switched into the first state. In addition, the electromagnetic valve (7a) of the cold storage unit (1C) and the electromagnetic valve (7b) of the freeze storage unit (1D) are placed in the open state and the outdoor expansion valve (26) is placed in the closed state and, on the other hand, the valve opening of each of the indoor expansion valve (42) and the electronic expansion valve (29) of the liquid injection pipe (27) is controlled to a respective amount.

In this state, refrigerant expelled from the inverter compressor (2A) and refrigerant expelled from the noninverter compressor (2B) pass through the first four-way switch valve (3A) and then through the communication gas pipe (17), flow into the indoor heat exchanger (41), and condense to liquid refrigerant. The condensed liquid refrigerant flows into the first branch pipe (11a) from the second branch pipe (11b), and a portion of the liquid refrigerant flows into the branch liquid pipe (13).

The liquid refrigerant flowing through the first branch pipe (11a) passes through the cold storage expansion valve (46), flows into the cold storage heat exchanger (45), and evaporates into gas refrigerant. In addition, the liquid refrigerant flowing through the branch liquid pipe (13) passes through the freeze storage expansion valve (52), flows into the freeze storage heat exchanger (51), and evaporates into gas refrigerant. The gas refrigerant evaporated in the freeze storage heat exchanger (51) is drawn into the booster compressor (53) and, after being compressed, is discharged to the branch gas pipe (16).

The gas refrigerant evaporated in the cold storage heat exchanger (45), and the gas refrigerant expelled from the booster compressor (53) flow into each other in the low-pressure gas pipe (15), wherein one portion of the gas refrigerant passes through the suction pipe (6a) and returns to the inverter compressor (2A) while, on the other hand, the other portion of the gas refrigerant passes through the first communication passage (23) and then through the suction pipe (6b) and returns to the noninverter compressor (2B). By repetition of such a refrigerant circulation, space heating is provided in the shop while, simultaneously, the inside of the cold storage showcase and the inside of the freeze storage showcase are refrigerated.

As just described above, in the first heating/refrigeration operation mode, there is established a balance between the capability to provide refrigeration (the amount of heat of evaporation) of the cold storage and freeze storage units (1C, 1D) and the capability to provide space heating (the amount of heat of condensation) of the indoor unit (1B) and, as a result, 100 percent heat recovery is achieved.

During an operation in which only the inverter compressor (2A) is operated, the noninverter compressor (2B) is stopped with the setting of each valve unchanged. This causes refrigerant expelled from the inverter compressor (2A) to circulate through the refrigerant circuit (1E) wherein the indoor heat exchanger (41) serves as a condenser and the cold storage heat exchanger (45) and the freeze storage heat exchanger (51) serve as evaporators. Then, the refrigerant returns to the inverter compressor (2A).

When the inverter compressor (2A) breaks down, only the noninverter compressor (2B) is activated with the setting of each valve unchanged. This causes refrigerant expelled from the noninverter compressor (2B) to circulate through the refrigerant circuit (1E) wherein the indoor heat exchanger (41) serves as a condenser while, on the other hand, the cold storage heat exchanger (45) and the freeze storage heat exchanger (51) serve as evaporators. Then, the refrigerant returns to the noninverter compressor (2B).

In the second embodiment, the relief valve (37) is positioned, as a backflow prevention mechanism (liquid seal mechanism), in the liquid branch pipe (36), as in the first embodiment. As a result of such arrangement, the flow of refrigerant during the first heating/refrigeration operation mode which is a 100 percent heat recovery operation mode is rendered stable. That is to say, even when the temperature of outside air temperature falls and, as a result, the pressure within the receiver (14) is lowered, it is ensured that liquid refrigerant exiting the indoor heat exchanger (41) will not flow in the liquid branch pipe (36) in the direction of the receiver (14). As a result, a side short of the cold storage expansion valve (46) in the first branch pipe (11a) and a side short of the freeze storage expansion valve (52) in the branch liquid pipe (13) are each held in a full liquid state. This makes it possible to secure adequate refrigerant flow rates for the cold storage and freeze storage heat exchangers (45, 51). Accordingly, it is ensured that the drop in capability in each of the cold storage and freeze storage heat exchangers (45, 51) is avoided.

Second Heating/Refrigeration Operation Mode

The second heating/refrigeration operation mode is a heating capability surplus operation mode which is carried out if the capability to provide space heating of the indoor unit (1B) becomes surplus during the first heating/refrigeration operation mode. The second heating/refrigeration operation mode is carried out based on the same settings as the first heating/refrigeration operation mode, with the exception that the second four-way switch valve (3B) is switched into the second state in the first heating/refrigeration operation mode, as indicated by the solid line of FIG. 19.

Figure 19:
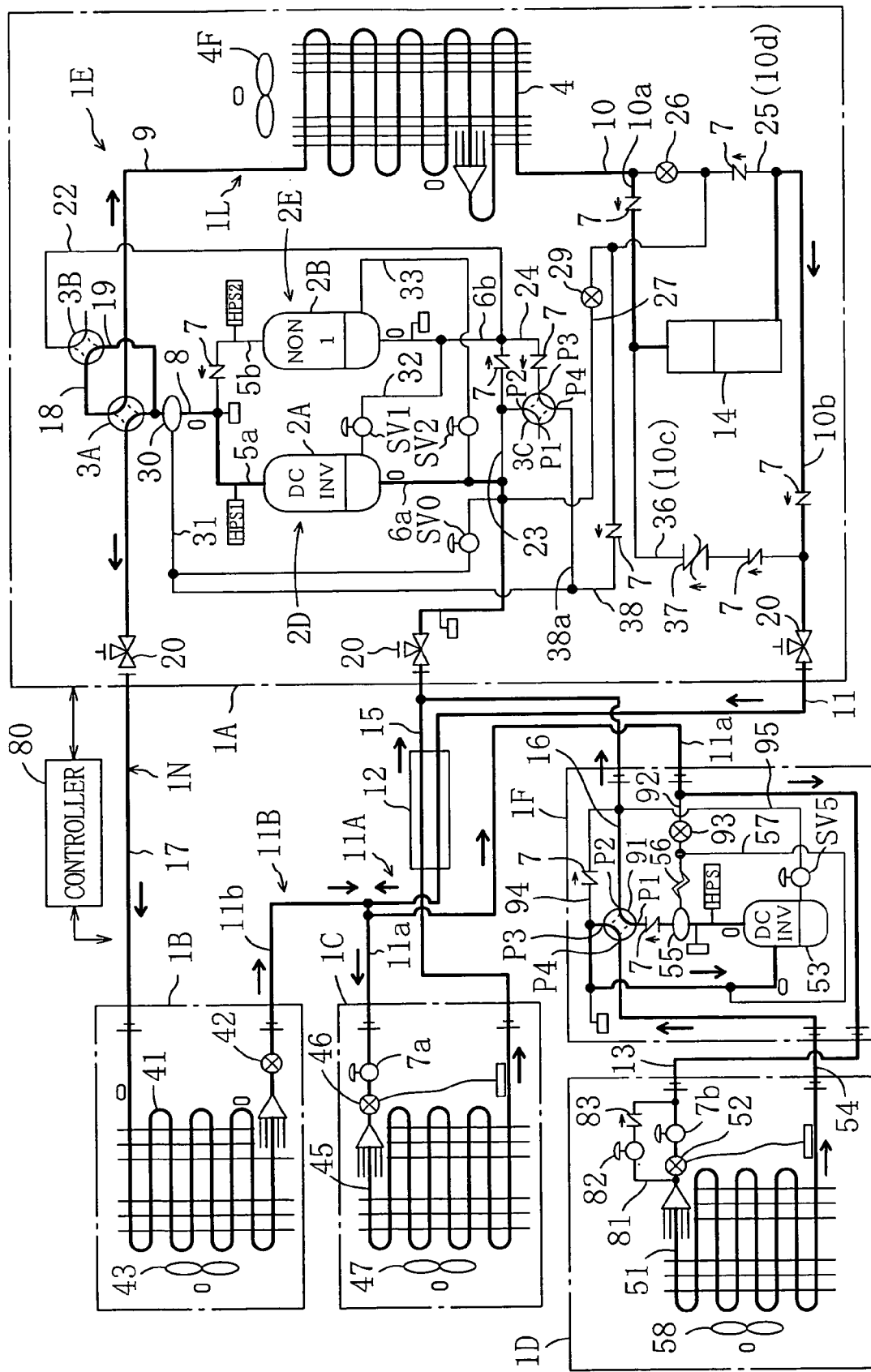
FIG. 19 is a refrigerant circuit diagram showing a second heating/refrigeration mode of operation in the second embodiment.

In the second heating/refrigeration operation mode, basically only the inverter compressor (2A) is activated, as shown in FIG. 19; however, both the inverter compressor (2A) and the noninverter compressor (2B) are activated when the load is high, and only the noninverter compressor (2B) is activated when the inverter compressor (2A) breaks down.

With reference to FIG. 19, one portion of refrigerant expelled from the inverter compressor (2A) flows into the indoor heat exchanger (41) and condenses into liquid refrigerant, as in the first heating/refrigeration operation mode. Then, the condensed liquid refrigerant flows into the first branch pipe (11a) from the second branch pipe (11b).

Meanwhile, the other portion of the refrigerant expelled from the inverter compressor (2A) passes through the auxiliary gas pipe (19), the second four-way switch valve (3B), and the first four-way switch valve (3A) in that order, flows through the outdoor gas pipe (9), and is condensed into liquid refrigerant in the outdoor heat exchanger (4). During passage through the liquid pipe (10), the condensed liquid refrigerant passes through the receiver (14) and flows into the first branch pipe (11a) from the main flow pipe (11).

Thereafter, one portion of the liquid refrigerant flowing through the first branch pipe (11a) flows into the cold storage heat exchanger (45) and evaporates into gas refrigerant. The other portion of the liquid refrigerant flowing through the first branch pipe (11a) flows through the branch liquid pipe (13), evaporates into gas refrigerant in the freeze storage heat exchanger (51), and is drawn into the booster compressor (53). The gas refrigerant evaporated in the cold storage heat exchanger (45) and the gas refrigerant expelled from the booster compressor (53) flow into each other in the low-pressure gas pipe (15) and return to the inverter compressor (2A). As such a refrigerant circulation is repeated, the inside of the cold storage showcase and the inside of the freeze storage showcase are refrigerated while, simultaneously, indoor space heating is provided in the shop.

As just described above, in the second heating/refrigeration operation mode, there occurs an unbalance between the capability to provide refrigeration (the amount of heat of evaporation) of the cold storage and freeze storage units (1C, 1D) and the capability to provide space heating (the amount of heat of condensation) of the indoor unit (1B), and surplus heat of condensation is discharged outside the room by the outdoor heat exchanger (4).

When the load is high, both the inverter compressor (2A) and the noninverter compressor (2B) are activated, with the setting of each valve held in the same state as above. This causes refrigerant expelled from the inverter compressor (2A) and refrigerant expelled from the noninverter compressor (2B) to circulate through the refrigerant circuit (1E) wherein the indoor heat exchanger (41) and the outdoor heat exchanger (4) serve as condensers and the cold storage heat exchanger (45) and the freeze storage heat exchanger (51) serve as evaporators. And, one portion of the refrigerant returns to the inverter compressor (2A) while, on the other hand, the other portion of the refrigerant returns to the noninverter compressor (2B) by way of the first communication passage (23).

When the inverter compressor (2A) breaks down, only the noninverter compressor (2B) is activated, with the setting of each valve unchanged. This causes refrigerant expelled from the noninverter compressor (2B) to circulate through the refrigerant circuit (1E) wherein the indoor heat exchanger (41) and the outdoor heat exchanger (4) serve as condensers while, on the other hand, the cold storage heat exchanger (45) and the freeze storage heat exchanger (51) serve as evaporators. Then, the refrigerant returns to the noninverter compressor (2B) by way of the first communication passage (23).

Third Heating/Refrigeration Operation Mode

Figure 20:
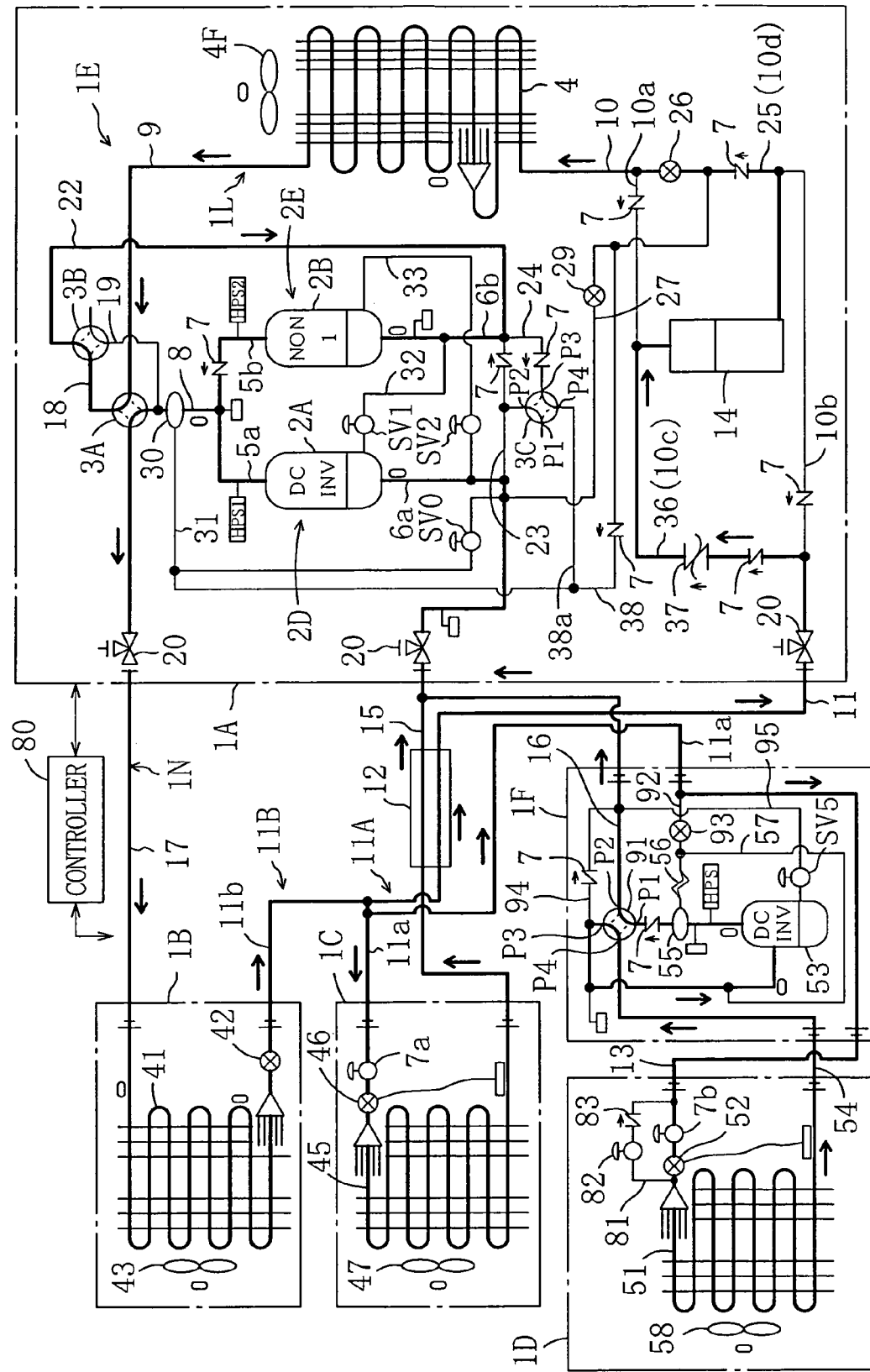
FIG. 20 is a refrigerant circuit diagram showing a third heating/refrigeration mode of operation in the second embodiment.

The third heating/refrigeration operation mode is an operation mode which is carried out if, during the first heating/refrigeration operation mode, the indoor unit (1B) is being insufficient in capability to provide desired space heating. In the third heating/refrigeration operation mode, as shown in FIG. 20, the inverter compressor (2A) and the noninverter compressor (2B) are activated and, in addition, the booster compressor (53) is also activated.

The third heating/refrigeration operation mode is an operation mode which is carried out if the capability to provide space heating becomes deficient in the first pattern of the first heating/refrigeration operation mode, in other words it is an operation mode to be carried out when the amount of heat of evaporation is insufficient. The third heating/refrigeration operation mode is identical in valve setting with the first pattern of the first heating/refrigeration operation mode, with the exception that the valve opening of the outdoor expansion valve (26) is controlled.

Therefore, as in the first heating/refrigeration operation mode, refrigerant expelled from the inverter compressor (2A) and refrigerant expelled from the noninverter compressor (2B) flow into the indoor heat exchanger (41) through the communication gas pipe (17) and condense into liquid refrigerant. One portion of the condensed liquid refrigerant flows into the first branch pipe (11a) from the second branch pipe (11b) while, on the other hand, the other portion of the condensed liquid refrigerant flows into the liquid branch pipe (36) from the main flow pipe (11) and enters the receiver (14).

One portion of the refrigerant flowing through the first branch pipe (11a) flows into the cold storage heat exchanger (45), and is evaporated into gas refrigerant. The other portion of the refrigerant flowing through the first branch pipe (11a) flows through the branch liquid pipe (13), is evaporated into gas refrigerant in the freeze storage heat exchanger (51), and is drawn into the booster compressor (53). The gas refrigerant evaporated in the cold storage heat exchanger (45), and the gas refrigerant expelled from the booster compressor (53) flow into each other in the low-pressure gas pipe (15) and return to the inverter compressor (2A).

On the other hand, liquid refrigerant leaving the receiver (14) passes through the liquid pipe (10), flows into the outdoor heat exchanger (4) by way of the outdoor expansion valve (26), and is evaporated into gas refrigerant. The evaporated gas refrigerant flows through the outdoor gas pipe (9), passes through the first four-way switch valve (3A) and then through the second four-way switch valve (3B), passes through the second connecting pipe (22) and then through the suction pipe (6b), and returns to the noninverter compressor (2B).

As such a refrigerant circulation is repeated, indoor space heating is provided in the shop while, simultaneously, the inside of the cold storage showcase and the inside of the freeze storage showcase are refrigerated. That is to say, there occurs an unbalance between the capability to provide refrigeration (the amount of heat of evaporation) of the cold storage and freeze storage units (1C, 1D) and the capability to provide space heating (the amount of heat of condensation) of the indoor unit (1B), and while obtaining from the outdoor heat exchanger (4) an amount of heat of evaporation that is lacking, space heating is provided simultaneously with cold/freeze storage refrigeration.

Operation of Booster Unit

Refrigerant expelled from the booster compressor (53) contains refrigerating machine oil. Such refrigerating machine oil is separated from the refrigerant by the oil separator (55) and is directed back to the booster compressor (53) through the oil return pipe (57).

On the other hand, in the booster compressor (53), when refrigerating machine oil is accumulated in the casing in excess of a predetermined amount, excess refrigerating machine oil is discharged to the branch gas pipe (16) through the oil discharge pipe (95) which has an opening at a predetermined height in the casing. Thereafter, the refrigerating machine oil thus discharged flows through the low-pressure gas pipe (15) and returns to the inverter compressor (2A) or to the first noninverter compressor (2B) in the outdoor unit (1A).

To sum up, when the booster compressor (53) is high in operation frequency as well as in operation capacity, the amount of refrigerating machine oil being discharged together with refrigerant from the booster compressor (53) increases. To cope with this, refrigerating machine oil is directed back to the booster compressor (53) from the oil separator (55) so that the booster compressor (53) will have no lack of refrigerating machine oil, thereby securing an adequate amount of refrigerating machine oil for the booster compressor (53).

On the other hand, when the booster compressor (53) is low in operation frequency as well as in operation capacity, the amount of refrigerating machine oil being discharged together with refrigerant from the booster compressor (53) decreases. This therefore results in an excessive accumulation of refrigerating machine oil in the booster compressor (53). At that time, as described above, excess refrigerating machine oil flows into the branch gas pipe (16) from the oil discharge pipe (95), and is directed back to the inverter compressor (2A) or to the first noninverter compressor (2B) in the outdoor unit (1A). In the outdoor unit (1A), refrigerating machine oil is distributed by the first oil level equalizing pipe (32) and the second oil level equalizing pipe (33) between each compressor (2A, 2B).

In addition, in the booster unit (1F), when the degree of superheat of the suction refrigerant into the booster compressor (53) increases, the electronic expansion valve (93) of the liquid injection pipe (92) is placed in the open state so that liquid refrigerant is decompressed for supply to the booster compressor's (53) suction side. This prevents the degree of superheat of the refrigerant in the booster compressor (53) from becoming excessive.

Furthermore, in the booster unit (1F), when the heat exchanger (51) frosts, the four-way switch valve (91) changes state so that refrigerant expelled from the booster compressor (53) is supplied to the freeze storage heat exchanger (51), in other words a so-called reverse cycle defrost operation may be performed. For example, when defrosting the freeze storage heat exchanger (51) during the freeze storage operation mode of FIG. 16, refrigerant expelled from the booster compressor (53) flows into the freeze storage heat exchanger (51) by way of the four-way switch valve (91), passes through the bypass pipe (81) and then through the branch liquid pipe (13), flows through the first branch pipe (11a), and is evaporated into gas refrigerant in the cold storage heat exchanger (45). One portion of the gas refrigerant is directed back to the inverter compressor (2A) and the noninverter compressor (2B) while, on the other hand, the other portion of the gas refrigerant passes through the branch gas pipe (16) and then through the four-way switch valve (91), and is drawn into the booster compressor (53). By virtue of such a refrigerant circulation, it becomes possible to quickly defrost the freeze storage heat exchanger (51) covered with frost.

EFFECTS OF EMBODIMENT 2

Also in the second embodiment, the relief valve (37) is provided in the liquid branch pipe (36), so that even when the temperature of outside air falls during the first heating/refrigeration operation mode which is a 100 percent heat recovery operation mode and, as a result, the pressure within the receiver (14) is lowered, it is possible to prevent liquid refrigerant exiting the indoor heat exchanger (41) from flowing into the receiver (14). That is, the pressure in the main flow pipe (11) of the communication liquid pipes (11A, 11B) is prevented from falling by means of the relief valve (37), thereby making it possible, without fail, to introduce liquid refrigerant exiting the indoor heat exchanger (41) into the cold storage heat exchanger (45) and into the freeze storage heat exchanger (51), and it is ensured that the cold storage and freeze storage heat exchangers (45, 51) are each prevented from undergoing a capability degradation due to the lack of refrigerant (insufficient flow rate).

In addition, in the second embodiment, it is possible to use the compressors (2A, 2B) not only in combination but also independently in each of the aforesaid seven different operation modes. This arrangement insures continued operation if one of the compressors (2A, 2B) breaks down. Especially, such arrangement is effective as a measure to cope with the failure of the inverter compressor (2A) which tends to break down, relative to the noninverter compressor (2B).

The second embodiment provides such a configuration that even when one of the two compressors (2A, 2B) breaks down continued operation is insured by the other compressor. It is possible to provide a more simplified configuration when compared with the first embodiment which employs three compressors.

EMBODIMENT 3 OF INVENTION

Figure 21:
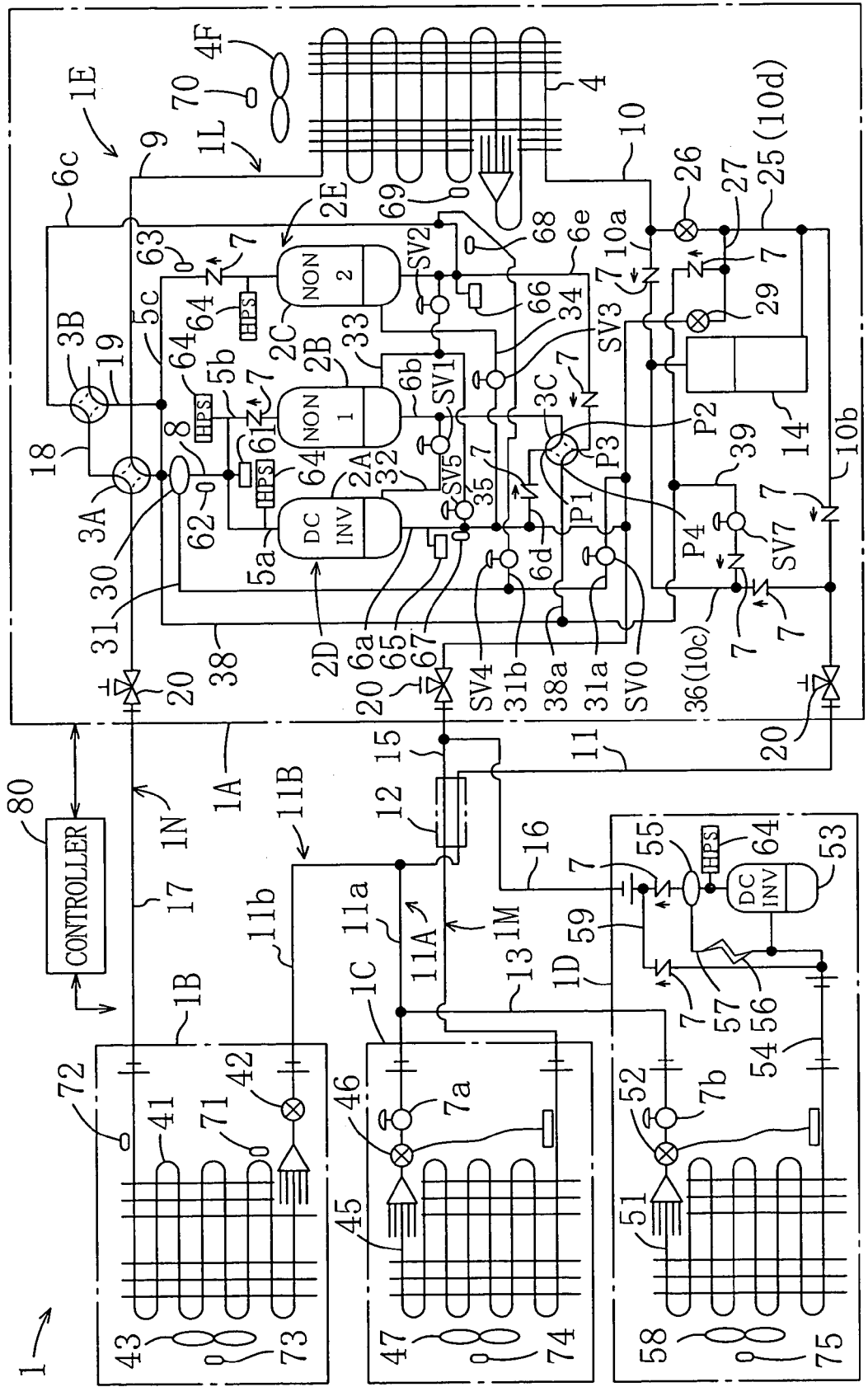
FIG. 21 is a refrigerant circuit diagram of a refrigeration apparatus according to a third embodiment of the present invention.

Hereafter, a third embodiment of the present invention is described. As shown in FIG. 21, the third embodiment is provided with a backflow prevention mechanism (liquid seal mechanism) that is a modification of the backflow prevention mechanism in the refrigerant circuit of the first embodiment.

More specifically, in the third embodiment, the gas vent pipe (28) of the first embodiment is not connected between the receiver's (14) upper part and the discharge pipe (5a) of the inverter compressor (2A). Instead, a liquid seal prevention pipe (38) is connected between a connecting point with the auxiliary liquid pipe (25) in the liquid injection pipe (27) and the electronic expansion valve (29). The liquid seal prevention pipe (38) is connected also to the high pressure gas pipe (8). The liquid seal prevention pipe (38) is provided with a check valve (7) which permits only one-way flow of refrigerant traveling from the liquid injection pipe (27) towards the high-pressure gas pipe (8). The liquid seal prevention pipe (38) is connected, through the branch pipe (38a), to the fourth port (P4) of the third four-way switch valve (3C).

A backflow prevention pipe (39) as a backflow prevention mechanism (liquid seal mechanism) for preventing refrigerant exiting the indoor heat exchanger (41) during the 100 percent heat recovery operation mode (the first heating/refrigeration operation mode) from flowing in the direction of the receiver (14) is connected: between a connecting point with the branch pipe (38a) in the liquid seal prevention pipe (38) and the check valve (7); and between a connecting point with the first inflow pipe (10a) and the check valve (7) in the liquid branch pipe (36) (the second inflow pipe (10c)). The backflow prevention pipe (39) is provided with an electromagnetic valve (SV7) and a check valve (7) which permits only refrigerant flow from the liquid seal prevention pipe (38) towards the liquid branch pipe (36). The electromagnetic valve (SV7) is configured, such that it opens and closes the backflow prevention pipe (39), and when placed in the open state, a high refrigerant pressure (discharge refrigerant pressure) in the refrigerant circuit is introduced into the second inflow pipe (10c) to close the check valve of the second inflow pipe (10c).

Figure 22:
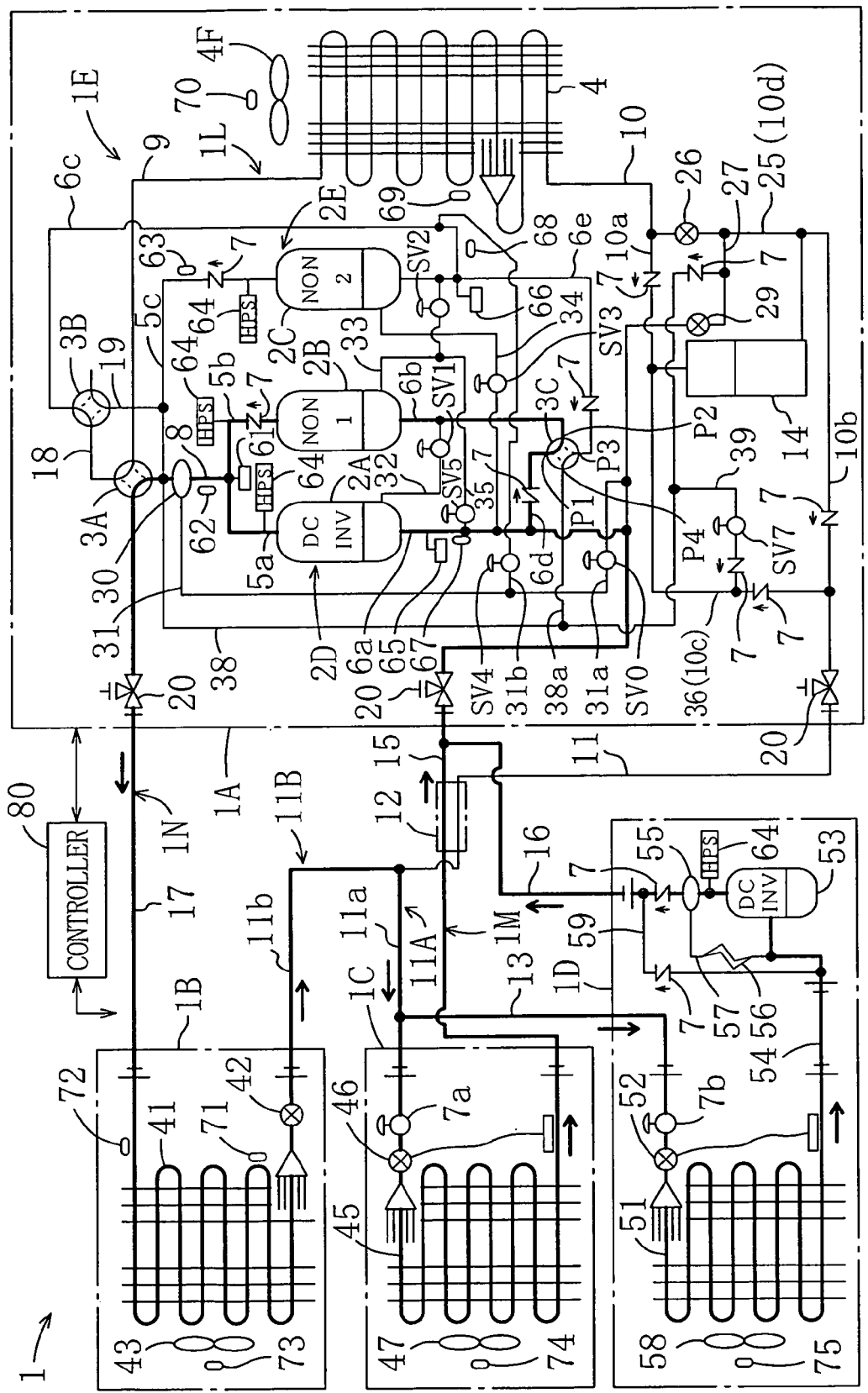
FIG. 22 is a refrigerant circuit diagram showing a first heating/refrigeration mode of operation in the third embodiment.

When, in this configuration, the electromagnetic valve (SV7) is placed in the opened state during the 100 percent heat recovery operation mode shown in FIG. 22, high-pressure refrigerant expelled from each of the compression mechanisms (2D, 2E) is introduced, through the liquid seal prevention pipe (38) and then through the backflow prevention pipe (39), into the liquid branch pipe (36) (the second inflow pipe (10c)), and acts so as to close the check valve (7) of the liquid branch pipe (36). Therefore, even when the temperature of outside air falls and, as a result, the pressure within the receiver (14) is lowered, the pressure in the main flow pipe (11) is not lowered. This ensures that refrigerant leaving the indoor heat exchanger (41) is supplied to the cold storage heat exchanger (45) and to the freeze storage heat exchanger (51), and the degradation of refrigeration capability in the heat exchangers (45, 51) is prevented, as in each of the aforesaid embodiments.

During other than the 100 percent heat recovery operation mode, by placing the electromagnetic valve (SV7) of the backflow prevention pipe (39) in the closed state, it becomes possible to perform operation by the same refrigerant flow as in the first embodiment, and the description of details of each operation is omitted here.

EMBODIMENT 4 OF INVENTION

Figure 23:
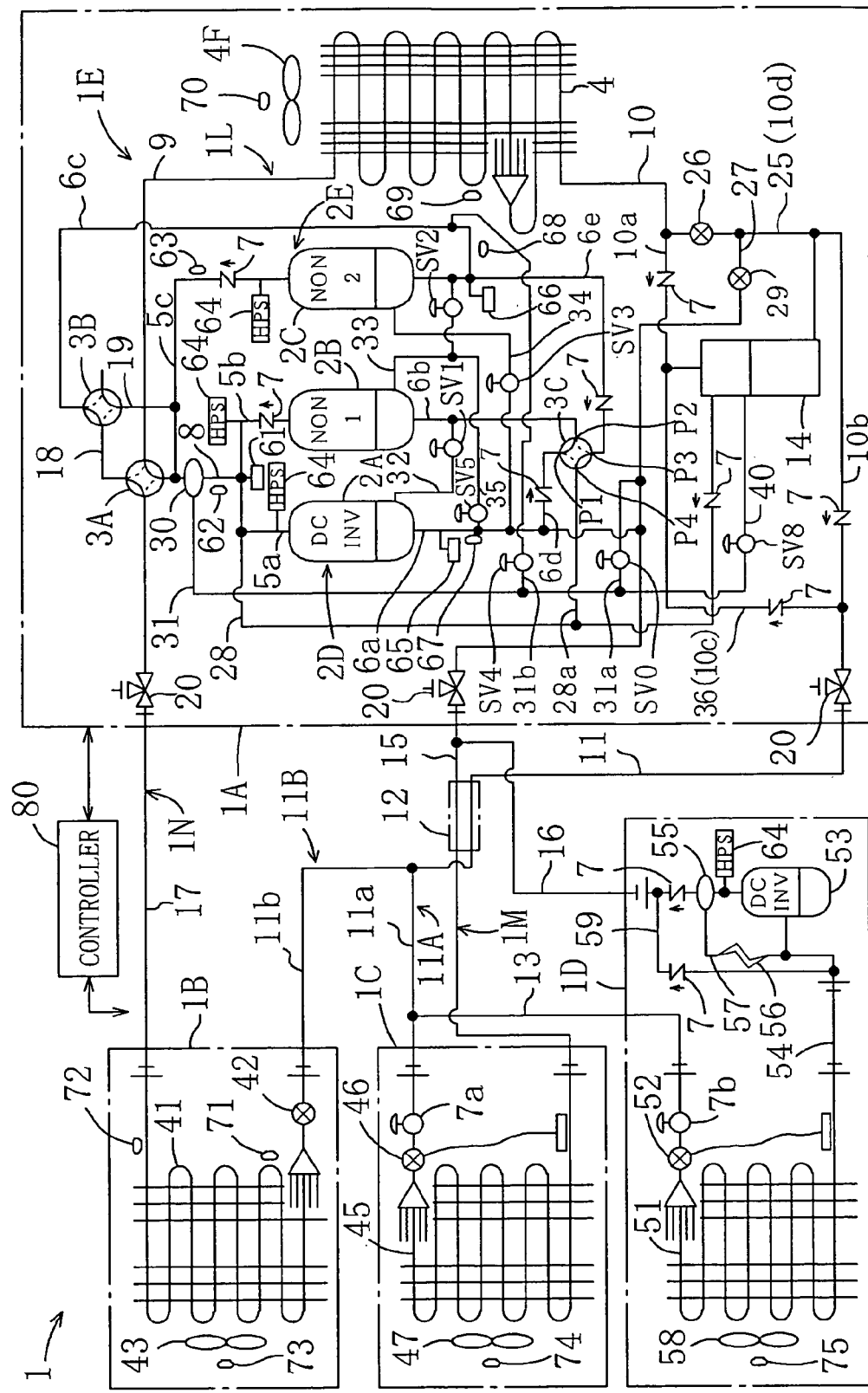
FIG. 23 is a refrigerant circuit diagram of a refrigeration apparatus according to a fourth embodiment of the present invention.

Hereafter, a fourth embodiment of the present invention is described. As shown in FIG. 23, the fourth embodiment differs from the first embodiment in that it has a liquid seal mechanism having a different configuration.

More specifically, the liquid seal mechanism (40, SV8) of the fourth embodiment comprises a high-pressure introduction pipe (40) which introduces high pressure in the refrigerant circuit into the receiver (14) and an electromagnetic valve (SV8) as an opening and closing valve which opens and closes the high-pressure introduction pipe (40). The relief valve (37) of FIG. 1 is not provided. The high-pressure introduction pipe (40) branches off from the oil return pipe (31), and is connected to the receiver (14). The high-pressure introduction pipe (40) is so configured as to enable high-pressure refrigerant to be introduced into the receiver (14) from the discharge pipe (8) of the compression mechanisms (2D, 2E).

Other arrangements of the present embodiment are the same as the first embodiment. For example, the receiver (14) is connected to the liquid pipe (10) through: the first inflow pipe (10*a*) which permits the inflow of refrigerant from the heat source-side heat exchanger (4); the first outflow pipe (10*b*) which permits the outflow of refrigerant to the liquid-side communication lines (11A, 11B); the second inflow pipe (10*c*) which permits the inflow of refrigerant from the liquid-side communication lines (11A, 11B); and the second outflow pipe (10*d*) which permits the outflow of refrigerant to the heat source-side heat exchanger (4). Further, the second inflow pipe (10*c*) is provided with the check valve (7) which permits only one-way flow of refrigerant traveling from the liquid-side communication lines (11A, 11B) towards the receiver (14).

If, in this configuration, the electromagnetic valve (SV8) is placed in the open state during the 100 percent heat recovery operation mode, high-pressure refrigerant expelled from each of the compression mechanisms (2D, 2E) is introduced into the receiver (14) by way of the high-pressure introduction pipe (40). As a result, the pressure within the receiver (14) is increased into high levels, thereby ensuring that the check valve (7) of the liquid branch pipe (36) enters the closed state by the action of the high-pressure refrigerant. Therefore, even when the temperature of outside air falls, the pressure in the main flow pipe (11) will not be lowered. This ensures that refrigerant exiting the indoor heat exchanger (41) is supplied to the cold storage heat exchanger (45) and to the freeze storage heat exchanger (51), thereby making it possible to prevent the degradation of refrigeration capability in the heat exchangers (45, 51), as in each of the above-mentioned embodiments.

During other than the 100 percent heat recovery operation mode, by closing the electromagnetic valve (SV8) of the high-pressure introduction pipe (40), it becomes possible to perform operation by the same refrigerant flow as in the first embodiment, and the description of details of each operation is omitted here.

EMBODIMENT 5 OF INVENTION

Figure 24:
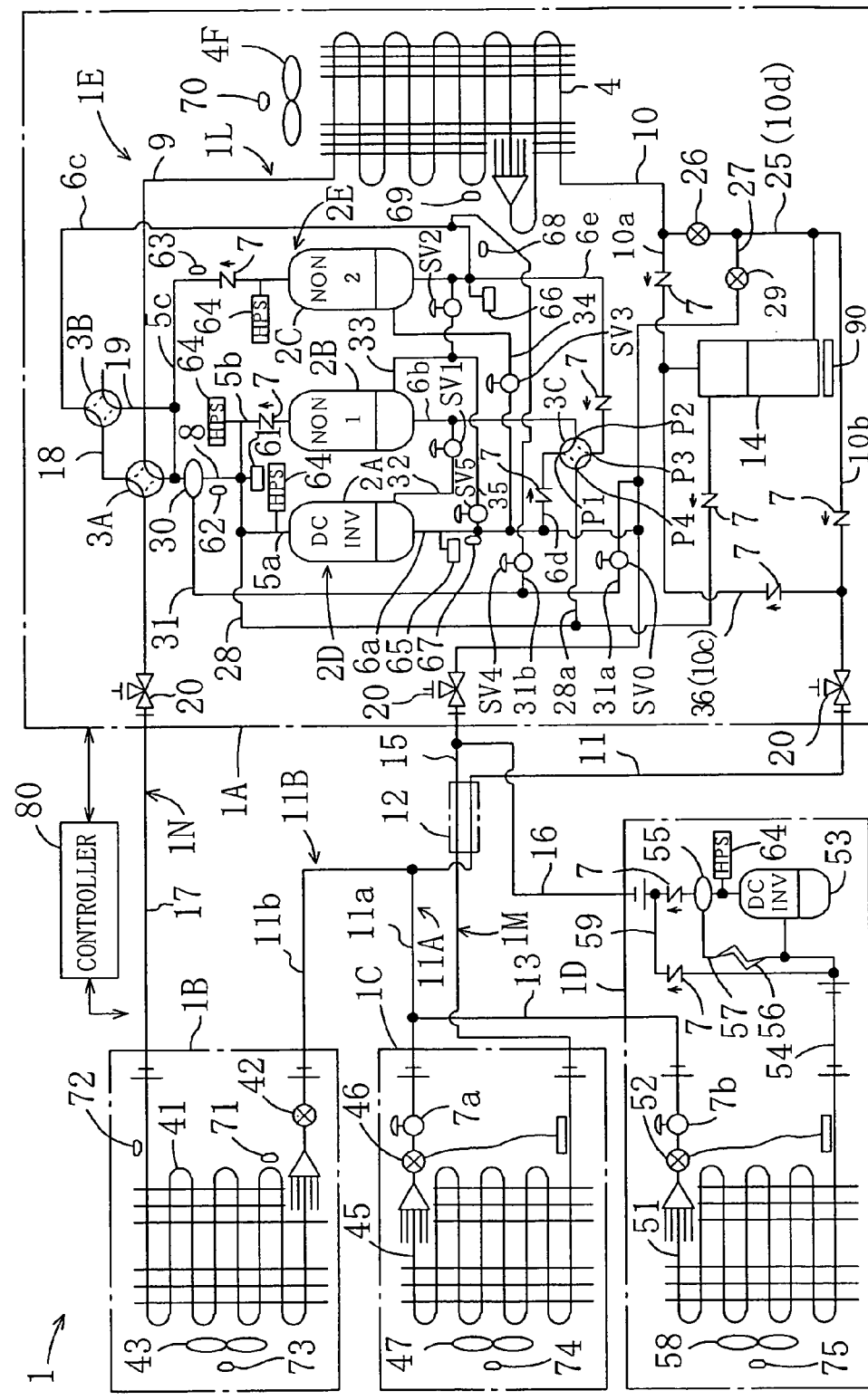
FIG. 24 is a refrigerant circuit diagram of a refrigeration apparatus according to a fifth embodiment of the present invention.

Hereafter, a fifth embodiment of the present invention is described. As shown in FIG. 24, the fifth embodiment differs in configuration of the liquid seal mechanism from the first embodiment.

More specifically, the fifth embodiment is provided with a liquid seal mechanism (90) which is formed by a heating member (90) for heating the receiver (14). The relief valve (37) of FIG. 1 is not provided. As the heating member (90), for example, an electric heater may be used.

Other arrangements of the present embodiment are the same as the first embodiment. For example, the receiver (14) is connected to the liquid pipe (10) through: the first inflow pipe (10*a*) which permits the inflow of refrigerant from the heat source-side heat exchanger (4); the first outflow pipe (10*b*) which permits the outflow of refrigerant to the liquid-side communication lines (11A, 11B); the second inflow pipe (10*c*) which permits the inflow of refrigerant from the liquid-side communication lines (11A, 11B); and the second outflow pipe (10*d*) which permits the outflow of refrigerant to the heat source-side heat exchanger (4). Further, the second inflow pipe (10*c*) is provided with the check valve (7) which permits only one-way flow of refrigerant traveling from the liquid-side communication lines (11A, 11B) towards the receiver (14).

If, in this configuration, the receiver (14) is heated by the heating member (90) during the 100 percent heat recovery operation mode, the pressure within the receiver (14) is increased to high level, thereby ensuring that the check valve (7) of the liquid branch pipe (36) is closed by the action of the high pressure. Therefore, even when the temperature of outside air falls, the pressure in the main flow pipe (11) will not be lowered. This ensures that refrigerant exiting the indoor heat exchanger (41) is supplied to the cold storage heat exchanger (45) and to the freeze storage heat exchanger (51), thereby making it possible to prevent the degradation of refrigeration capability in the heat exchangers (45, 51), as in each of the above-mentioned embodiments.

EMBODIMENT 6 OF INVENTION

Figure 25:
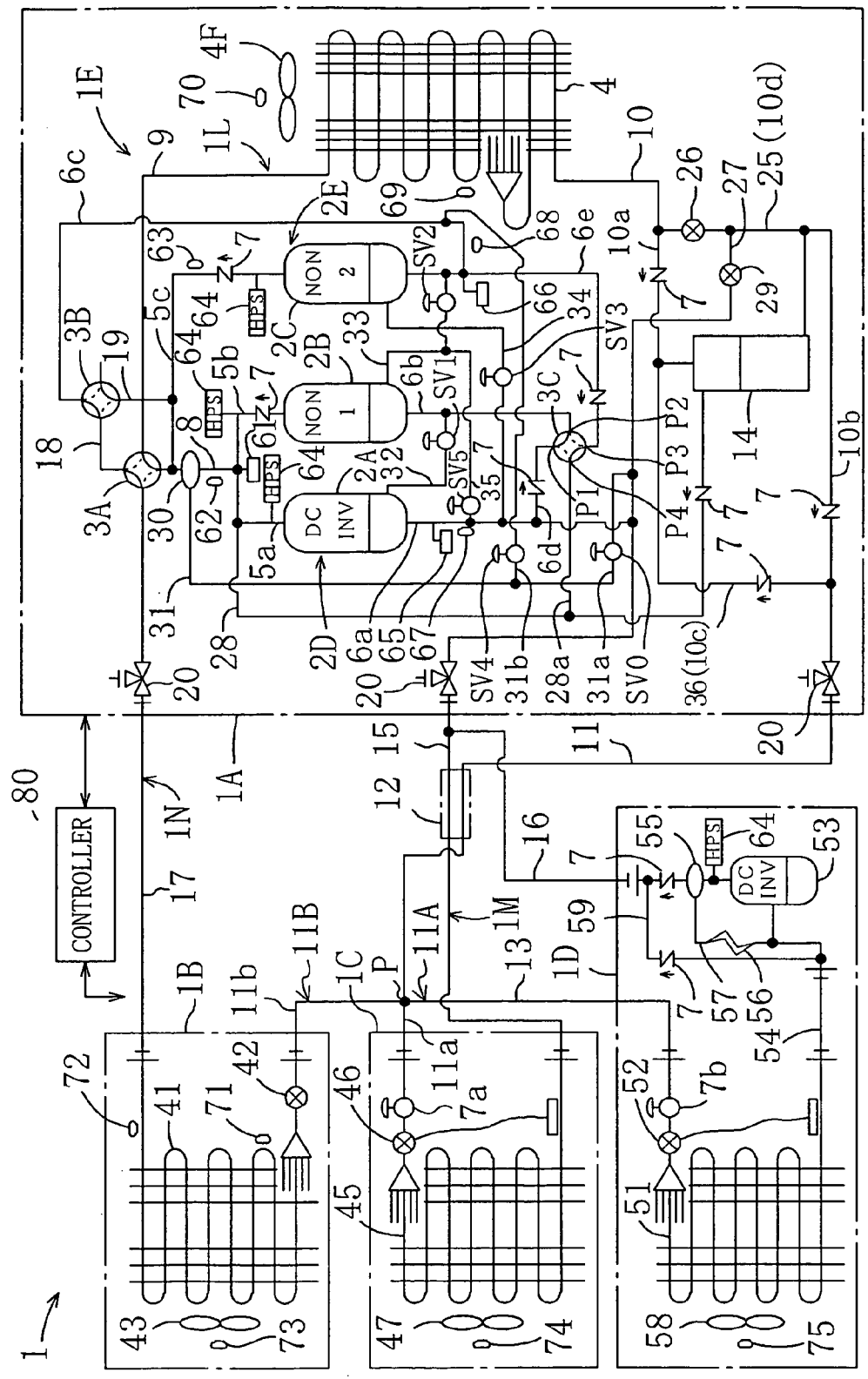
FIG. 25 is a refrigerant circuit diagram of a refrigeration apparatus according to a sixth embodiment of the present invention.
Figure 26:
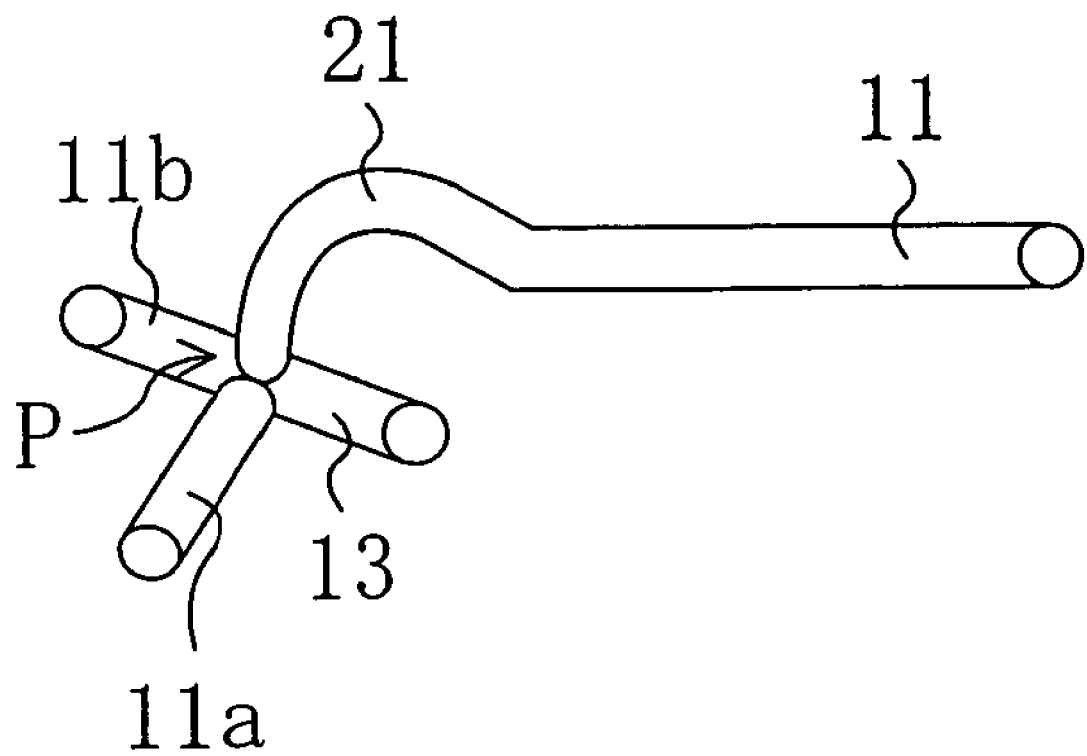
FIG. 26 is a perspective view showing an outer form of a liquid seal mechanism in the sixth embodiment.
Figure 27:
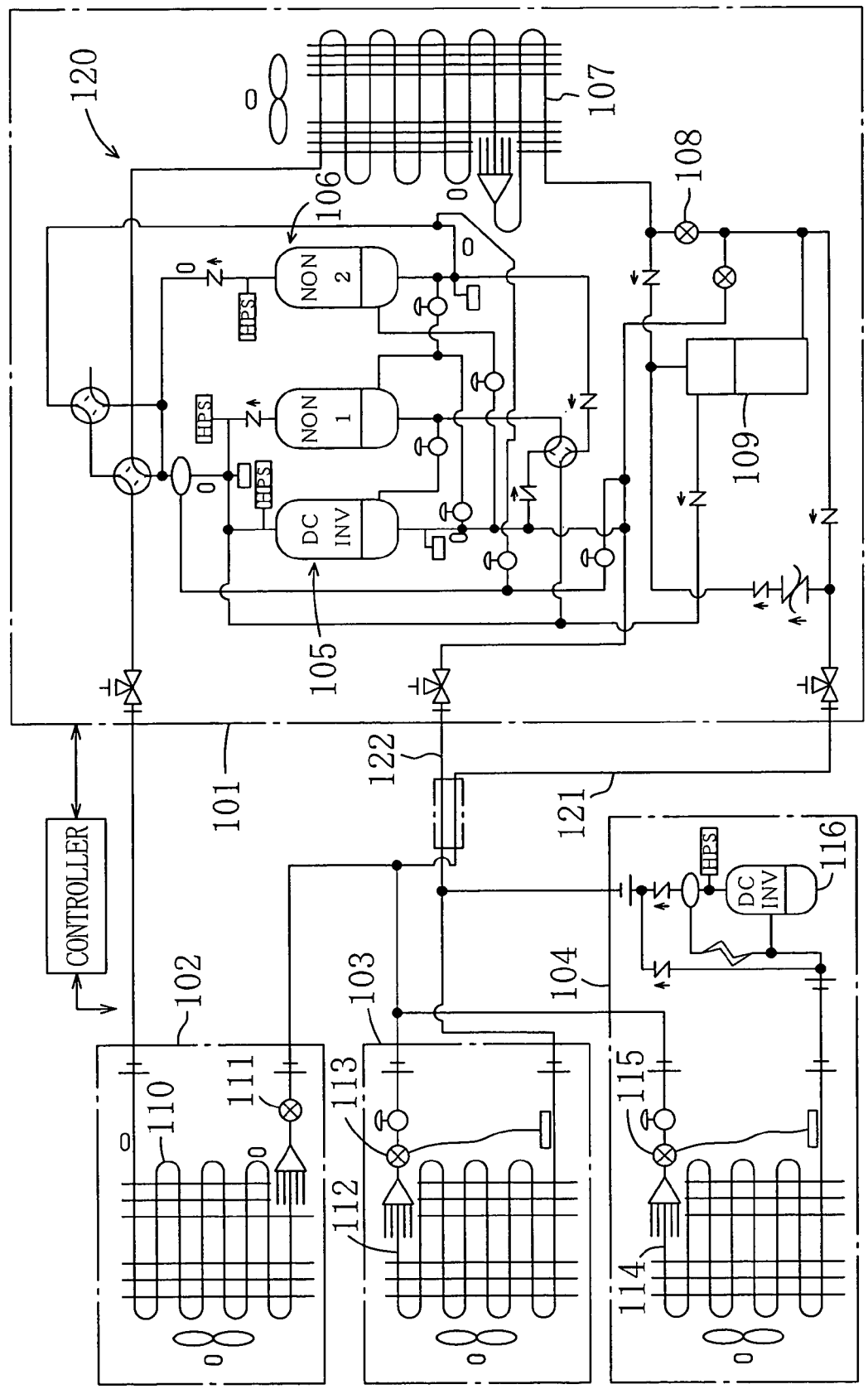
FIG. 27 is a refrigerant circuit diagram of a prior art refrigeration apparatus.

Hereafter, a sixth embodiment of the present invention is described. As shown in FIGS. 25 and 26, the sixth embodiment differs in configuration of the liquid seal mechanism from the first embodiment.

In the sixth embodiment, the liquid seal mechanism (21) is realized by pipe shaping and the relief valve (14) of FIG. 1 is not provided. More specifically, in the sixth embodiment, three different pipes, namely, the first branch pipe (11*a*), the second branch pipe (11*b*), and the branch liquid pipe (13), are connected, at one place (i.e., a junction (P)), to the main flow pipe (11), and the liquid seal mechanism (21) is composed of an uprising part (21) which is formed in the main flow pipe (11) in such a manner that it extends upwards from the first branch pipe (11*a*), the second branch pipe (11*b*), and the branch liquid pipe (13), at the junction (P).

Other arrangements of the sixth embodiment are the same as in the first embodiment.

In this configuration, during the 100 percent heat recovery operation mode, refrigerant exiting the indoor heat exchanger (41) flows through the second branch pipe (11*b*). Then, the refrigerant is prevented, by the uprising part (21), from flowing towards the main flow pipe (11) and the liquid pipe (10), thereby ensuring that the refrigerant passes through the first branch pipe (11*a*) and the branch liquid pipe

(13) and then travels towards the cold storage heat exchanger (45) and the freeze storage heat exchanger (51). This makes it possible to prevent the degradation of refrigeration capability in the heat exchangers (45, 51), as in each of the above-mentioned embodiments.

In the sixth embodiment, the aforesaid three pipes, i.e., the first branch pipe (11a), the second branch pipe (11b), and the branch liquid pipe (13), are joined to the main flow pipe (11) at the junction (P) at which is formed the uprising part (21). However, in a piping configuration in which two pipes, i.e., the first branch pipe (11a) and the second branch pipe (11b), are connected to the main flow pipe (11), as in the first embodiment, it may be arranged that the uprising part (21) extending upwards from the junction (P) is formed in the main flow pipe (11), and that the branch liquid pipe (13) branches off from the first branch pipe (11a) at a place nearer to the cold storage heat exchanger (45) than the junction (P). This arrangement also makes it possible to prevent the degradation of refrigeration capability in each of the heat exchangers (45, 51) in the same way as above.

OTHER EMBODIMENTS

The present invention may be arranged as follows in regard to the aforesaid embodiments.

For example, in each of the first and second embodiments, it is arranged that the relief valve (37) as a backflow prevention mechanism (liquid seal mechanism) is provided in the liquid branch pipe (36) (the second inflow pipe (10c)). Alternatively, the relief valve (37) may be provided, for example, in the main flow pipe (11). In this case, it is preferable that a bypass passage connected in parallel with the relief valve (37) is provided in the main flow pipe (11), and that the bypass passage is provided with a check valve which permits only one-way flow of refrigerant traveling from the outdoor unit (1A) towards each of the utilization-side units (1B, 1C, 1D). As a result of such arrangement, it becomes possible to prevent refrigerant flow traveling from the indoor unit (1B) towards the outdoor unit (1A) during the 100 percent heat recovery operation mode. Besides, since, also during other than the 100 percent heat recovery operation mode, the flow of refrigerant through the refrigerant circuit (1E) is not interrupted, this makes it possible to provide the same operation as provided in each of the foregoing embodiments. This arrangement, however, requires provision of the bypass passage and, accordingly, it is preferable to provide the relief valve (37) in the liquid branch pipe (36) (the second inflow pipe (10c), as in the foregoing embodiments, for the sake of configuration simplicity.

In addition, the specific configurations on the heat source-side described in the foregoing embodiments (for example, the compression mechanisms (2D, 2E)) and those on the utilization side may be modified according to need. To sum up, the present invention's minute configurations may be modified as long as there is employed a backflow prevention mechanism (liquid seal mechanism) to insure refrigerant flow from a heat exchanger serving as a condenser to another heat exchanger serving as an evaporator, when liquid lines of a plurality of systems are arranged into a single liquid line and a 100 percent heat recovery operation mode is conducted without using the outdoor heat exchanger (4).

Furthermore, it is not necessarily required that the main flow pipe (11) of the liquid-side communication lines (11A, 11B) and the low-pressure gas side communication line (15) are positioned side by side so as to provide a configuration capable of effecting heat exchange between gas refrigerant and liquid refrigerant.

INDUSTRIAL APPLICABILITY

As has been described above, the present invention is useful for an refrigeration apparatus which has utilization-side heat exchangers of a plurality of systems and which is able to perform a 100 percent heat recovery operation mode between the utilization-side heat exchangers.

What is claimed is:

1. A refrigeration apparatus comprising; a heat source-side unit having a compression mechanism and a heat source-side heat exchanger; a first utilization-side unit having a first utilization-side heat exchanger; a second utilization-side unit having a second utilization-side heat exchanger; a first liquid-side communication line and a first gas-side communication line which are for establishing connection between said heat source-side unit and said first utilization-side unit; and a second liquid-side communication line and a second gas-side communication line which are for establishing connection between said heat source-side unit and said second utilization-side unit, wherein:
   said first liquid-side communication line is composed of a main flow pipe which is joined to a liquid pipe connected to said heat source-side heat exchanger, and a first branch pipe which branches off from said main flow pipe and is connected to said first utilization-side heat exchanger;
   said second liquid-side communication line is composed of said main flow pipe, and a second branch pipe which branches off from said main flow pipe and is connected to said second utilization-side heat exchanger; and
   a liquid seal mechanism is provided which is configured to maintain a side short of an expansion mechanism provided between said second utilization-side heat exchanger and said first utilization-side heat exchanger in a full liquid state in an operation mode during which refrigerant flows, in sequence, through said compression mechanism, said second gas-side communication line, said second utilization-side heat exchanger, said second branch pipe, said first branch pipe, said first utilization-side heat exchanger, and said first gas-side communication line.

2. The refrigeration apparatus of claim 1, wherein:
   said liquid seal mechanism is formed by a backflow prevention mechanism which is provided either in said main flow pipe or said liquid pipe or in a line extending continuously therefrom so that the inflow of refrigerant into said main flow pipe and said liquid pipe from said second branch pipe is prevented.

3. The refrigeration apparatus of claim 2, wherein:
   said heat source-side unit is provided with a receiver for storing refrigerant; and
   said receiver is connected to said liquid pipe through: a first inflow pipe which permits the inflow of refrigerant from said heat source-side heat exchanger; a first outflow pipe which permits the outflow of refrigerant to said liquid-side communication line; a second inflow pipe which permits the inflow of refrigerant from said liquid-side communication line; and a second outflow pipe which permits the outflow of refrigerant to said heat source-side heat exchanger.

4. The refrigeration apparatus of claim 3, wherein:
   said backflow prevention mechanism is provided in said second inflow pipe.

5. The refrigeration apparatus of claim 2, wherein:
said backflow prevention mechanism is formed by a relief valve operable to block a refrigerant flow path until the pressure of refrigerant acting on said backflow prevention mechanism exceeds a predetermined pressure level.

6. The refrigeration apparatus of claim 3, wherein:
said second inflow pipe is provided with a check valve which permits only one-way flow of refrigerant traveling from said liquid-side communication line towards said receiver; and
said backflow prevention mechanism is provided with a backflow prevention pipe which introduces high pressure in a refrigerant circuit into said second inflow pipe so that said check valve is placed in the closed state, and an opening/closing valve for opening and closing said backflow prevention pipe.

7. The refrigeration apparatus of claim 6, wherein:
said backflow prevention pipe is configured such that high-pressure refrigerant is allowed to enter said second inflow pipe from a discharge pipe of said compression mechanism.

8. The refrigeration apparatus of claim 1, wherein:
said heat source-side unit is provided with a receiver for storing refrigerant;
said receiver is connected to said liquid pipe through: a first inflow pipe which permits the inflow of refrigerant from said heat source-side heat exchanger; a first outflow pipe which permits the outflow of refrigerant to said liquid-side communication line; a second inflow pipe which permits the inflow of refrigerant from said liquid-side communication line; and a second outflow pipe which permits the outflow of refrigerant to said heat source-side heat exchanger;
said second inflow pipe is provided with a check valve which permits only one-way flow of refrigerant traveling from said liquid-side communication line towards said receiver; and
said liquid seal mechanism is provided with a high-pressure introduction pipe for introducing high pressure in a refrigerant circuit into said receiver, and an opening/closing valve for opening and closing said high-pressure introduction pipe.

9. The refrigeration apparatus of claim 8, wherein:
said high-pressure introduction pipe is configured such that high-pressure refrigerant is allowed to enter said receiver from a discharge pipe of said compression mechanism.

10. The refrigeration apparatus of claim 1, wherein:
said heat source-side unit is provided with a receiver for storing refrigerant;
said receiver is connected to said liquid pipe through: a first inflow pipe which permits the inflow of refrigerant from said heat source-side heat exchanger; a first outflow pipe which permits the outflow of refrigerant to said liquid-side communication line; a second inflow pipe which permits the inflow of refrigerant from said liquid-side communication line; and a second outflow pipe which permits the outflow of refrigerant to said heat source-side heat exchanger;
said second inflow pipe is provided with a check valve which permits only one-way flow of refrigerant traveling from said liquid-side communication line towards said receiver; and
said liquid seal mechanism is formed by a heating member for heating said receiver.

11. The refrigeration apparatus of claim 1, wherein:
said liquid seal mechanism is formed by an uprising part which is provided in said main flow pipe such that said uprising part extends upwards from said first branch pipe and said second branch pipe at a junction of said main flow pipe, said first branch pipe and, said second branch pipe.

12. The refrigeration apparatus of claim 1, wherein:
said heat source-side heat exchanger is an outdoor heat exchanger which is installed outdoors;
said first utilization-side heat exchanger is a cold/freeze storage heat exchanger for providing refrigeration to the inside of a cold/freeze storage refrigerator compartment; and
said second utilization-side heat exchanger is an air conditioning heat exchanger for providing air conditioning to an indoor space.

* * * * *